(12) United States Patent
Walker et al.

(10) Patent No.: US 12,486,202 B2
(45) Date of Patent: *Dec. 2, 2025

(54) MULTILAYER SINTERED CERAMIC BODY AND METHOD OF MAKING

(71) Applicant: Heraeus Covantics North America LLC, Chandler, AZ (US)

(72) Inventors: Luke Walker, Chandler, AZ (US); Matthew Joseph Donelon, Chandler, AZ (US); Saurabh Waghmare, Chandler, AZ (US); Lillian Thompson, Chandler, AZ (US)

(73) Assignee: Heraeus Covantics North America LLC, Chandler, AZ (US)

( * ) Notice: Subject to any disclaimer, the term of this patent is extended or adjusted under 35 U.S.C. 154(b) by 376 days.

This patent is subject to a terminal disclaimer.

(21) Appl. No.: 18/248,489

(22) PCT Filed: Oct. 13, 2021

(86) PCT No.: PCT/US2021/054773
§ 371 (c)(1),
(2) Date: Apr. 10, 2023

(87) PCT Pub. No.: WO2022/081700
PCT Pub. Date: Apr. 21, 2022

(65) Prior Publication Data
US 2024/0158301 A1    May 16, 2024

Related U.S. Application Data

(60) Provisional application No. 63/216,356, filed on Jun. 29, 2021, provisional application No. 63/160,666,
(Continued)

(51) Int. Cl.
*C04B 35/119* (2006.01)
*C04B 35/626* (2006.01)
(Continued)

(52) U.S. Cl.
CPC ...... *C04B 35/119* (2013.01); *C04B 35/62645* (2013.01); *C04B 35/645* (2013.01);
(Continued)

(58) Field of Classification Search
CPC ............. C04B 35/119; C04B 35/62645; C04B 35/645; C04B 38/0054; C04B 2235/3222;
(Continued)

(56) References Cited

U.S. PATENT DOCUMENTS 5,262,029 A    11/1993    Erskine et al.
5,798,016 A    8/1998    Oehrlein et al.
(Continued)

FOREIGN PATENT DOCUMENTS

JP    2001148370 A    5/2001
JP    2009102201 A    5/2009
(Continued)

OTHER PUBLICATIONS

Dwayne D. Barnett-Ritcey; Patrick S. Nicholson, Failure prediction maps for a model Al2O3|c-ZrO2/Al2O3|Al2O3 brittle polycristalline trilayer composite, Journal of the American Ceramic Society; vol. 86, No. 1, p. 121-128; 2003; XP055451425; DOI: 10.1111/j.1151-2916.2003.tb03288.x; URL: http://onlinelibrary.wiley.com/doi/10.1111/J.1151-2916.2003.tb03288.x/pdf, Jan. 1, 2003, Wiley.
(Continued)

*Primary Examiner* — Donald M Flores, Jr.
(74) *Attorney, Agent, or Firm* — Dicke, Billig & Czaja, PLLC

(57) ABSTRACT

Disclosed is a multilayer sintered ceramic body comprising at least one first layer comprising at least one crystalline phase of YAG, wherein the at least one first layer has at least one surface; and at least one second layer comprising alumina and at least one of stabilized zirconia and partially stabilized zirconia, wherein the at least one surface of the at
(Continued)

least one first layer comprises pores wherein the pores have a maximum size of from 0.1 to 5 um as measured by SEM, and wherein each of the at least one first layer and the at least one second layer has a coefficient of thermal expansion (CTE), wherein the CTE of the at least one first layer and the CTE of the at least one second layer differ from 0 to $0.6 \times 10^{-6}/° C.$ as measured in accordance with ASTM E228-17. Methods of making are also disclosed.

15 Claims, 23 Drawing Sheets

Related U.S. Application Data filed on Mar. 12, 2021, provisional application No. 63/092,451, filed on Oct. 15, 2020.

(51) Int. Cl.
    *C04B 35/645*     (2006.01)
    *C04B 38/00*     (2006.01)

(52) U.S. Cl.
    CPC .. *C04B 38/0054* (2013.01); *C04B 2235/3222* (2013.01); *C04B 2235/3225* (2013.01); *C04B 2235/3246* (2013.01); *Y10T 428/24355* (2015.01); *Y10T 428/249953* (2015.04)

(58) Field of Classification Search
    CPC .... C04B 2235/3225; C04B 2235/3246; C04B 38/0074; Y10T 428/24355; Y10T 428/249953
    See application file for complete search history.

(56) References Cited

U.S. PATENT DOCUMENTS

| | | | |
|---|---|---|---|
| 5,838,529 | A | 11/1998 | Shufflebotham et al. |
| 5,911,852 | A | 6/1999 | Katayama et al. |
| 6,123,791 | A | 9/2000 | Han et al. |
| 6,352,611 | B1 | 3/2002 | Han et al. |
| 6,649,255 | B1 | 11/2003 | Fain et al. |
| 6,783,875 | B2 | 8/2004 | Yamada et al. |
| 7,226,673 | B2 | 6/2007 | Yamada et al. |
| 8,097,105 | B2 | 1/2012 | Shih et al. |
| 9,406,963 | B2 | 8/2016 | Lin et al. |
| 9,583,369 | B2 | 2/2017 | Sun et al. |
| 11,725,295 | B2 | 8/2023 | Takeuchi et al. |
| 2003/0186034 | A1 | 10/2003 | Yamada et al. |
| 2003/0232221 | A1* | 12/2003 | Yamada ................. C04B 35/44 428/697 |
| 2004/0138047 | A1 | 7/2004 | Yamada et al. |
| 2006/0073349 | A1 | 4/2006 | Aihara et al. |
| 2007/0161495 | A1 | 7/2007 | Komatsu et al. |
| 2008/0016684 | A1 | 1/2008 | Olechnowicz et al. |
| 2019/0295911 | A1 | 9/2019 | Fujita |
| 2020/0270179 | A1 | 8/2020 | Yoshida et al. |
| 2024/0101486 | A1* | 3/2024 | Walker ................. C04B 35/486 |

FOREIGN PATENT DOCUMENTS

| | | |
|---|---|---|
| JP | 2020050536 A | 4/2020 |
| KR | 20140033587 A | 3/2014 |
| WO | 2018093414 A1 | 5/2018 |

OTHER PUBLICATIONS

Chen et al., Effect of Surface Structure on Interfacial Bonding Strength of Metal-Plastic Composite Injection-Molded Parts, China Plastics, vol. 34 No. 4, pp. 49-53 Apr. 2020; Article No. 1001-9278 04-0049-05, Apr. 26, 2020, China Plastics.

Superior Technical Ceramics, Zirconia-toughened alumina: Why adding zirconia increases strength and toughness, 2018.

Fatemeh Mohammadi et al., The Effects of Sintering Atmosphere on the Fabrication of Transparent Polycrystalline YAG Ceramics, vol. 1152, Advanced Materials Research, Apr. 15, 2019, pp. 53 to 63, Apr. 15, 2019.

Lee Jong-Heun et al., Precursor scavenging of the resistive grain-boundary phase in 8 mol% yttria-stabilized zirconia: Effect of trace concentrations of SiO2, Journal of Materials Research, vol. 16, No. 8; p. 2377-2383; XP055804503; ISSN 0884-2914; DOI: 10.1557/JMR.2001.0326, Aug. 1, 2001.

\* cited by examiner

MULTILAYER SINTERED CERAMIC BODY AND METHOD OF MAKING

CROSS-REFERENCE TO RELATED APPLICATIONS

This application claim priority under 35 U.S.C. § 119(e) to U.S. provisional patent application No. 63/216,356, filed on Jun. 29, 2021, U.S. provisional patent application No. 63/160,666, filed on Mar. 12, 2021, and U.S. provisional patent application No. 63/092,451, filed on Oct. 15, 2020, the entireties of which are incorporated herein by reference.

TECHNICAL FIELD

This invention relates to corrosion-resistant, multilayer sintered ceramics and components formed therefrom, a method of producing the ceramics, and use within semiconductor plasma processing chambers.

BACKGROUND

Semiconductor processing requires the use of halogen-based gases in combination with high electric and magnetic fields to create a plasma environment. This plasma environment is made within vacuum chambers for etching or depositing materials on semiconductor substrates. These vacuum chambers include component parts such as disks or windows, liners, injectors, rings, and cylinders. During semiconductor plasma processing, the substrates are typically supported within the vacuum chamber by substrate holders, as disclosed, for example, in U.S. Pat. Nos. 5,262,029 and 5,838,529. Process gas for creation of the plasma processing environment can be supplied to the chamber by various gas supply systems. Some processes involve use of a radio frequency (RF) field and process gases are introduced into the processing chamber while the RF field is applied to the process gases to generate a plasma of the process gases. Ceramic materials used to form these components, in particular for RF applications, are required to have low dielectric loss tangents, on the order of $1 \times 10^{-3}$ and less. Dielectric losses higher than this cause overheating and hot spots within the components during use, leading to process variability and yield loss. Components fabricated from highly pure starting powders and use of manufacturing processes retaining initial purity will provide sintered ceramics to meet these low loss requirements. The harsh plasma processing environment necessitates the use of highly corrosion and erosion resistant materials for chamber components. These components have been formed from materials that provide resistance to corrosion and erosion in plasma environments and have been described, for example, in U.S. Pat. Nos. 5,798,016, 5,911,852, 6,123,791 and 6,352,611. Moreover, plasma processing chambers have been designed to include parts such as disks, rings, and cylinders that confine the plasma over the wafer being processed. However, these parts used in plasma processing chambers are continuously attacked by the plasma and, consequently, ultimately corrode, erode or accumulate contaminants and polymer build-up. The plasma etch and deposition conditions cause erosion and roughening of the surfaces of the chamber parts that are exposed to the plasma. This corrosion contributes to wafer level contamination through the release of particles from the component surface into the chamber, resulting in semiconductor device yield loss.

To address this, oftentimes chamber components have a surface layer which is resistant to corrosion and erosion upon exposure to the process gases. The surface layer is formed atop a base or substrate which may have superior mechanical, electrical or other preferred properties. Corrosion resistant films or coatings of for example yttrium oxide or yttrium aluminum garnet have been known to be deposited atop a base or substrate formed of a different material, such as alumina, which are lower in price and higher in strength than most corrosion resistant materials. Such films or coatings have been made through several methods. Vapor deposition methods have been used to deposit corrosion resistant films on substrates, however vapor deposition is limited to relatively thin layers due to internal film stresses and often small holes are present in the thin film. These internal film stresses cause poor inter-layer adhesion and result in delamination typically at an interface between the corrosion resistant film and the base material, rendering these layers prone to cracking and spalling which thereby leads to undesirable particulate contamination. Corrosion resistant coatings or films made by aerosol or plasma spray techniques typically exhibit high levels of porosity of between 3% to about 50%, and correspondingly low density. Further, these films produced by aerosol or spray methods exhibit poor interfacial adhesion between the substrate material and the corrosion resistant layer, resulting in flaking and exfoliation and subsequent chamber contamination.

Commercially available methods for film deposition onto sintered substrates limit film thicknesses to less than about 0.45 mm and less. Such film thicknesses often have holes resulting from non-uniformities in the underlying substrate, and the presence of holes and limited film thickness makes the film surface layer prone to cracking, exposing the underlying substrate to corrosive process gases and particle generation during processing.

Other approaches to form a corrosion resistant, high strength sintered bodies and/or components involves laminating pre-cast films, applying pressure to the films to form a laminate, followed by co-sintering of the laminate. These methods typically use pressureless sintering and the flatness of the sintered laminate is dependent upon closely matching the sintering rates of the respective films. For example, if the sintering rate of the top film is greater than that of the bottom layer, the sintered ceramic laminate will have a concave curvature, whereas if the sintering rate of the bottom film is greater than that of the top film, the sintered ceramic laminate will have a convex curvature (both as configured with the top film facing upwardly). Variances in sintering rates create residual stress in the sintered laminate, making it prone to breakage and cracking, in particular at large dimension. Thus, materials selected for co-sintering are limited to those having the same or very similar sintering profiles of time, temperature and duration as known to those skilled in the art. Additionally, these sintered laminates often exhibit poor interfacial adhesion between layers, resulting in peeling and spalling of the top layer, combined with low densities, making them prone to breakage, delamination and cracking.

As dimensions of semiconductor substrates increase, there is a need for corrosion resistant, high strength sintered ceramic bodies, and in particular those of large dimension (greater than 100 mm, such as, for example, from 100 mm to 625 mm), to enable fabrication of semiconductor devices at a large scale.

As a result, there is a need in the art for a multilayer sintered ceramic body having the combined properties of corrosion and erosion resistance, high adhesion between layers, low dielectric loss tangent, high thermal conductivity and high mechanical strength for use in plasma processing chambers.

SUMMARY

To meet these and other needs, and in view of its purposes, the disclosure provides embodiments of a multilayer sintered ceramic body and a method for preparing large, multi-layer sintered ceramic bodies with improved mechanical, electrical and thermal properties and ability to be handled.

Sintered ceramic bodies, also referred to herein as multilayer sintered ceramic bodies, and methods of making are described herein. These ceramic bodies provide high corrosion resistance to chlorine and fluorine-based process gases, low dielectric loss tangents (tan δ), high thermal conductivity and high mechanical strength, and are thus desirable for use as components in semiconductor plasma processing chambers utilizing halogen-based process gases. The ceramic bodies are particularly suited for use as large chamber components of dimension 100 mm and greater.

Embodiment 1. A multilayer sintered ceramic body comprising: at least one first layer comprising at least one crystalline phase of YAG, wherein the at least one first layer has at least one surface; and at least one second layer comprising alumina and at least one of stabilized zirconia and partially stabilized zirconia, wherein the at least one surface of the at least one first layer comprises pores wherein the pores have a maximum size of from 0.1 to 5 um as measured by SEM, and wherein each of the at least one first layer and the at least one second layer has a coefficient of thermal expansion (CTE), wherein the CTE of the at least one first layer and the CTE of the at least one second layer differ from 0 to $0.6 \times 10^{-6}/°$ C. as measured in accordance with ASTM E228-17.

Embodiment 2. The multilayer sintered ceramic body of embodiment 1 wherein the multilayer sintered ceramic body has a greatest dimension of from 100 to 625 mm.

Embodiment 3. The multilayer sintered ceramic body as in embodiment 1 or 2 wherein the pores have a maximum size of 0.1 to 2 um as measured by SEM.

Embodiment 4. The multilayer sintered ceramic body as in any of the preceding embodiments wherein the pores have a maximum size of 0.1 to 1 um as measured by SEM.

Embodiment 5. The multilayer sintered ceramic body as in any of the preceding embodiments wherein the pores are characterized by a cumulative pore distribution of from about 2 to about 600 $um^2/mm^2$ as measured using SEM and image processing methods.

Embodiment 6. The multilayer sintered ceramic body of embodiment 5 wherein the pores distribution is from about 2 to about 300 $um^2/mm^2$ as measured by SEM.

Embodiment 7. The multilayer sintered ceramic body as in any of the preceding embodiments wherein the at least one surface has a porosity by percentage of a total area of the at least one surface of from 0.0005 to 1% as measured by SEM.

Embodiment 8. The multilayer sintered ceramic body of embodiment 7 wherein the porosity by percentage of a total area of the at least one surface is from 0.005 to 2%.

Embodiment 9. The multilayer sintered ceramic body as in any of the preceding embodiments wherein the relative density of the at least one first layer and the relative density of the at least one second layer is from 99 to 100%.

Embodiment 10. The multilayer sintered ceramic body of embodiment 9 wherein the relative density varies 5% or less across a greatest dimension of the multilayer sintered body.

Embodiment 11. The multilayer sintered ceramic body of embodiment 10 wherein the relative density varies 3% or less across the greatest dimension.

Embodiment 12. The multilayer sintered ceramic body of embodiment 11 wherein the relative density varies 1% or less across the greatest dimension.

Embodiment 13. The multilayer sintered ceramic body as in one of embodiments 10-12 wherein the greatest dimension is from 400 to 625 mm.

Embodiment 14. The multilayer sintered ceramic body as in any of the preceding embodiments wherein the difference in coefficient of thermal expansion (CTE) between the at least one first layer and the at least one second layer is from 0 to $0.3 \times 10^{-6}/°$ C.

Embodiment 15. The multilayer sintered ceramic body as in any of the preceding embodiments wherein the absolute value of the difference in coefficient of thermal expansion (CTE) between the at least one first layer and the at least one second layer is maintained throughout a temperature range of from ambient to about 1700° C.

Embodiment 16. The multilayer sintered ceramic body as in any of the preceding embodiments wherein the at least one second layer comprises zirconia in an amount by volume of from 10 to 25% relative to a volume of the at least one second layer.

Embodiment 17. The multilayer sintered ceramic body as in any of the preceding embodiments wherein the at least one second layer comprises partially stabilized zirconia.

Embodiment 18. The multilayer sintered ceramic body of embodiment 17 wherein the at least one second layer comprises 3 mol % yttria partially stabilized zirconia.

Embodiment 19. The multilayer sintered ceramic body as in one of embodiments 1-16 wherein the at least one second layer comprises stabilized zirconia.

Embodiment 20. The multilayer sintered ceramic body as in any of the preceding embodiments wherein the at least one second layer comprises about 16% by volume of zirconia relative to a volume of the at least one second layer.

Embodiment 21. The multilayer sintered ceramic body as in any of the preceding embodiments wherein the at least one first layer comprises YAG in an amount by volume of 98 to 99.3% and the balance comprising at least one crystalline phase selected from the group consisting of aluminum oxide, yttrium oxide, YAM and YAP and combinations thereof as measured using XRD, SEM and image processing methods.

Embodiment 22. The multilayer sintered ceramic body as in any of the preceding embodiments wherein the at least one first layer has a total impurity content of less than 25 ppm relative to the mass of the at least one first layer as measured by ICPMS.

Embodiment 23. The multilayer sintered ceramic body as in any of the preceding embodiments wherein the at least one first layer is free of dopants.

Embodiment 24. The multilayer sintered ceramic body as in any of the preceding embodiments wherein the at least one first layer is free of sintering aids.

Embodiment 25. The multilayer sintered ceramic body as in any of the preceding embodiments wherein the at least one first layer comprises silica in an amount of from 14 to 25 ppm relative to the mass of the at least one first layer as measured by ICPMS.

Embodiment 26. The multilayer sintered ceramic body as in any of the preceding embodiments wherein the at least one first layer has an Sa of from 0.0005 to 1 um as measured according to ISO standard 25178-2-2012.

Embodiment 27. The multilayer sintered ceramic body of embodiment 26 wherein the Sa is from 0.001 to 0.020 um as measured according to ISO standard 25178-2-2012.

Embodiment 28. The multilayer sintered ceramic body as in any of the preceding embodiments wherein the at least one first layer has an Sz of from 0.3 to 3 um as measured according to ISO standard 25178-2-2012.

Embodiment 29. The multilayer sintered ceramic body as in any of the preceding embodiments wherein the at least one second layer has a density of from 4.19 to 4.46 g/cc as measured in accordance with ASTM B962-17.

Embodiment 30. The multilayer sintered ceramic body as in any of the preceding embodiments wherein the at least one second layer comprises zirconia in an amount of 16% by volume and has a density of about 4.32 g/cc as measured in accordance with ASTM B962-17.

Embodiment 31. The multilayer sintered ceramic body of embodiment 30 wherein the at least one second layer has a coefficient of thermal expansion (CTE) of from $6.98 \times 10^{-6}/°$C. to $9.26 \times 10^{-6}/°$C. throughout a temperature range of from about 200° C. to about 1400° C. as measured in accordance with ASTM E228-17.

Embodiment 32. The multilayer sintered ceramic body as in any of the preceding embodiments wherein the at least one second layer has a total impurity content of 10 to 80 ppm relative to the mass of the at least one second layer as measured using ICPMS methods.

Embodiment 33. The multilayer sintered ceramic body as in any of the preceding embodiments wherein the at least one first layer and the at least one second layer are contiguous.

Embodiment 34. The multilayer sintered ceramic body as in any of the preceding embodiments having an interface defined by the at least one first and second layers wherein the interface has an average interface line and a distance from the interface to the average interface line varies in amount of from 10 to 100 um as measured by SEM.

Embodiment 35. The multilayer sintered ceramic body of embodiment 34 wherein an interface defined by the at least one first and second layers has a tortuosity of from 1 to 3 as measured by SEM.

Embodiment 36. The multilayer sintered ceramic body as in any of the preceding embodiments wherein the at least one first layer has a thickness d1, and the at least one second layer has a thickness d2, wherein the thickness of the at least one second layer is from 80% to 98% of the combined thicknesses of the at least one first and second layers.

Embodiment 37. The multilayer sintered ceramic body as in any of the preceding embodiments wherein the at least one first layer has an L* value of less than 90 as measured on a plasma-facing surface of the at least one first layer.

Embodiment 38. A method of making a multilayer sintered ceramic body, the method comprising the steps of a) combining yttria and alumina powders to make a first powder mixture; b) combining alumina and zirconia powders to make a second powder mixture, wherein the zirconia is selected from the group consisting of partially stabilized zirconia and stabilized zirconia; c) calcining the first and second powder mixtures by applying heat to raise the temperature of the powder mixtures to a calcination temperature and maintaining the calcination temperature to perform calcination to form first and second calcined powder mixtures; d) separately disposing the first and second calcined powder mixtures inside a volume defined by a tool set of a sintering apparatus to form at least one layer of the first calcined powder mixture and at least one layer of the second calcined powder mixture and creating vacuum conditions inside the volume; e) applying pressure to the layers of the first and second calcined powder mixtures while heating to a sintering temperature and performing sintering to form the multilayer sintered ceramic body, wherein the at least one layer of the first calcined powder mixture upon sintering forms at least one first layer and the at least one layer of the second calcined powder mixture forms at least one second layer; and f) lowering the temperature of the multilayer sintered ceramic body, wherein the at least one first layer comprising at least one crystalline phase of YAG, wherein the at least one first layer has at least one surface; and at least one second layer comprising alumina and at least one of stabilized zirconia and partially stabilized zirconia, wherein the at least one surface of the at least one first layer comprises pores wherein the pores have a maximum size of from 0.1 to 5 um as measured using SEM and image processing methods, and wherein each of the at least one first layer and the at least one second layer has a coefficient of thermal expansion (CTE), wherein the CTE of the at least one first layer and the CTE of the at least one second layer differ from 0 to $0.6 \times 10^{-6}/°$C. as measured in accordance with ASTM E228-17.

Embodiment 39. The method according to embodiment 38, further comprising the steps of: g) optionally annealing the multilayer sintered ceramic body by applying heat to raise the temperature of the multilayer sintered ceramic body to reach an annealing temperature, performing annealing; and h) lowering the temperature of the annealed multilayer sintered ceramic body.

Embodiment 40. The method of embodiment 38 or 39 wherein the tool set comprises a graphite die having a volume, an inner wall, a first and second openings, and first and second punches operatively coupled with the die, wherein each of the first and second punches have an outer wall defining a diameter that is less than a diameter of the inner wall of the die thereby creating a gap between each of the first and second punches and the inner wall of the die when at least one of the first and second punches moves within the volume of the die.

Embodiment 41. The method of embodiment 40 wherein the gap is a distance of from 10 to 100 μm between the inner wall of the die and the outer wall of each of the first and second punches.

Embodiment 42. The method according to one of embodiments 38 to 41 wherein the sintering temperature is from 1000 to 1500° C.

Embodiment 43. The method of embodiment 42 wherein the sintering temperature is from 1000 to 1300° C.

Embodiment 44. The method as in any one of embodiments 38 to 43 wherein from 5 to 59 MPa of pressure is applied to the calcined powder mixture while heating to the sintering temperature.

Embodiment 45. The method according to embodiment 44 wherein the pressure is from 5 to 40 MPa.

Embodiment 46. The method according to embodiment 45 wherein the pressure is from 5 to 20 MPa.

Embodiment 47. The method as in any one of embodiments 38 to 44 wherein less than 50 MPa of pressure is applied to the calcined powder mixture while heating to the sintering temperature.

Embodiment 48. The method according to any one of embodiments 38 to 47 wherein first and second calcined powder mixtures have a combined total impurity content of 100 ppm or less as measured by ICPMS.

Embodiment 49. The method according to any one of embodiments 38 to 48 wherein the second calcined powder mixture comprises partially stabilized or stabilized zirconia in an amount by weight of not less than 17% and not greater than 34% relative to the weight of the second calcined powder mixture as measured by ICPMS.

Embodiment 50. The method according to any one of embodiments 38 to 49 wherein the first and second powder mixtures are crystalline as determined by x ray diffraction.

Embodiment 51. The method according to any one of embodiments 38 to 50 wherein the second powder mixture comprises partially stabilized zirconia.

Embodiment 52. The method according to any one of embodiments 38 to 51 wherein each of first and second calcined powder mixtures has a specific surface area (SSA) of from 1 m²/g to about 10 m²/g as measured according to ASTM C1274.

Embodiment 53. The method according to any one of embodiments 38 to 52 further comprising the step of: i) machining the multilayer sintered ceramic body to create a multilayer sintered ceramic component in the shape of a dielectric window, an RF window, a focus ring, a process ring, a deposition ring, a nozzle or a gas injector, a shower head, a gas distribution plate, an etch chamber liner, a plasma source adapter, a gas inlet adapter, a diffuser, an electrostatic wafer chuck (ESC), a chuck, a puck, an ion suppressor element, a faceplate, an isolator, a spacer, and/or a protective ring in plasma processing chambers.

Embodiment 54. A multilayer sintered ceramic body made by the process of any one of embodiments 38 to 52.

Embodiment 55. The multilayer sintered ceramic body of embodiment 54 having a greatest dimension of from 100 to about 625 mm.

Embodiment 56. The multilayer sintered ceramic body of embodiment 55 having a greatest dimension of from 400 to about 625 mm.

The embodiments of the invention can be used alone or in combinations with each other.

BRIEF DESCRIPTION OF THE DRAWINGS

The disclosure is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

Figure 1:
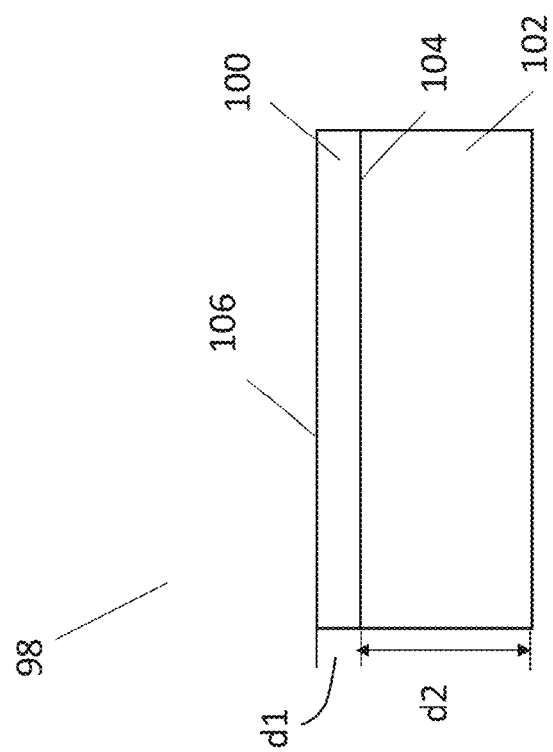
FIG. 1 depicts an exemplary schematic of a multilayer sintered ceramic body according to embodiments as disclosed herein.

Reference will now be made in detail to specific embodiments. Examples of the specific embodiments are illustrated in the accompanying drawings. While the disclosure will be described in conjunction with these specific implementations, it will be understood that it is not intended to limit the disclosure to such specific embodiments. On the contrary, it is intended to cover alternatives, modifications, and equivalents as may be included within the spirit and scope as defined by the appended claims. In the following description, numerous specific details are set forth in order to provide a thorough understanding of the disclosed embodiments. The present disclosure may be practiced without some or all of these specific details.

DEFINITIONS—As used herein, the following terms are defined following: "Alumina" is understood to be aluminum oxide, comprising $Al_2O_3$, "zirconia" is understood to be zirconium oxide, comprising ZrO2, and "Yttria" is understood to be yttrium oxide, comprising $Y_2O_3$.

As used herein, the terms "semiconductor wafer," "wafer," "substrate," and "wafer substrate," are used interchangeably. A wafer or substrate used in the semiconductor device industry typically has a diameter of 200 mm, or 300 mm, or 450 mm.

As used herein, the term "sintered ceramic body" is synonymous with "multi-layer sintered ceramic body", "corrosion resistant sintered ceramic", "corrosion resistant body", "sintered ceramic", "multi-layer unitary body" and similar terms and refers to a unitary, integral sintered ceramic article formed from co-compacting more than one powder mixture by application of pressure and heat which creates a unitary, dense, multilayer sintered ceramic body. The unitary, multilayer sintered ceramic body may be machined into a unitary, multilayer sintered ceramic component useful as a chamber component in plasma processing applications. As such the multilayer sintered ceramic bodies disclosed herein are not formed by laminating preformed layers together, i.e., the multilayer sintered ceramic bodies disclosed herein are not laminates.

By "unitary" or "integral" is meant a single piece or a single unitary part that is complete by itself without additional pieces, i.e., the part is of one monolithic piece formed as a unit with another part.

The term "substantially," as used in this document, is a descriptive term that denotes approximation and means "considerable in extent" or "largely but not wholly that which is specified" and is intended to avoid a strict numerical boundary to the specified parameter.

As used herein, the term "sintered ceramic component" or "multi-layer sintered ceramic component" refers to a sintered ceramic body, multi-layer sintered ceramic body or corrosion resistant ceramic after a machining step forming the ceramic into a specific shape of a desired component for use in a semiconductor processing chamber as disclosed herein.

As used herein, the term "powder mixture" means more than one starting powder mixed together prior to a sintering process which after a sintering step are thereby formed into the sintered ceramic body. Powder mixtures which have been subjected to calcination as disclosed herein are referred to herein as "calcined powder mixtures".

The term "annealing" when applied to heat treatment of ceramics is understood herein to mean a heat treatment conducted on the disclosed sintered ceramic bodies in air to relieve stress and/or normalize stoichiometry.

As used herein, the term "tool set" is one that may comprise at least a die and at least two punches. When fully assembled, the tool set defines a volume for disposition of the calcined powder mixtures as disclosed.

A "solid solution" as used herein is defined as a mixture of different elements that share the same crystal lattice structure. The mixture within the lattice may be substitutional, in which the atoms of one starting crystal replace those of the other, or interstitial, in which the atoms occupy positions normally vacant in the lattice.

As used herein, the term "nanopowder" is intended to encompass those powders having a specific surface area of greater than 20 $m^2/g$.

The term "phase" as used herein is understood to mean a distinct, crystalline region, portion or layer of a sintered ceramic body having a specific crystallographic structure.

As used herein, the term "layer" is understood to mean a thickness of material, typically one of several. The material can be, for example, a ceramic powder, or a sintered region or sintered portion.

As used herein, "ambient temperature" refers to a temperature range of from about 22° C. to 25° C.

As used herein, the term "purity" refers to the absence of various contaminants in a) a starting material from which a powder mixture may be formed, b) a powder mixture (or calcined powder mixture) after processing, and c) a sintered ceramic body or component as disclosed herein. Higher purity, closer to 100%, represents a material having essentially no, or very low amounts of, contaminants or impurities, comprising substantially the material compositions present in the starting powders as disclosed.

As used herein, the term "impurity" refers to those compounds/contaminants present in the powders or sintered ceramics other than the intended compounds themselves (starting powders of magnesia, alumina, yttria and zirconia, powder mixtures and ceramics formed therefrom). Impurities may be present in the starting powders, a powder mixture, the powder mixture after processing, and a sintered ceramic body. ICPMS methods were used to determine the impurity content of the powders, powder mixtures and first and second layers of the sintered body as disclosed herein.

The term "dopant" as used herein is a substance added to a bulk material to produce a desired characteristic in a ceramic material (e.g., to alter electrical properties). Typically, dopants if used are present at low concentrations, i.e., >0.002 wt % to <0.05 wt %.

Impurities differ from dopants in that dopants as defined herein are those compounds intentionally added to the starting powders or to the powder mixture to achieve certain electrical, mechanical, optical or other properties such as grain size modification for example, in the sintered ceramic body. The term "dopants" as used herein do not include Hf and Y as included in the starting material of zirconium oxide to the extent they may remain in the sintered ceramic body.

The term "sintering aid" as used herein refers to compounds, such as silica ($SiO_2$), lithia ($Li_2O$), lithium fluoride (LiF), magnesia (MgO), and/or calcia (CaO), that enhance densification, and thereby reduce porosity, during the sintering process. Hf and Y present in the starting powders and to the extent they remain in the sintered ceramic do not comprise sintering aids, impurities or dopants as defined herein.

As used herein, the terms "substantially," "approximately," and "about" as they are used in connection with numbers allow for a variance of plus or minus 10%.

As used herein, the term "coefficient of thermal expansion (CTE) is measured in accordance with ASTM E228-17 across a temperature range of from 25 to 200° C. to 25 to 1400° C., preferably of from 25 to 1200° C., more preferably of from 25 to 1000° C., more preferably 25 to 800° C., more preferably of from 25 to 600° C., more preferably of from 25 to 400° C., more preferably of from 25 to 200° C. In particular and as used herein, the term "coefficient of thermal expansion (CTE) is measured in accordance with ASTM E228-17 across a temperature range of from 25 to 1700° C. or across a temperature range of from 200 to 1400° C.

The following detailed description assumes the disclosure is implemented within equipment such as etch or deposition chambers necessary as part of the making of devices upon a semiconductor substrate. However, the invention is not so limited. The work piece may be of various shapes, sizes, and materials. In addition to semiconductor wafer processing, other work pieces that may take advantage of this invention include various articles such as fine feature size inorganic circuit boards, magnetic recording media, magnetic recording sensors, mirrors, optical elements, micro-mechanical devices and the like.

During processing of semiconductor devices, corrosion resistant chamber components are used within etch and/or deposition plasma processing chambers and exposed to harsh corrosive environments which cause the release of particles into the chamber, resulting in yield loss due to wafer-level contamination. The multilayer sintered ceramic body and related components fabricated therefrom as disclosed herein provide improved plasma resistance and enhanced mechanical strength for use within semiconductor processing chambers by way of specific material properties and features to be described following.

Corrosion resistant ceramics, and in particular multilayer sintered ceramic bodies having more than one layer for use in semiconductor reactor chambers and the making thereof are described herein. Semiconductor etch and deposition reactors require reactor components having surfaces which have high resistance to corrosion and erosion by halogen containing plasmas necessary for processing. Additionally, chamber components must possess sufficient mechanical strength for handleability and use, in particular at large component. The sintered ceramic bodies as disclosed herein comprise at least one first layer having at least one crystalline phase of a ceramic material comprising YAG (yttrium aluminum oxide or yttrium aluminate) of formula $Y_3Al_5O_{12}$, having a garnet structure (with a composition comprising yttria and alumina in a ratio of about 3:5), spinel (magnesium aluminate spinel, $MgAl_2O_4$), and yttria and zirconia, wherein the zirconia is present in the yttria in an amount of not less than 10 mol % $ZrO_2$ and not greater than 25 mol % $ZrO_2$. These materials have excellent corrosion and erosion resistance. The use of these materials results in a semiconductor plasma processing chamber component having a surface which provides improved plasma resistance over other materials when subjected to halogen-based plasma etch and deposition conditions.

The sintered ceramic bodies as disclosed herein comprise preferably at least one first layer having at least one crystalline phase of a ceramic material comprising YAG (yttrium aluminum oxide or yttrium aluminate) of formula $Y_3Al_5O_{12}$, having a garnet structure (with a composition comprising yttria and alumina in a ratio of about 3:5).

The sintered ceramic bodies as disclosed herein comprise preferably at least one second layer comprising alumina and zirconia. The sintered ceramic bodies as disclosed herein comprise preferably at least one second layer comprising alumina and zirconia, whereby the amount of zirconia in the at least one second layer may vary from 10 to 20%, preferably from 12 to 18%, more preferably from 14 to 18%, more preferably from 14 to 18% and the balance comprising $Al_2O_3$. The amount of zirconia in the at least one second layer may be 16% and 84% of alumina. The sintered ceramic bodies as disclosed herein comprise preferably at least one second layer consisting essentially of alumina and zirconia.

The sintered ceramic bodies as disclosed herein may comprise the at least one first layer and the at least one second layer having a large dimension. The largest extension of the at least one first layer and of the at least one second layer may range from about 100 mm to about 625 mm, including 122 mm, 222 mm, 322 mm, and 522 mm. Further largest extensions of the at least one first layer and the at least one second layer may vary form 100 to about 625 mm, preferably from 100 to 622 mm, preferably from 200 to about 625 mm, preferably from 300 to about 625 mm, preferably from 400 to about 625 mm, preferably from 500 to about 625 mm, preferably from 300 to 622 mm, preferably from 400 to 622 mm, and preferably from 500 to 622 mm.

The at least one first and second layers have an absolute value of a difference in CTE in amounts of from 0 to $0.5 \times 10^{-6}$/° C., preferably from 0 to $0.45 \times 10^{-6}$/° C., preferably from 0 to $0.4 \times 10^{-6}$/° C., preferably from 0 to $0.35 \times 10^{-6}$/° C., preferably from 0 to $0.3 \times 10^{-6}$/° C., preferably from 0 to $0.25 \times 10^{-6}$/° C., preferably from 0 to $0.2 \times 10^{-6}$/° C., preferably from 0 to $0.15 \times 10^{-6}$/° C., preferably from 0 to $0.1 \times 10^{-6}$/° C., preferably from 0 to $0.08 \times 10^{-6}$/° C., preferably from 0 to $0.06 \times 10^{-6}$/° C., preferably from 0 to $0.04 \times 10^{-6}$/° C., preferably from 0 to $0.02 \times 10^{-6}$/° C., and preferably from 0 to $0.01 \times 10^{-6}$/° C.

The CTE of the at least first and second layers are measured in accordance with ASTM E228-17 across a temperature range of from ambient temperature to 1700° C. or across a temperature range of from 200 to 1400° C.

The CTE of the at least one first and second layers used for calculating each difference as set forth above are each measured across the same temperature range. The difference of the CTE of the at least one first and second layers are measured across the same temperature range.

The at least one first and the at least one second layer of the sintered ceramic bodies as disclosed herein may have respective CTEs which are the same, or substantially the same, in absolute value of CTE as mentioned above, across the complete temperature range of from ambient temperature to about 1700° C. or across a temperature range of from 200 to 1400° C.

On a percentage basis, combinations of the at least one first layer and the at least one second layer may have CTE values (across the temperature ranges as disclosed herein) which match one another in a percentage of 4% and less, preferably 3.5% and less, preferably 3% and less, preferably 2.5% and less, preferably 2% and less, preferably 1.5% and less, preferably 1% and less, preferably 0.5% and less, of the at least one first layer and the at least one second layer (as measured with respect to the at least one first layer).

The sintered ceramic bodies as disclosed herein comprises an interface layer or interface between the at least one first and second layers. The interface layer usually has a tortuosity and a non-linear interface so that the interface layer usually meanders between the at least one first and second layers. The tortuosity using the calculations as disclosed herein may be between 1.2 and 2.2, in particular between 1.4 and 2.0. The measurements for determining the tortuosity are described later below and are based on an increase in the interfacial length relative to the linear distance of the interface layer. Thus, disclosed herein is a multilayer sintered ceramic body having an interface defined by the at least one second layer and the at least one first layer wherein the interfacial length is increased by from 20 to 70%, preferably from 20 to 60%, preferably from 20 to 40%, preferably from 30 to 80%, preferably from 40 to 80%, preferably from 50 to 70%.

Correspondingly, the at least one second layer and the at least one first layer may contact one another at an interface commensurate in interfacial area to the greatest dimension of the multilayer sintered ceramic body along the interface layer.

For unitary, multilayer sintered bodies having greatest dimensions of from 100 to about 625 mm considering the above-mentioned tortuosity of at least 1.2, the at least one second layer and the at least one first layer contact one another at a nonlinear interface having an area of at least 113 cm$^2$, preferably of at least 452 cm$^2$, preferably at least 1,018 cm$^2$, and preferably at least 1,810 cm$^2$.

For unitary, multilayer sintered bodies having greatest dimensions of from 100 to about 625 mm considering the above-mentioned tortuosity of at least 1.4, the at least one second layer and the at least one first layer contact one another at a nonlinear interface having an area of at least 153 cm$^2$, preferably of at least 616 cm$^2$, preferably at least 1,386 cm$^2$, and preferably at least 2,464 cm$^2$.

For unitary, multilayer sintered bodies having greatest dimensions of from 100 to about 625 mm considering the above-mentioned tortuosity of at most 2.2, the at least one second layer and the at least one first layer contact one another at a nonlinear interface having an area of at most 15,085 cm$^2$, preferably of at most 14,850 cm$^2$, preferably at most 14,128 cm$^2$, preferably at most 9,802 cm$^2$, preferably at most 6,083 cm$^2$, preferably at most 3,421 cm$^2$, and preferably at most 1,520 cm$^2$.

For unitary, multilayer sintered bodies having greatest dimensions of from 100 to about 625 mm considering the above-mentioned tortuosity of at most 2.0, the at least one second layer and the at least one first layer contact one another at a nonlinear interface having an area of at most 12,468 cm$^2$, preferably of at most 12,272 cm$^2$, preferably at most 11,676 cm$^2$, preferably at most 7,852 cm$^2$, preferably at most 5,028 cm$^2$, preferably at most 2,828 cm$^2$, and preferably at most 1,256 cm$^2$.

For unitary, multilayer sintered bodies having greatest dimensions of from 100 to about 625 mm considering the above-mentioned tortuosity of at least 1.2, the at least one second layer and the at least one first layer contact one another at a nonlinear interface having an area of from 113 to about 4,488 cm$^2$, preferably from 113 to about 4,418 cm$^2$, preferably from 113 to 4,204 cm$^2$, preferably from 113 to 2,827 cm$^2$, preferably from 113 to 1,918 cm$^2$, preferably from 113 to 1,018 cm$^2$, preferably from 113 to 452 cm$^2$, preferably from 452 to about 4,488 cm$^2$, preferably from 452 to about 4,418 cm$^2$, preferably from 452 to 4,203 cm$^2$, preferably from 452 to 2,827 cm$^2$, preferably from 452 to 1,810 cm$^2$, preferably from 1,018 to about 4,418 cm$^2$, and preferably from 1,810 to 4,376 cm$^2$.

For unitary, multilayer sintered bodies having greatest dimensions of from 100 to about 625 mm considering the above-mentioned tortuosity of at least 1.4, the at least one second layer and the at least one first layer contact one another at a nonlinear interface having an area of from 153 to about 6,110 cm$^2$, preferably from 153 to about 6,013 cm$^2$, preferably from 153 to 5,722 cm$^2$, preferably from 153 to 3,847 cm$^2$, preferably from 153 to 2,464 cm$^2$, preferably from 153 to 1,386 cm$^2$, preferably from 153 to 616 cm$^2$, preferably from 616 to about 6,110 cm$^2$, preferably from 616 to about 6,013 cm$^2$, preferably from 616 to 5,722 cm$^2$, preferably from 616 to 3,847 cm$^2$, preferably from 616 to 2,464 cm$^2$, preferably from 1,386 to about 6,013 cm$^2$, and preferably from 2,464 to 5,957 cm$^2$.

For unitary, multilayer sintered bodies having greatest dimensions of from 100 to about 625 mm considering the above-mentioned tortuosity of at most 2.2, the at least one second layer and the at least one first layer contact one another at a nonlinear interface having an area of from 378 to about 15,085 cm$^2$, preferably from 378 to about 14,850 cm$^2$, preferably from 378 to 14,128 cm$^2$, preferably from 378 to 9,502 cm$^2$, preferably from 378 to 6,083 cm$^2$, preferably from 378 to 3,421 cm$^2$, preferably from 378 to 1,520 cm$^2$, preferably from 1,520 to about 15,085 cm$^2$, preferably from 1,520 to about 14,850 cm$^2$, preferably from 1,520 to 14,128 cm$^2$, preferably from 1,520 to 9,502 cm$^2$, preferably from 1,1520 to 6,083 cm$^2$, preferably from 3,421 to about 14,850 cm$^2$, and preferably from 6,083 to 14,710 cm$^2$.

For unitary, multilayer sintered bodies having greatest dimensions of from 100 to about 625 mm considering the above-mentioned tortuosity of at most 2.0, the at least one second layer and the at least one first layer contact one another at a nonlinear interface having an area of from 312 to about 12,468 cm$^2$, preferably from 312 to about 12,272 cm$^2$, preferably from 312 to 11,676 cm$^2$, preferably from 312 to 7,852 cm$^2$, preferably from 312 to 5,028 cm$^2$, preferably from 312 to 2,828 cm$^2$, preferably from 312 to 1,256 cm$^2$, preferably from 1,256 to about 12,468 cm$^2$, preferably from 1,256 to about 12,272 cm$^2$, preferably from 1,256 to 11,676 cm$^2$, preferably from 1,256 to 7,652 cm$^2$, preferably from 1,256 to 5,028 cm$^2$, preferably from 2,828 to about 12,272 cm$^2$, and preferably from 5,028 to 7,294 cm$^2$.

Figure 19:
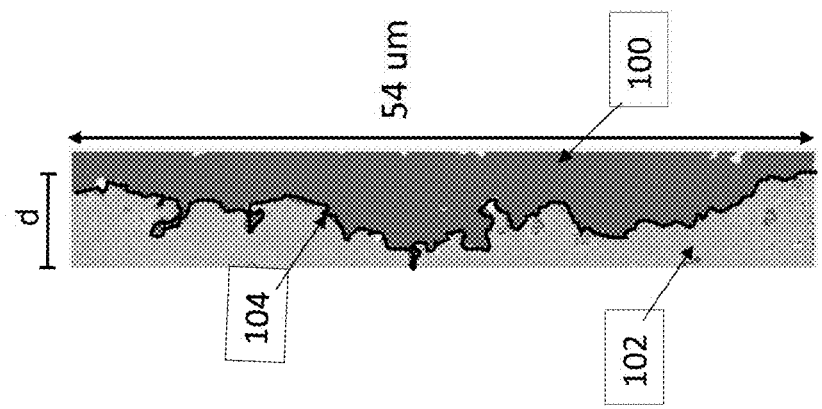
FIG. 19 a) depicts an SEM micrograph at 5000× of an interface 104 of the multilayer sintered ceramic body and b) illustrates measurement of the tortuosity (T) of the non-linear interface 104 according to embodiments as disclosed herein.
Figure 19:
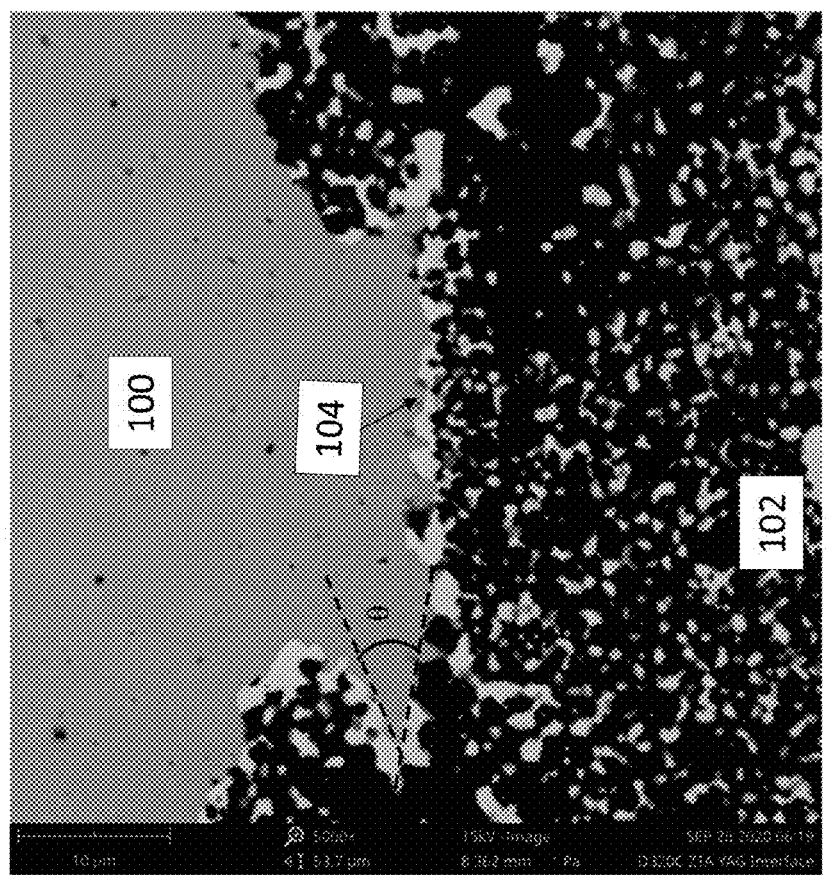

The width d of the interface layer set forth above is shown in FIG. 19 b) is discussed further below.

The width d of the interface layer as shown in FIG. 19 b) is usually 1 to 200 μm, in particular 5 to 100 μm, more particularly 10 to 50 μm, and even more particularly from 20 to 30 μm.

The volume of the first layer over the width d of the interface layer set forth above has pores with a maximum size of less than 5 μm, in particular of less than 3 μm, particularly of less than 1 μm.

The volume of the first layer over the width of the interface layer set forth above has in particular only pores with a maximum size of less than 5 μm, in particular of less than 3 μm, particularly of less than 1 μm.

The volume of the at least first layer in the width d as disclosed herein has a structure, whereby less than 0.2%, more preferably less than 0.15%, most preferably less than 0.1%, of the volume is taken up by the pores set forth above.

The volume of the second layer over the width of the interface layer set forth above has pores with a maximum size of less than 5 μm, in particular of less than 3 μm, particularly of less than 1 μm.

The volume of the second layer over the width of the interface layer set forth above has in particular only pores with a maximum size of less than 5 μm, in particular of less than 3 μm, particularly of less than 1 μm.

The volume of the at least second layer in the width d as disclosed herein has a structure, whereby less than 0.2%, more preferably less than 0.15%, most preferably less than 0.1%, of the volume is taken up by the pores set forth above.

The at least one first layer of the subject disclosure exhibits pores with a very low size, in the same range or the same as the at least one second layer.

The pore sizes in the volumes of the at least one first and the at least one second layers as set forth above are measured across samples through use of SEM images obtained from a Phenom XL scanning electron microscope at 1000× and 5000× magnification. Images were imported into ImageJ Software for analysis. ImageJ has been developed at the National Institute of Health (NIH), USA, and is a Java-based public domain image processing and analysis program for image processing of scientific multi-dimensional images. Use of semiautomatic and automatic image analysis methods for measuring grain size is described in ASTM standard E1382. Images having dimension 53.7 μm×53.7 μm were analyzed to determine the pore sizes present across the mentioned volumes.

The at least one first layer may have an average density of 98.5% and greater or 99.5% and greater with a variation in density of 5% or less, preferably 4% or less, preferably 3% or less, preferably 2% or less, preferably 1% or less, across the greatest dimension, whereby the greatest dimension may be for example about 625 mm and less, 622 mm and less, 610 mm and less, preferably 575 mm and less, preferably 525 mm and less, preferably from 100 to 625 mm, preferably from 100 to 622 mm, preferably from 100 to 575 mm, preferably from 200 to 625 mm, preferably from 200 to 510 mm, preferably from 400 to 625 mm, preferably from 500 to 625 mm. This density of the at least one first layer may be realized also in the width d of the interface layer as set forth above.

The at least one second layer as disclosed herein may have density of for example from between 98 to 100%, from between 99 to 100%, further between 99.5 to 100%.

The at least one first layer may have a porosity in a percent of total area in an amount of from 0.0005 to 2%, preferably from 0.0005 to 1%, preferably from 0.0005 to 0.5%, preferably from 0.0005 to 0.05%, preferably from 0.0005 to 0.03%, preferably from 0.0005 to 0.005%, preferably from 0.0005 to 0.003%, preferably from 0.0005 to 0.001%, preferably from 0.005 to 2%, preferably from 0.05 to 2%, preferably from 0.5 to 2%, preferably from 0.005 to 2%, preferably from 0.005 to 1%, preferably from 0.05 to 2%, preferably from 0.05 to 1%, and preferably from 0.5 to 2% as measured from SEM images and using ImageJ software and methods as disclosed herein.

The at least one second layer may have a volumetric porosity in amounts of from 0.1 to 2%, preferably from 0.1 to 1.5%, preferably from 0.1 to 1%, preferably from 0.1 to 0.5% in the sintered ceramic body.

The densities and porosities set forth above of the at least one first and second layers are in particular realized in their volumes surrounding the interface layer in the width d set forth above.

The combination of the feature of the CTE difference between the at least one first layer and the at least one second layer with the feature of the high density of the at least one first and at least one second layer surrounding the interface layer in the width d set forth above provides beneficial effects to the stability of the formed unitary body versus peeling and spalling of the top layer.

The combination of the feature of the CTE difference between the at least one first layer and the at least one second layer with the feature of the high density of the at least one first and at least one second layer surrounding the interface layer in the width d set forth above provides beneficial effects avoiding breakage, delamination and cracking.

That said, the feature of the CTE difference and the maximum pore sizes in the volumes anticipated to provide for enhanced adhesion between the at least first and the at least second layers.

Referring to an embodiment of FIG. 1, disclosed is a multilayer sintered ceramic body 98 having at least one first layer 100 having a plasma-facing surface 106 providing resistance to the corrosive and erosive effects of halogen based plasmas and ion bombardment, a controlled distribution of porosity at a small pore size, a high purity, high density, and a low surface roughness. Preferably, the at least one first layer 100 has a coefficient of thermal expansion (CTE) that is the same as, or substantially the same as, the CTE of the at least one second layer 102. Further, the multilayer sintered ceramic body 98 of the present disclosure comprises a non-linear interface 104 defined by the at least one first layer 100 and at least one second layer 102, whereby the non-linear interface may provide enhanced adhesion between the layers.

The at least one second layer 102 may have a range of compositions comprising zirconia and alumina. The at least one second layer 102 exhibits high mechanical strength, enhanced stiffness, high thermal conductivity, low dielectric loss and a coefficient of thermal expansion (CTE) which is the same as, or substantially the same as, the CTE of the at least one first layer 100. At least one first and second layers having CTE values within the ranges as disclosed herein provide for the preparation of multilayer sintered components of large dimension (from 100 mm to about 625 mm, including 122 mm, 222 mm, 322 mm, and 522 mm). Additionally, methods for the preparation of such a corrosion resistant, multilayer sintered ceramic and the use thereof in plasma processing chambers are disclosed.

In embodiment A, disclosed herein is a multilayer sintered ceramic body comprising at least one first layer comprising at least one crystalline phase of a ceramic material selected from the group consisting of YAG, magnesium aluminate spinel and yttria and zirconia wherein the zirconia is present in an amount of not less than 10 mol % and not greater than 25 mol %, and at least one second layer comprising alumina wherein the alumina comprises at least one of stabilized zirconia (SZ) and partially stabilized zirconia (PSZ), wherein an absolute value of the difference in coefficient of thermal expansion (CTE) between the at least one first layer and the at least one second layer is from 0 to $0.6 \times 10^{-6}/°$ C. (as measured in accordance with ASTM E228-17), wherein the at least one first layer and the at least one second layer form a unitary multilayer sintered ceramic body.

According to embodiment A, a multilayer, unitary sintered ceramic body may be formed from the at least one first and second layers having an absolute value of a difference in CTE in amounts of from 0 to $0.5 \times 10\text{-}6/°$ C., preferably from 0 to $0.45 \times 10\text{-}6/°$ C., preferably from 0 to $0.4 \times 10\text{-}6/°$ C., preferably from 0 to $0.35 \times 10\text{-}6/°$ C., preferably from 0 to $0.3 \times 10\text{-}6/°$ C., preferably from 0 to $0.25 \times 10\text{-}6/°$ C., preferably from 0 to $0.2 \times 10\text{-}6/°$ C., preferably from 0 to $0.15 \times 10\text{-}6/°$ C., preferably from 0 to $0.1 \times 10\text{-}6/°$ C., preferably from 0 to $0.08 \times 10\text{-}6/°$ C., preferably from 0 to $0.06 \times 10\text{-}6/°$ C., preferably from 0 to $0.04 \times 10\text{-}6/°$ C., preferably from 0 to $0.02 \times 10\text{-}6/°$ C., and preferably from 0 to $0.01 \times 10\text{-}6/°$ C. When the CTE between the at least one first layer 100 and the at least one second layer 102 varies within these ranges, and more specifically when the CTE between the at least one first layer 100 and the at least one second layer 102 varies within these ranges across a temperature range of from about 200° C. to about 1400° C. as measured in accordance with ASTM E228-171, a unitary multilayer sintered ceramic body, in particular one of large (>100 mm to about 625 mm) dimension, having high strength and high adhesion between layers may be formed using the pressure-assisted methods as disclosed herein. Due to the isotropic properties of the ceramic materials comprising the at least one first and second layers as disclosed herein, the coefficient of thermal expansion (CTE) as used herein may refer to either linear or volumetric CTEs interchangeably. It is preferable that the CTE difference between the at least one first layer 100 and the at least one second layer 102 is minimized in order to reduce interfacial stresses between layers. CTE differences between the at least one first layer 100 and the at least one second layer 102 which are greater than those as disclosed herein may lead to fracture and/or cracking.

FIG. 1 depicts a schematic of the multilayer sintered ceramic body 98 as disclosed herein where 100 represents at least one first layer having a thickness d1, and 102 illustrates at least one second layer 102 having a thickness d2. In preferred embodiments, d2 may comprise from about 75% to 98% of the total thickness (d1+d2). Stresses arising from CTE mismatching may impact the mechanical strength and integrity of the multi-layer sintered ceramic body. Accordingly, if the difference in absolute value of the CTE between the at least one first layer 100 and the at least one second layer 102 of the sintered ceramic body is too great, the at least one layer of the multilayer sintered ceramic body may crack and/or fracture upon performing the steps of the method as disclosed herein. This CTE difference is important across all process temperatures, and in particular at elevated temperatures such as those experienced during sintering, annealing and in particular upon cooling, where differences in CTE may result in significant interfacial stresses during cooling between layers of the sintered body. As a result, in order to form a multilayer, unitary sintered ceramic body having high mechanical strength, high adhesion strength between layers and sufficient handleability (without cracking or breakage), the CTE difference between the at least one first layer 100 and the at least one second layer 102 of the multi-layer sintered ceramic body is preferred to be within the disclosed ranges, and further as closely matching as possible. In preferred embodiments at least one first and second layers may have respective CTEs which are the same, or substantially the same, in absolute value of CTE, across a temperature range of from ambient temperature (or about 200° C. as disclosed in the figures) to about 1700° C. in accordance with the method as disclosed (or at least to 1400° C. as depicted in the figures). The term "CTE match" as used herein refers to combinations of the at least one first layer 100 and the at least one second layer 102 which differ in CTE within the preferred ranges as disclosed (from 0 to about $0.6\times10^{-6}$/° C.). In embodiment A, the at least one first layer 100 may comprise at least one crystalline phase of a ceramic material selected from the group consisting of YAG, magnesium aluminate spinel, and yttria and zirconia, wherein the zirconia is present in an amount of not less than 10 mol % $ZrO_2$ and not greater than 25 mol % $ZrO_2$, whereby the at least one first layer 100 is CTE matched to the at least one second layer 102 (comprising alumina and at least one of stabilized and partially stabilized zirconia) to form a unitary, multilayer sintered ceramic body. On a percentage basis, combinations of the at least one first layer 100 and the at least one second layer 102 may have CTE values (across the temperature ranges as disclosed herein) which match one another in a percentage of 4% and less, preferably 3.5% and less, preferably 3% and less, preferably 2.5% and less, preferably 2% and less, preferably 1.5% and less, preferably 1% and less, preferably 0.5% and less, of the at least one first layer 100 and the at least one second layer 102 (as measured with respect to the at least one first layer 100).

Figure 2:
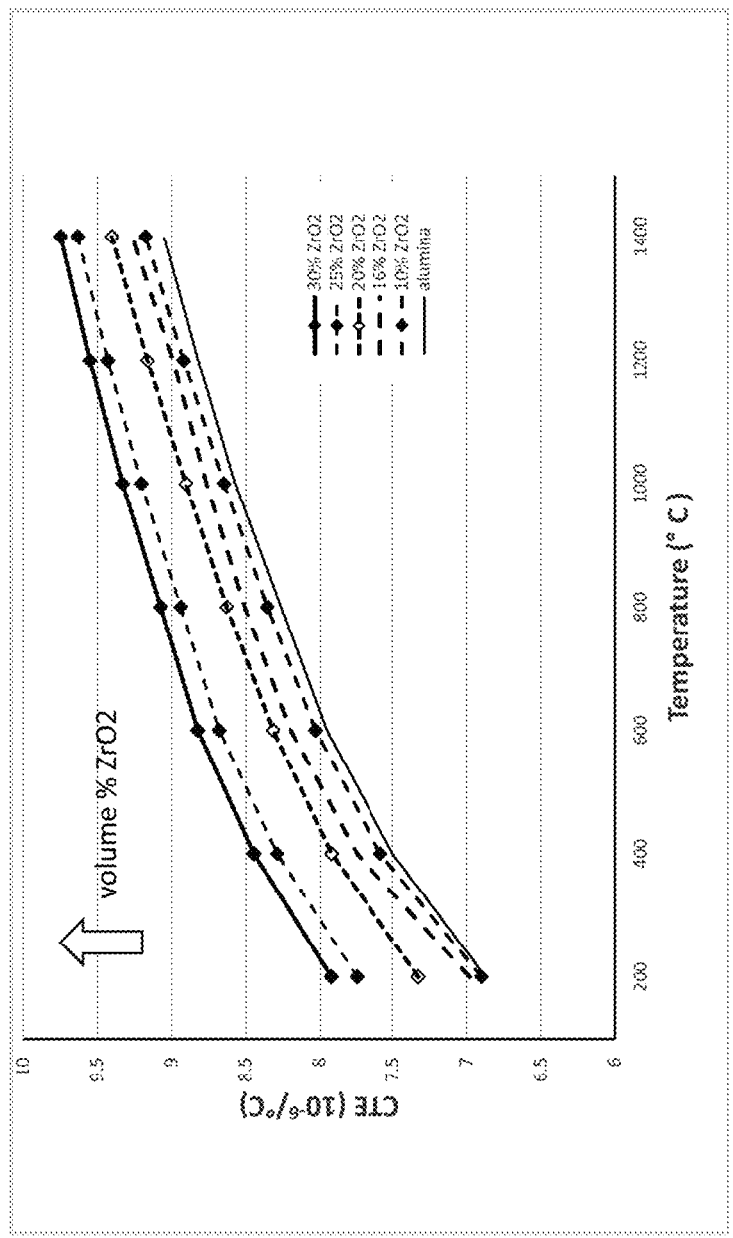
FIG. 2 illustrates variation in CTE for the at least one second layer 102 having zirconia in amounts from 10% to 30% by volume, according to embodiments as disclosed herein.

Compositions of the at least one second layer 102 may be tailored to produce specific CTE characteristics based upon the volume % of zirconia in alumina as depicted in FIG. 2, which shows CTE results of the at least one second layer 102 as disclosed herein wherein the second layer comprises zirconia in amounts from 10 to 30% by volume and the balance comprising $Al_2O_3$. The amount of zirconia, and the resultant CTE values, are preferably CTE matched with the corrosion resistant, at least one first layer 100 across a temperature range corresponding to that of the method, of from ambient temperature (or 200° C. in accordance with the figures) to 1700° C. (or 1400° C. in accordance with the figures) to fabricate the unitary, multilayer sintered bodies as disclosed herein. According to embodiment A, the at least one second layer 102 may comprise alumina wherein the alumina comprises at least one of stabilized zirconia and partially stabilized zirconia in an amount by volume of from 10 to 25%, preferably from 12 to 25%, preferably from 15 to 25%, preferably from 17 to 25%, preferably from 10 to 22%, preferably from 10 to 20%, preferably from 10 to 17%, preferably from 15 to 21%, and preferably from 16 to 20% relative to a volume of the at least one second layer (and the balance comprising $Al_2O_3$). In accordance with FIG. 2, across this compositional and temperature range, the coefficient of thermal expansion (CTE) of the at least one second layer 102 may vary from an at least one second layer 102 comprising 10% by volume of zirconia, having a CTE of $6.88\times10^{-6}$/° C. as measured at 200° C., to an at least one second layer 102 comprising 25% by volume of zirconia and having a CTE of $9.63\times10^{-6}$/° C. as measured at 1400° C. The volumetric amount of at least one of stabilized or partially stabilized zirconia in the at least one second layer 102 provides the ability to adjust the CTE to be the same as, or substantially the same as, and within the disclosed CTE matching ranges, as that of the at least one first layer 100. Referring to FIG. 2, experimental data was taken to measure the coefficient of thermal expansion (CTE) of the at least one second layer 102 using dilatometry methods as performed in accordance with ASTM E228-17 for 10, 16 and 20 vol % $ZrO_2$ (and the balance alumina) compositions. An exemplary at least one second layer 102 comprising about 16% by volume of zirconia was measured to have a coefficient of thermal expansion (CTE) of from $6.98\times10^{-6}$/° C. to $9.26\times10^{-6}$/° C. throughout a temperature range of from about 200° C. to about 1400° C. as measured in accordance with ASTM E228-17. The at least one second layer 102 comprises at least two separate crystalline phases of zirconia and alumina (referred to herein as a composite oxide or particulate composite or a zirconia, dispersion-toughened alumina, ZTA) as illustrated from x ray diffraction results of FIG. 3, thus the volumetric mixing rule as known to those skilled in the art was used to calculate CTE values for 25% and 30% by volume of zirconia (as depicted in FIG. 2). The ability to modify the CTE characteristics of the at least one second layer 102 provides CTE matching between the at least one second layer 102 and the at least one first layer 100 in particular across a temperature range consistent with that of the method and sintering temperatures as disclosed herein. Selection of compositions of the at least one second layer 102 enables use of a variety of materials, without limitation, for the at least one first layer 100 having a CTE which is the same as, or substantially the same as that of the second layer 102 within the ranges as disclosed herein. In some embodiments, across the disclosed temperature range (from ambient to about 1700° C., or from 200° C. to 1400° C. as illustrated in the figures), the CTE of the at least one second layer 102 may be both greater and less than the CTE of the at least one first layer 100, thereby having a CTE difference of zero across the temperature range. In other embodiments, across the disclosed temperature range (from ambient to about 1700° C., or from 200° C. to 1400° C. as illustrated in the figures), the CTE of the at least one second layer 102 may be either greater or less than the CTE of the at least one first layer 100, and as such, the absolute value of the difference in coefficient of thermal expansion (CTE) between the at least one first layer 100 and the at least one second layer 102 may be from $0.003 \times 10\text{-}6/°$ C. to $0.6 \times 10\text{-}6/°$ C., preferably from $0.003 \times 10\text{-}6/°$ C. to $0.5 \times 10\text{-}6/°$ C., preferably from $0.003 \times 10\text{-}6/°$ C. to $0.45 \times 10\text{-}6/°$ C., preferably from $0.003 \times 10\text{-}6/°$ C. to $0.4 \times 10\text{-}6/°$ C., preferably from $0.003 \times 10\text{-}6/°$ C. to $0.35 \times 10\text{-}6/°$ C., preferably from $0.003 \times 10\text{-}6/°$ C. to $0.3 \times 10\text{-}6/°$ C., preferably from $0.003 \times 10\text{-}6/°$ C. to $0.25 \times 10\text{-}6/°$ C., preferably from $0.003 \times 10\text{-}6/°$ C. to $0.2 \times 10\text{-}6/°$ C., preferably from $0.003 \times 10\text{-}6/°$ C. to $0.15 \times 10\text{-}6/°$ C., preferably from $0.003 \times 10\text{-}6/°$ C. to $0.1 \times 10\text{-}6/°$ C., preferably from $0.003 \times 10\text{-}6/°$ C. to $0.08 \times 10\text{-}6/°$ C., preferably from $0.003 \times 10\text{-}6/°$ C. to $0.06 \times 10\text{-}6/°$ C., preferably from $0.003 \times 10\text{-}6/°$ C. to $0.04 \times 10\text{-}6/°$ C., preferably from $0.003 \times 10\text{-}6/°$ C. to $0.02 \times 10\text{-}6/°$ C., and preferably from $0.003 \times 10\text{-}6/°$ C. to $0.01 \times 10\text{-}6/°$ C. as measured in accordance with ASTM E228-17.

In addition to CTE matching, the multilayer sintered ceramic bodies preferably have high thermal conductivity for use as components in semiconductor plasma processing chambers. Zirconia toughened alumina (ZTA) compositions selected for use as the at least one second layer 102 will significantly impact properties of the unitary, multilayer sintered bodies. High thermal conductivity of the at least one second layer 102 is an important material property to effectively distribute heat and thereby avoid localized overheating within the at least one second layer during use. This localized overheating may result in cracking or fracture of the unitary, multilayer sintered body. Zirconia is reported in the literature to have a lower thermal conductivity than that of alumina, thus the amount of zirconia will affect the thermal conductivity of the at least one second layer 102. Although pure aluminum oxide is known to have a high thermal conductivity, the mismatch in CTE precludes it's use in combination with the materials for use as at least one first layer 100 as disclosed herein. While there may be no practical lower limit to the minimum amount of zirconia in the at least one second layer 102 for thermal conductivity reasons, in order to provide CTE matching to the at least one first layer 100 as well as high thermal conductivity (about the same as that of alumina), at least one second layer 102 comprising at least one of stabilized zirconia and partially stabilized zirconia in an amount of about 10% by volume and greater (with the balance comprising a second crystalline phase of about 90% by volume alumina) may be preferable.

In order to provide at least one second layer 102 having thermal conductivity sufficient for use for example in high frequency applications (such as an RF or dielectric window or lid component), the at least one second layer 102 having up to and including about 30% by volume, and in some embodiments preferably not greater than 25% by volume of zirconia may be preferable. A second layer 102 having greater than about 30% by volume of zirconia may not provide sufficient thermal conductivity for use as components in semiconductor plasma processing chambers for which high thermal conductivity is a requirement. Compositions of the at least one second layer 102 having greater than about 30% by volume of zirconia may result in high thermal gradients within the at least one second layer 102 and may lead to fracture and/or cracking.

High toughness values of the at least one second layer 102 are preferable to increase handleability and prevent fracture and/or cracking in the multilayer sintered ceramic body. To enhance toughness of the at least one second layer 102, toughening and/or stabilization of the at least one second layer is preferable. Without intending to be bound by any particular theory, the toughening and stabilization mechanisms as disclosed herein may serve the purpose of stabilization of the tetragonal crystalline phase of zirconia, thereby preventing transformation (at lower temperatures) into the less favorable, monoclinic crystalline phase which is accompanied by low sintered strengths and a large change in volume of about 4.5%, making the monoclinic form of zirconia unsuitable for use. Stabilization of zirconia may be achieved by any stabilization method as known to those skilled in the art, without limitation.

The combination of zirconia and alumina in the at least one second layer may provide a dispersion-toughening effect by fine scale dispersion of tetragonal zirconia particles in an alumina matrix as disclosed herein. In embodiments, the at least one second layer 102 may comprise a particle composite (also referred to herein as a composite oxide or ZTA, representing a dispersion-toughened ceramic) of the crystalline phases of zirconia and alumina in the amounts by volume as disclosed. This method of toughening may be affected by particle size, shape and location of the tetragonal, dispersed zirconia phase in the alumina matrix.

A further method for stabilization utilizes stabilizing compounds, such as yttria, calcia, lanthanum oxide ($La_2O_3$), ceria, samaria ($Sm_2O_3$) and magnesia, and combinations thereof in varying, relatively low molar amounts to stabilize zirconia in the cubic or tetragonal crystalline phases. The relative amounts of these stabilizing compounds may produce a ZTA comprising the at least one second layer 102 which may be fully stabilized (SZ) or partially stabilized (PSZ). Table 1 following depicts the stabilizing compounds and their molar amounts to produce stabilized and/or partially stabilized zirconia.

TABLE 1

|  | PS (mol %) | S (mol %) |
| --- | --- | --- |
| $Y_2O_3$ | 1 to 8 | 8 to 40 |
| CaO | 1 to 15 | 16 to 30 |
| $CeO_2$ | 1 to 15 | 16 to 40 |
| MgO | 1 to 15 | 16 to 40 |
| $Sm_2O_3$ | 1 to 8 | 8 to 40 |
| $La_2O_3$ | 1 to 8 | 8 to 40 |

Figure 3:
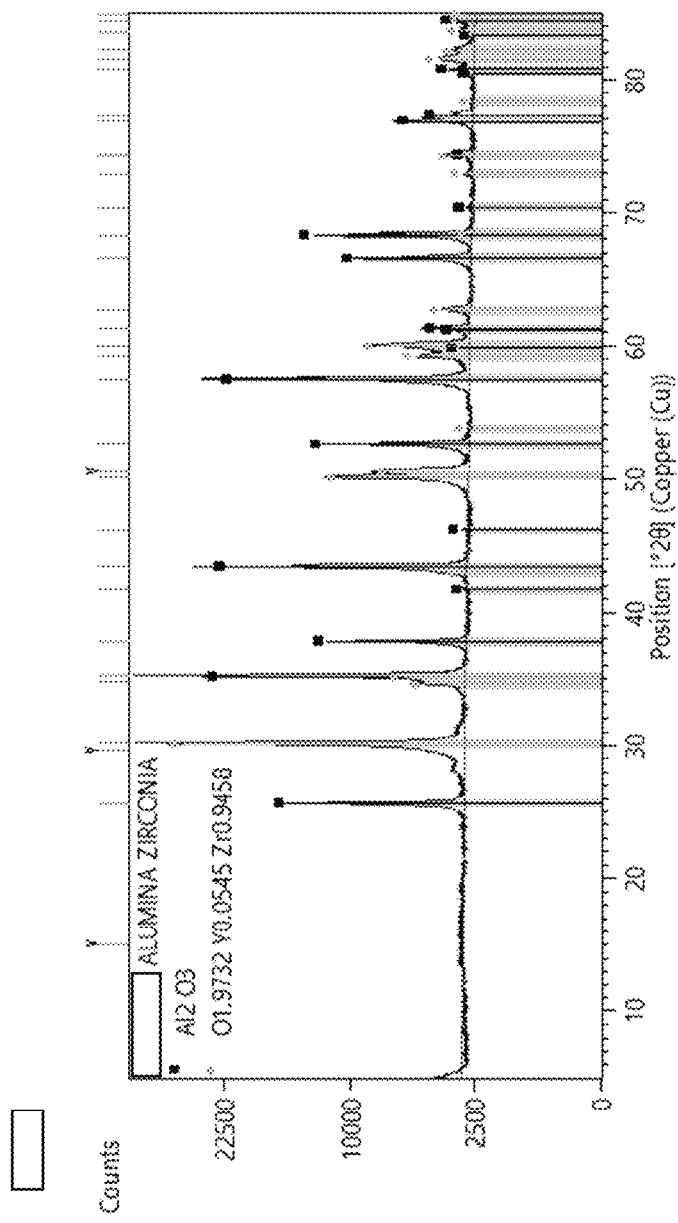
FIG. 3 illustrates x ray diffraction results of the at least one second layer according to embodiments as disclosed herein.

In embodiments, the ZTA particle composite may comprise particles or grains of zirconia (PSZ, SZ and combinations thereof) dispersed in a host matrix of alumina wherein the particle composite (composite oxide) comprises two separate crystalline phases of alumina and zirconia. Preferably, the at least one second layer 102 does not form a solid solution. Formation of a solid solution may degrade thermal conductivity and as such the at least one second layer 102 comprises separate crystalline phases of zirconia and alumina. FIG. 3 depicts separate crystalline phases of zirconia and alumina from x ray diffraction results, confirming the at least one second layer 102 comprises separate crystalline phases, without formation of a solid solution. X ray diffraction for all measurements as disclosed herein was performed using a PANanlytical Aeris model XRD capable of crystalline phase identification to about +/−5%. Small amounts of yttria present in the x-ray diffraction pattern of FIG. 3 may result from the stabilization of zirconia.

Further, use within the at least one second layer 102 of those compounds known to form glasses (such as magnesia, silica and calcia) as sintering aids may result in a low thermal conductivity, glassy phase present between grains, thus adversely affecting thermal conductivity. As a result, in some embodiments, it is preferred that the at least one second layer 102 comprises magnesia and/or calcia in the ranges of from about 2 to 100 ppm, preferably from about 2 to 75 ppm, preferably from about 2 to 50 ppm, preferably from about 2 to 25 ppm, preferably from about 2 to 20 ppm, preferably from about 2 to 10 ppm, preferably about 8 ppm relative to the mass of the second layer as measured using ICPMS methods. In further embodiments, the at least one second layer 102 may comprise silica in an amount of from about 14 ppm to 100 ppm, preferably from about 14 ppm to about 75 ppm, more preferably from about 14 ppm to about 50 ppm, preferably from about 14 ppm to about 30 ppm preferably about 14 ppm (as measured using ICPMS methods), relative to a mass of the at least one second layer 102. A second layer 102 comprising sintering aids within the disclosed ranges may provide a multilayer sintered ceramic body which is free of, or substantially free of, a glassy phase, providing high thermal conductivity in the multilayer sintered ceramic body.

Thermal conductivity was calculated from thermal diffusivity measurements which were performed in accordance with ASTM E1461-1. In embodiments, the at least one second layer 102 comprising about 16% by volume of zirconia was calculated to have a thermal conductivity at ambient temperature of about 25 W/m-K, and a thermal conductivity of about 14 W/m-K at 200° C. As such, the at least one second layer 102 preferably comprises zirconia in amounts by volume of from about 10 to about 25% relative to a volume of the at least one second layer 102 to provide thermal conductivity sufficient for use as for example a dielectric or RF window or lid and other components in plasma processing chambers as disclosed herein requiring high thermal conductivity.

In order to further prevent localized hot spots and overheating during use, in particular for RF applications, a low dielectric loss is preferable. Dielectric loss may be affected by such material properties as grain size and presence of impurities, sintering aids and/or dopants for example. The presence of impurities and/or sintering aids and/or dopants, such as in particular silica in the at least one second layer 102 may result in a higher dielectric loss. The use of highly pure/low impurity content starting powders and a method that preserves the purity results in an at least one second layer 102 of high total purity and correspondingly low in total impurity content. As such, in embodiments, the at least one second layer 102 as disclosed may have a total impurity content of from 5 to 200 ppm, preferably from 5 to 150 ppm, preferably less than 100 ppm, preferably less than 50 ppm, preferably less than 25 ppm, preferably less than 15 ppm, preferably from 10 to 100 ppm, preferably from 10 to 80 ppm, preferably from 10 to 60 ppm, preferably from 10 to 40 ppm, preferably from 20 to 80 ppm, preferably from 30 to 60 ppm relative to the mass of the at least one second layer as measured using ICPMS methods. In embodiments, the at least one second layer 102 is formed from a calcined powder mixture which comprises silica in amounts of from about 14 to 100 ppm, preferably from about 14 to 75 ppm, preferably from about 14 to 50 ppm, preferably from about 14 to 25 ppm, preferably about 14 ppm relative to total mass of the calcined powder mixture. In embodiments, the at least one second layer 102 may comprise magnesia (MgO) in an amount of from about 2 to 100 ppm, preferably from about 2 to 75 ppm, preferably from about 2 to 50 ppm, preferably from about 2 to 25 ppm, preferably from about 2 to 20 ppm, preferably from about 2 to 10 ppm, and preferably about 8 ppm relative to a mass of the at least one second layer 102 as measured using ICPMS methods.

The total impurity content of the at least one second layer 102, comprising calcia, silica and magnesia in the amounts as disclosed herein, provides the at least one second layer 102 having a dielectric loss of less than $0.7 \times 10^{-4}$ at a frequency of 1 MHz at ambient temperature as measured in accordance with ASTM D150, as listed in Table 3. In embodiments, the at least one second layer 102 is free of, or substantially free of, dopants and/or sintering aids as disclosed herein. The term "free of" as used herein with respect to levels of dopants, sintering aids and other compounds indicates their presence in an amount of about 2 ppm and less as determined by ICPMS methods as disclosed herein. The at least one second layer 102 as disclosed herein provides low dielectric loss suitable for use as a chamber component, in particular as components for use in high frequency, RF plasma processing chambers.

Plasma processing chambers for fabrication of semiconductor devices are designed to accommodate substrates having ever-increasing diameters which correspondingly require chamber components of large dimension. These chamber components, fabricated from the multilayer sintered ceramic body disclosed herein, may have a greatest dimension of for example from 100 to about 625 mm, preferably from 100 to 622 mm, preferably from 200 to about 625 mm, preferably from 300 to about 625 mm, preferably from 400 to about 625 mm, preferably from 500 to about 625 mm, preferably from 300 to 622 mm, preferably from 400 to 622 mm, and preferably from 500 to 622 mm. A number of materials which provide resistance to corrosion and erosion are known to be difficult to sinter, resulting in low densities and correspondingly low sintering strengths which may result in breakage or cracking. This makes fabrication of large, monolithic solid body components from these corrosion resistant materials challenging and, in many instances, not viable. Thus, there is a need for a high strength material forming the at least one second layer 102 (compatible with the corrosion resistant materials as disclosed herein) to enable fabrication of large size chamber components. The at least one second layer 102 provides mechanical strength and stiffness to the unitary multilayer corrosion resistant sintered bodies as disclosed herein. The at least one second layer 102 may be sintered to a very high density, and in embodiments sintered to a fully dense body, which provides the mechanical strength and stiffness necessary for fabrication of multilayer sintered bodies of large dimension, the multilayer sintered bodies having a greatest dimension of for example from 100 to about 625 mm, preferably from 100 to 622 mm, preferably from 200 to about 625 mm, preferably from 300 to about 625 mm, preferably from 400 to about 625 mm, preferably from 500 to about 625 mm, preferably from 300 to 622 mm, preferably from 400 to 622 mm, and preferably from 500 to 622 mm. Density measurements were performed in accordance with ASTM B962-17 for sintered bodies having zirconia in amounts from 10 to 16 volume %, and the volumetric mixing rule was used to calculate densities for those at least one second layers having 20 and 25% zirconia. Table 2 lists densities of the at least one second layers comprising crystalline phases of zirconia and alumina as disclosed herein.

TABLE 2

| Vol %<br>ZrO2 | Vol %<br>Al2O3 | Average<br>Density<br>(g/cc) | %<br>Theoretical<br>Density | %<br>Volumetric<br>Porosity |
|---|---|---|---|---|
| 10 | 90 | 4.19 | 100 | 0 |
| 12 | 88 | 4.23 | 99.9 | 0.12 |
| 12 | 88 | 4.22 | 99.8 | 0.21 |
| 12 | 88 | 4.20 | 99.2 | 0.83 |
| 16 | 84 | 4.32 | 100 | 0 |
| 20 | 80 | 4.36 | 99 | <1 |
| 25 | 75 | 4.46 | 99 | <1 |

Zirconia is reported to have a theoretical density of 6.09 g/cc, while alumina is reported to have a theoretical density of 3.98 g/cc. The theoretical density of the at least one second phase 102 was calculated (using these density values and the volume fraction of the respective crystalline phases of zirconia and alumina) in accordance with the volumetric mixing rule as known to those skilled in the art. Very high densities (from 99 to 100% of the theoretical density) were measured for embodiments of the at least one second layer 102 as disclosed in Table 2. An at least one second layer 102 comprising zirconia in an amount of about 16% by volume (and the balance alumina) as disclosed herein was measured to have a density of about 4.32 g/cc as measured in accordance with ASTM B962-17. These high densities provide mechanical strength and stiffness (Young's modulus) sufficient for formation of unitary, multilayer sintered bodies of large dimension, up to and including about 625 mm greatest dimension.

At least one second layer 102 comprising zirconia in an amount of about 16% by volume (and the balance alumina) as disclosed herein was tested in four-point flexural testing in accordance with ASTM standard C 1161-3, "Standard Test Method for Flexural Strength of Advanced Ceramics at Ambient Temperature" to determine the flexural strength. Four-point bend testing is preferable over three-point bend testing as it exposes a larger volume of the sample to a uniform, maximum stress, and thus yields strengths which are more representative of the material under test. Three-point bend testing exposes a comparatively smaller volume of the sample to maximum stresses, and as such, reported 3 point flexural test strength values are often higher. As such, comparison between 3 and 4 point flexural testing poses challenges due to significant variations in their measurement setup and methods. Using ASTM standard C 1161-3, very high strength values were achieved in a four-point bend configuration for the at least one second layer 102 comprising 16 volume % zirconia. Table 3 lists material properties for an at least one layer 102 comprising about 16% $ZrO_2$ in an alumina matrix.

During use in semiconductor reactors under vacuum conditions, corrosion resistant, multilayer components fabricated from the multilayer sintered ceramic bodies as disclosed herein may be subjected to a bending stress across component dimensions in excess of 500 mm. The properties of high strength and increased stiffness/young's modulus may be necessary for application of the materials for use as components as disclosed herein to large scale etch and/or deposition chambers. The flexural strength of 98% dense aluminum oxide is reported to be about 375 MPa, and the stiffness (modulus of elasticity/Young's modulus) is reported at about 350 GPa (Coorstek Advanced Alumina datasheet, available online). The at least one second layer 102 as disclosed herein may provide mechanical strength and stiffness/Young's modulus about the same as, or exceeding that of, alumina while providing the required CTE matching to the at least one first layer 100. Use of at least one second layer 102 as disclosed herein may significantly enhance flexural strength and rigidity of the unitary, multilayer components fabricated from the multilayer sintered ceramic bodies to enable the making of large (>100 to 200 mm dimension) components having both high strength, high stiffness and resistance to halogen-based corrosion and erosion as necessary for use in semiconductor plasma processing chambers.

TABLE 3

| Material Property | Test Method | Units | Aluminum Zirconium Oxide |
|---|---|---|---|
| Theoretical Density | ASTM B962-17 | g/cc | 4.3 |
| Typical Measured Density | ASTM C 20 | g/cc | >4.2 |
| Largest Pore Size (d90) | SEM/ImageJ | µm | <5 |
| Bulk Purity | ICP-MS | % | >99.99 |
| Grain Size-Average | Line intercept/<br>ASTM E112-2010 | µm | 1 to 3 |
| Grain Size-Max | Line intercept/<br>ASTM E112-2010 | µm | 5 |
| 4pt Flexural Strength (MOR) | ASTM C1161 | MPa | 575 |
| Young's Modulus | ASTM 1259-15 | GPa | 358 |
| Vickers Hardness | ASTM C1327 | GPa | 20 |
| Fracture Toughness | Indention Method | MPa-$m^{1/2}$ | 4.2 |
| Thermal Conductivity 20° C. | ASTM E1461-13 | W/(m-K) | 25 |
| Thermal Conductivity 200° C. | ASTM E1461-13 | W/(m-K) | 14 |
| C.T.E. (RT-200C) | ASTM E228-17 | $\times 10^{-6}/°$ C. | 7.1 |
| Volume Resistivity 200° C. | ASTM D257 | ohm-cm | >1.0E+12 |
| Dielectric Constant @ 1 MHz | ASTM D150 | — | 12 |
| Dielectric loss @ 1 MHz | ASTM D150 | — | <0.0007 |

By selection of materials for the at least one first layer 100 and the at least one second layer 102 having an absolute value of the difference in CTE of the layers of $0.6 \times 10^{-6}/°$ C. and less, preferably $0.55 \times 10^{-6}/°$ C. and less, preferably $0.5 \times 10^{-6}/°$ C. and less and within the ranges as disclosed herein, across a temperature range of from ambient to sintering and annealing temperatures, a unitary, multilayer sintered ceramic body 98 having high strength and stiffness, corrosion resistance and preferable dielectric and thermal properties as disclosed herein may be formed.

Figure 4:
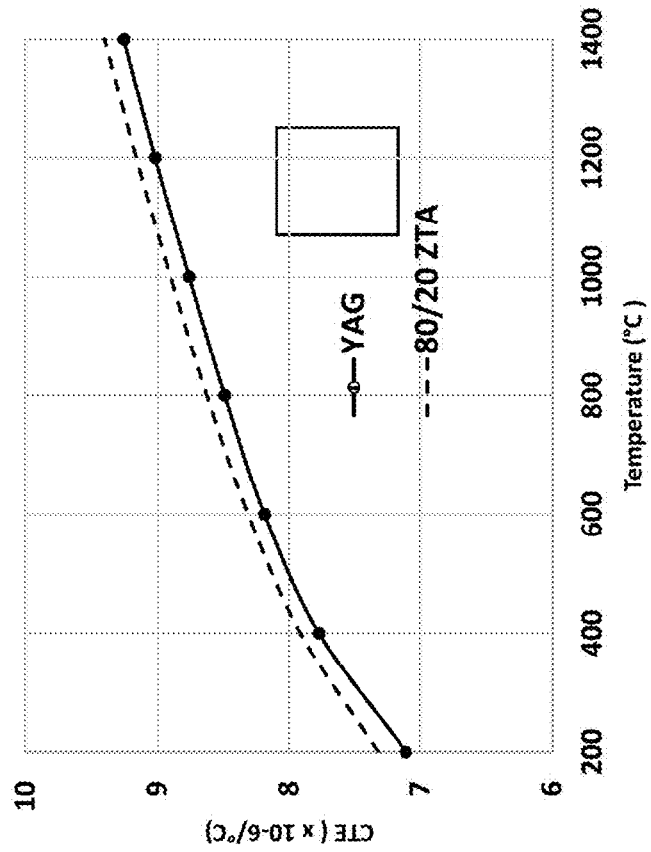
FIGS. 4 a), b) and c) depict variation in CTE of a multilayer sintered ceramic body comprising at least one first layer comprising YAG and compositions of at least one second zta layer according to embodiments as disclosed herein.
Figure 4:
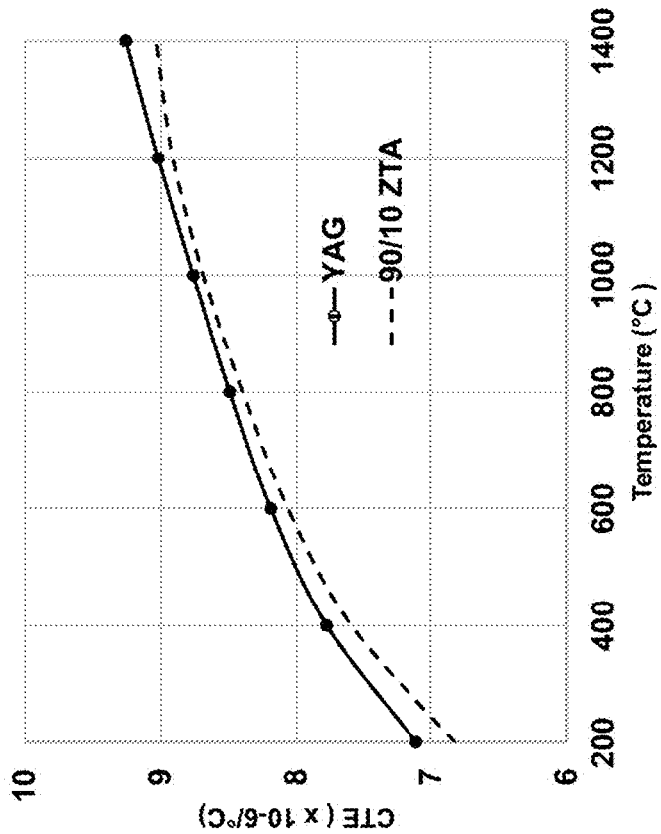
Figure 4:
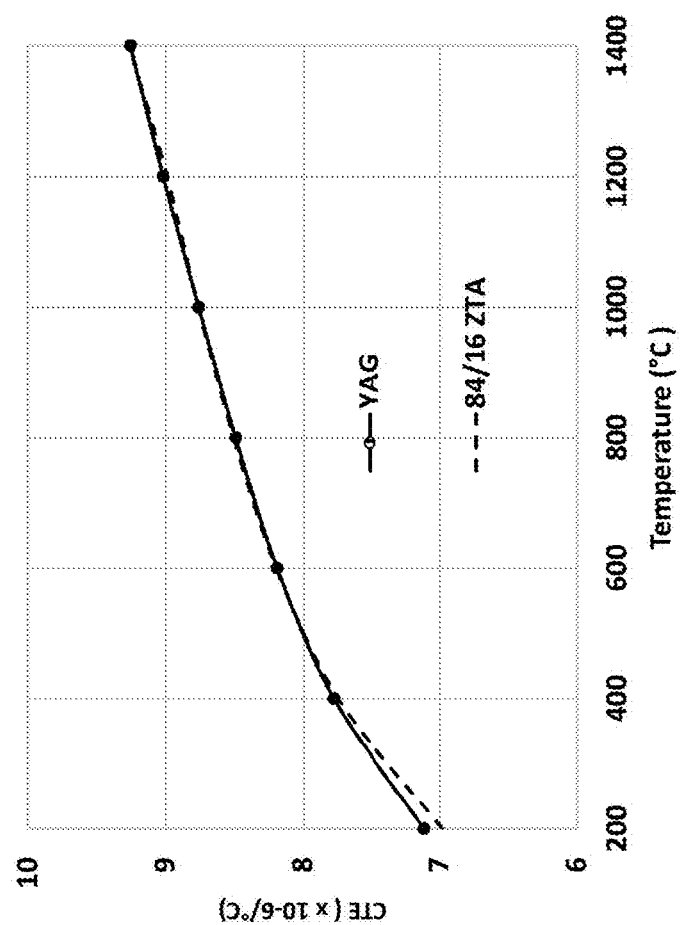

According to another embodiment referred to herein as embodiment B, disclosed is a unitary, multilayer sintered ceramic body comprising at least one first layer comprising polycrystalline YAG and at least one second layer comprising alumina wherein the alumina comprises at least one of stabilized zirconia and partially stabilized zirconia, wherein an absolute value of the difference in coefficient of thermal expansion (CTE) between the at least one first layer and the at least one second layer is from 0 to 0.6×10-6/° C., preferably from 0 to 0.5×10-6/° C., preferably from 0 to 0.45×10-6/° C., preferably from 0 to $0.4 \times 10^{-6}/°$ C., preferably from 0 to 0.35×10-6/° C., preferably from 0 to 0.3× 10-6/° C., preferably from 0 to 0.25×10-6/° C., preferably from 0 to 0.2×10-6/° C., preferably from 0 to $0.15 \times 10^{-6}/°$ C., preferably from 0 to 0.1×10-6/° C., preferably from 0 to 0.08×10-6/° C., preferably from 0 to 0.06×10-6/° C., preferably from 0 to 0.04×10-6/° C., preferably from 0 to 0.02×10-6/° C., at least one second layers preferably from 0 to 0.01×10-6/° C. (as measured in accordance with ASTM E228-17) wherein the at least one first layer and the at least one second layer form a unitary multilayer sintered ceramic body. In accordance with embodiment B, the at least one first layer may further comprise at least one crystalline phase of YAP (yttrium aluminum perovskite), YAM (yttrium aluminum monoclinic), yttria, alumina and combinations thereof present in amounts of less than 5% by volume. Each of the crystalline phases of YAG, YAP and YAM are preferably polycrystalline. FIGS. 4 a), b) and c) illustrate CTE measurements across a temperature of from 200 to 1400° C. of exemplary materials for forming at least one first and second layers of the unitary, multilayer sintered ceramic bodies according to embodiment B. All CTE measurements as disclosed herein were performed in accordance with ASTM E228-17. CTE measurements were performed on exemplary, bulk materials (without formation of layers). FIG. 4 a) depicts a polycrystalline YAG first layer 100 (solid line) and second layer (ZTA, dashed line) 102 comprising about 10% by volume of at least one of stabilized and partially stabilized zirconia and the balance (90% by volume) alumina relative to a total volume of the at least one second layer. FIG. 4 b) depicts a polycrystalline YAG first layer 100 (solid line) and a second layer (ZTA, dashed line) 102 comprising about 20% by volume of zirconia and the balance (80% by volume) alumina, relative to a total volume of the at least one second layer. FIG. 4 c) depicts at least one first layer 100 comprising polycrystalline YAG and an at least one second layer 102 comprising about 16% by volume of zirconia (and the balance alumina), relative to a total volume of the at least one second layer in accordance with sample 421 of the first example. According to embodiment B, the CTE of the at least one first layer 100 comprising YAG may be CTE matched by at least one second layer 102 comprising from about 10 to about 20% by volume of zirconia and the balance alumina. Compositions of the ZTA-containing at least one second layer 102 may be modified to CTE match the at least one first layer 100 comprising polycrystalline YAG. A range of compositions (from about 10% to about 20% by volume of zirconia) of the at least one second layer 102 may be suitable to CTE match the at least one first layer 100 comprising polycrystalline YAG. As such, multilayer sintered ceramic bodies 98 comprising a at least one second layer 102 comprising from about 10 to about 20% by volume of zirconia (and the balance alumina) and at least one first layer 100 comprising polycrystalline YAG are disclosed herein. In preferred embodiments, in order to more closely CTE match the polycrystalline, at least one YAG first layer 100 and at least one second layer 102 comprising zirconia in amounts by volume of from about 13 to about 19%, preferably from about 14% to about 18%, preferably from about 15% to about 17%, more preferably about 16% by volume of zirconia (and the balance alumina) may be preferable, each with respect to a volume of the at least one second layer 102. Unitary, multilayer sintered bodies have been formed having a greatest dimension of from about 100 to about 625 mm having at least one first layer 100 comprising polycrystalline YAG and a second, at least one ZTA second layer 102 comprising about 16% by volume of zirconia.

Figure 5:
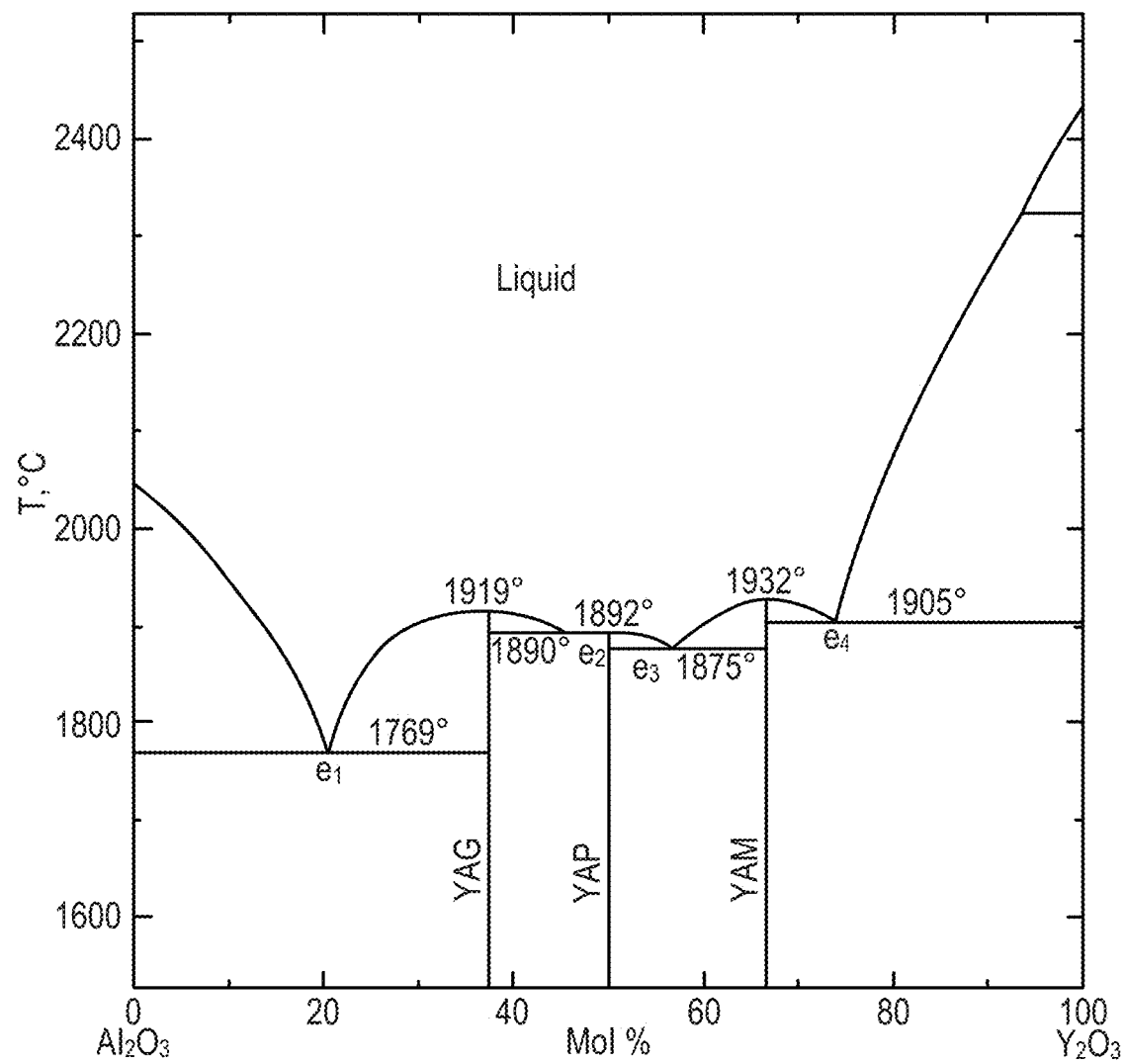
FIG. 5 depicts the yttrium oxide/aluminum oxide two-component phase diagram.

To provide corrosion and erosion resistance suitable for application as components in plasma processing chambers, fabrication of polycrystalline, unitary multilayer ceramic bodies having at least one first layer 100 comprising highly phase pure, polycrystalline YAG (>90% by volume) may be desirable. However, the formation of substantially phase pure YAG may require careful compositional and processing control in order to maintain stoichiometry and thus form a sintered ceramic body comprising phase pure YAG (of composition 37.5+/−0.1 mol % yttrium oxide and 62.5+/−0.1 mol % aluminum oxide). Oftentimes other crystalline phases, such as alumina, yttria, YAP, (YAlO$_3$; yttrium aluminum perovskite phase), and YAM (Y$_4$Al$_2$O$_9$; yttrium aluminum monoclinic phase) and combinations of these may be present. As a guide, FIG. 5 depicts the yttrium oxide/aluminum oxide two-component phase diagram. The horizontal axis corresponds to mixture proportions in mole percent of yttria and alumina, while the vertical axis is temperature in Celsius. The left of the horizontal axis corresponds to 100% alumina while the right corresponds to 100% yttria. The phase diagram of FIG. 5 illustrates regions where the yttrium aluminum oxide phases of YAG, YAP, and YAM are formed and the conditions of molar composition and temperature necessary to produce the forms.

Figure 8:
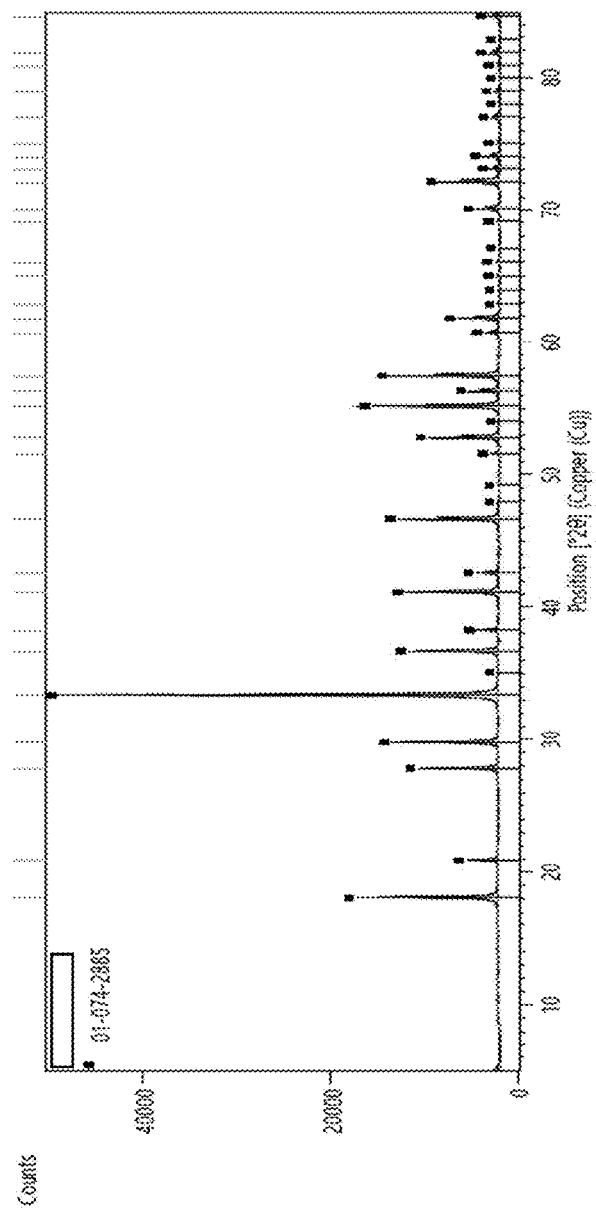
FIG. 8 illustrates x ray diffraction results of the at least one first layer 100 comprising YAG according to embodiments as disclosed herein.

Measurements of crystalline phases and image-based porosity of the at least one first layer 100 comprising YAG of the multilayer ceramic sintered bodies according to embodiment B as disclosed herein were performed using a combination of x ray diffraction (XRD), SEM imaging and use of image processing software (ImageJ). XRD was performed using a PANanlytical Aeris model XRD capable of crystalline phase identification to about +/−5% by volume. FIG. 8 depicts x ray diffraction results confirming formation of highly phase pure, polycrystalline YAG comprising the at least one first layer 100 in accordance with embodiment B. Within the detection limits of XRD, no other phases were identified. YAG exists as a line compound according to known phase diagrams, thus formation of phase pure YAG poses challenge and requires careful compositional and process control. Such phase pure YAG is disclosed in International Patent Application No. PCT/US20/60918, filed Nov. 17, 2020, which is herein incorporated by reference. The YAG-containing at least one first layer 100 according to embodiment B may in some embodiments comprise excess alumina and/or excess yttria, and may be substantially free of, or free of, dopants and/or substantially free of, or free of, sintering aids as disclosed herein. In other embodiments, the first layer comprising YAG may comprise sintering aids and/or dopants in the amounts as disclosed herein. In embodiments, the polycrystalline YAG first layer 100 is substantially free of, or free of, dopants and may comprise sintering aids in the amounts as disclosed herein. XRD of the at least one first layer 100 of the multilayer ceramic sintered bodies as disclosed herein may measure phase purity up to and including about 95% by volume. As such, the at least one first layer 100 of the unitary, multilayer sintered ceramic body comprises at least about 95% by volume of the YAG phase in accordance with embodiment B as depicted in the xrd results of FIG. 8.

In order to determine the phase purity to greater accuracy, for example up to and including about 99.8% by volume, SEM images were taken using backscatter detection (BSD) methods as known to those skilled in the art. Using BSD, the YAG phase appears grey, the aluminum oxide phase appears black, the yttrium oxide phase appears white, and porosity, if present, also appears black. Images were taken at 5000× using BSD methods to identify the YAG, alumina and yttria phases, and any porosity present as depicted in FIG. 6 a) for a polycrystalline YAG sintered ceramic body in accordance with Example 7.

Figure 6B:
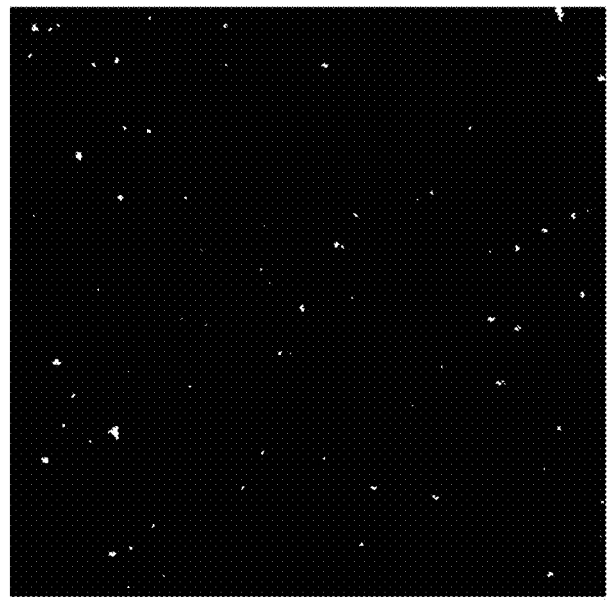
FIG. 6 a) depicts an SEM micrograph of a surface of an at least one first layer comprising polycrystalline YAG using backscatter detection (BSD) methods and b) an SEM image from the same region of the surface after thresholding to reveal porosity and alumina phases according to embodiments corresponding to example 7 as disclosed herein.
Figure 6A:
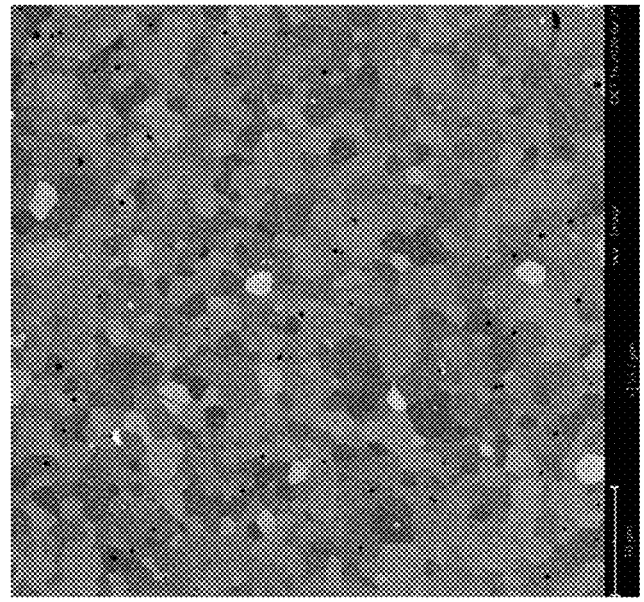
Figure 7B:
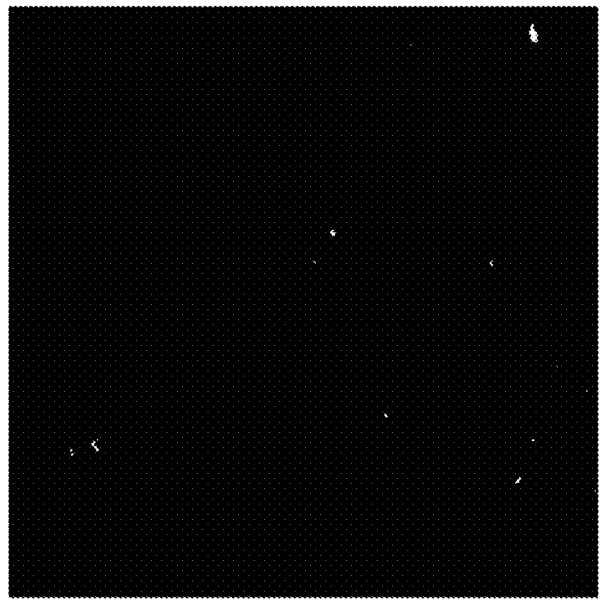
FIG. 7 a) depicts a topographic SEM micrograph of a surface of an at least one first layer comprising YAG of FIG. 6 (using topographic imaging methods) and b) a topographic SEM image from the same region of the surface after thresholding to reveal porosity and alumina phases according to embodiments corresponding to example 7 as disclosed herein.
Figure 7A:
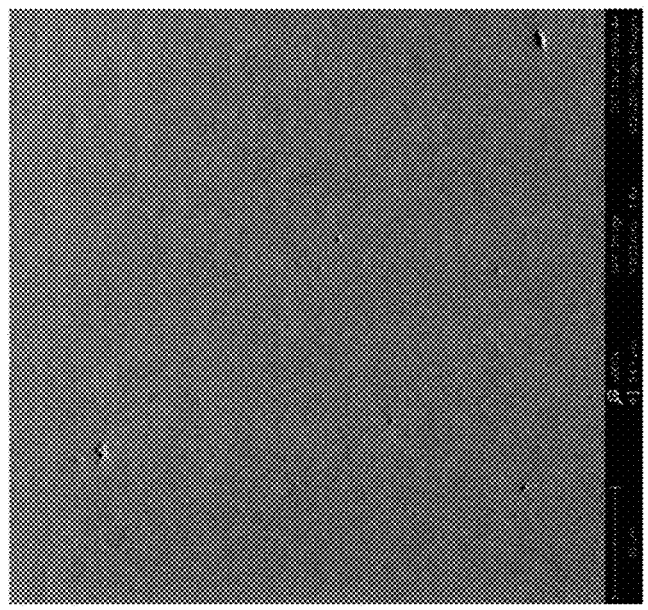

To differentiate between black regions comprising alumina and those comprising porosity, the BSD image was black and white threshold using ImageJ processing software to highlight black regions in the BSD image which may comprise either porosity or alumina, as depicted for the same region in FIG. 6 b). ImageJ has been developed at the National Institute of Health (NIH), USA, and is a Java-based public domain image processing and analysis program for image processing of scientific multi-dimensional images. The BSD detector as used for measurements disclosed herein has further capability to measure topographic features, thereby highlighting any deviations in the surface topography, such as surface porosity. Using the topographic mode of the BSD detector, topographic images were taken at 5000× across a surface of the same region of the polycrystalline YAG sintered ceramic body in accordance with Example 7 as depicted in FIG. 6 a), and the topographic images are shown in FIG. 7 a). Regions comprising surface porosity were highlighted as illustrated in FIG. 7 b) after thresholding the topographic image in ImageJ. The area comprising surface porosity within the topographic image of FIG. 7 b) was thereafter subtracted from the area comprising alumina and/or porosity in the BSD images of FIG. 7 a), providing the % area, and thereby % by volume, comprising alumina phase in the polycrystalline YAG sintered ceramic body in accordance with Example 7. The combination of these analytical tools of multiple SEM imaging modes and ImageJ analysis may provide for the determination of phase purity with confidence of about +/−0.10% by volume. Using the disclosed methods, the polycrystalline YAG sintered ceramic body in accordance with Example 7 was measured to comprise from about 0.1 to about 0.2% by volume of alumina phase, from about 0.1 to about 0.2% by volume of porosity, and from about 99.6 to about 99.8% by volume of the YAG phase. Accounting for measurement variance, the polycrystalline YAG sintered ceramic bodies may comprise the YAG phase in amounts of from 99.4 to 99.8% by volume and may further comprise porosity in an amount by volume of from 0.1 to 0.3%, and aluminum oxide in an amount by volume of from 0.1 to about 0.3%.

Thus, multilayer sintered ceramic bodies having at least one first layer 100 comprising the YAG phase in amounts from 90 to 99.9%, preferably from 90 to 99.8%, preferably from 90 to 99.7%, preferably from 90 to 99.6%, preferably from 93 to 99.8% by volume, preferably from 93 to 99.7%, and preferably from 93 to 99.6%, each by volume of the at least one first layer 100, may be formed using the materials and methods as disclosed herein.

To meet corrosion and erosion resistance requirements for use as components in semiconductor processing chambers, multilayered sintered ceramic bodies comprising at least one first layer 100 having low porosity across a surface 106 and/or within the layer 100 are preferable. Porosity may serve as a site for initiation of corrosion and erosion, and as such it is preferable that there is minimal to no porosity, pores or voids within the at least one first layer 100 and/or on a surface 106 of the first layer 100 of the multilayer sintered body. The at least one first layers disclosed herein may have very small pores both on the surface and throughout. Preferably, the at least one first layer 100 comprising at least one crystalline phase of a ceramic material selected from the group consisting of YAG, magnesium aluminate spinel and yttria and zirconia made according to the process disclosed herein are, thus, an integral layer having pores distributed uniformly throughout. In other words, pores or voids or porosity measured on a surface 106 may be representative of pores or voids or porosity within the bulk of the at least one first layer 100.

Porosity was measured using the method as disclosed following.

Porosity Measurements

The level of porosity was measured across sample surfaces through use of SEM images obtained from a Phenom XL scanning electron microscope at 5000× magnification. Images were imported into ImageJ Software for analysis. ImageJ has been developed at the National Institute of Health (NIH), USA, and is a Java-based public domain image processing and analysis program for image processing of scientific multi-dimensional images.

Pore size and total area comprising porosity were measured across 7 SEM images using ImageJ software methods as disclosed herein. Images were taken at 5000×, each having a total area about 53.7 um×53.7 um corresponding to a single image measurement area of about 2885 um².

In order to assess grain size of the at least one first layer 100 comprising polycrystalline YAG, linear intercept grain size measurements were performed in accordance with the Heyn Linear Intercept Procedure described in ASTM standard E1 12-2010 "Standard Test Method for Determining Average Grain Size." Grain size measurements were performed (as listed in Table 4 following) and an average grain size of from 1.1 to 6.3 um was measured across 25 repetitions. A maximum and minimum grain size of from 2 to 7.7 um were also measured on a surface 106 of the at least one first layer 100 comprising YAG. The unitary, multilayer sintered ceramic body may have a surface 106 having a grain size of, for example, a maximum grain size of about 8 um and less, preferably a maximum grain size of 6 um and less. In embodiments, the unitary, multilayer sintered ceramic body may have a surface 106 having an average grain size of from 0.4 to 6.5 um, preferably from 0.4 to 5 um, preferably from 0.4 to 3 um, preferably from 0.8 to 6.5 um, preferably from 0.8 to 5 um, preferably from 0.8 to 3 um, preferably from 1 to 7 um, preferably from 1 to 6.5 um.

TABLE 4

| Sample | d10 (μm) | Average Grain Size (μm) | Median (d50) (μm) | d90 (μm) | Min (um) | Max (um) |
|---|---|---|---|---|---|---|
| 519 | 1.1 | 2.1 | 1.8 | 3.1 | 0.5 | 7 |
| 531 | 0.6 | 1.1 | 1.0 | 1.5 | 0.4 | 2 |
| 506 | n/a | 6.3 | n/a | n/a | 5 | 7.7 |

Figure 9:
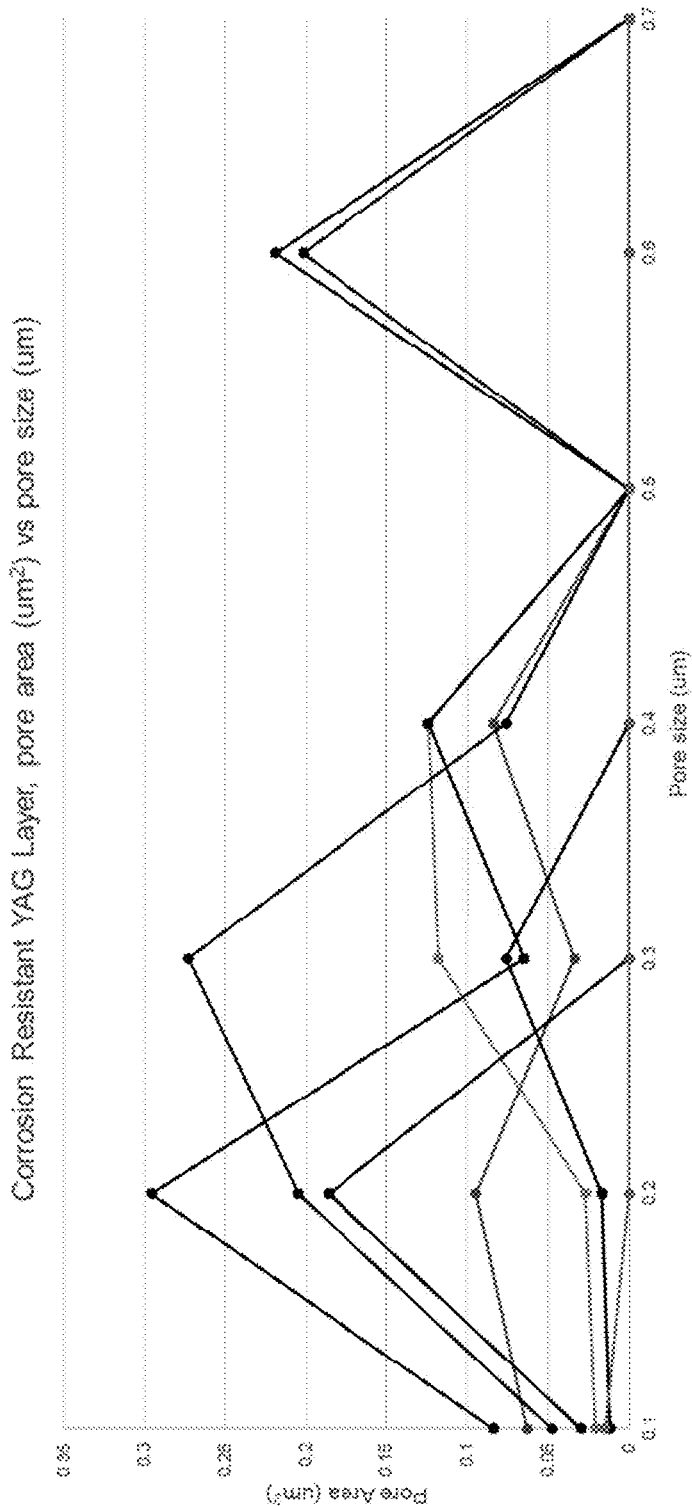
FIG. 9 illustrates pore area versus pore size for a unitary, multilayer sintered ceramic body comprising an at least one first layer 100 comprising YAG and at least one second layer 102 comprising about 16% by volume of zirconia and the balance alumina according to embodiments as disclosed herein.

FIG. 9 illustrates porosity results measured on a surface 106 of an at least one first layer 100 comprising YAG, depicting total pore area (um²) on the vertical axis and a horizontal axis representing pore size in microns. Measurements were performed across 7 images taken at 5000×, each of area 53.7 um×53.7 um for a total measurement area of about 2885 um². A total area comprising porosity within any one of the 7 images was measured as from about 0.015 to about 0.3 um², preferably from about 0.015 to about 0.2 um², and preferably from about 0.015 to about 0.15 um². A maximum pore size on a surface 106 of the at least one first layer 100 comprising YAG of 0.7 um and less was measured, and a maximum area comprising porosity was found to be about 0.3 um² and less. No pores of pore size larger than 0.7 um were measured across the 7 images analyzed within the polycrystalline YAG at least one first layer 100.

Figure 10:
FIG. 10 illustrates cumulative pore area versus pore size for a multilayer sintered ceramic body comprising an at least one first layer 100 comprising YAG and least one second layer comprising about 16% by volume of zirconia and the balance alumina according to embodiments as disclosed herein.

FIG. 10 depicts the cumulative fractional area comprising porosity (cumulative pore area) in um² across an area in mm², expressed as the cumulative pore area (in um²/mm²) for a given pore size of the 7 images as referenced in FIG. 9. Using SEM images and ImageJ image processing methods as disclosed herein, porosity was measured within each image (in um$^2$) and normalized across the total image area measured (in mm$^2$) to calculate the cumulative pore area. The at least one first layer 100 comprising YAG as disclosed herein comprises a cumulative pore area of from about 2 to about 800 um$^2$/mm$^2$, preferably from about 2 to about 600 uum$^2$/mm$^2$, preferably from about 2 to about 400 um$^2$/mm$^2$, preferably from about 2 to about 300 um$^2$/mm$^2$ as measured using SEM and image processing methods as disclosed herein. No pores of pore size larger than 0.6 um were measured across the 7 images analyzed within the YAG at least one first layer 100 of the multilayer sintered ceramic body. Thus, across 7 images, each of area about 54 um×54 um, the multilayer sintered ceramic bodies as disclosed herein have at least one first layer 100 having a surface 106 comprising porosity corresponding to pore sizes of less than 1 um in very low (<0.10% by area) percentages by area, thus providing a corrosion and erosion resistant surface of the multilayer sintered ceramic body for use in plasma processing chambers.

Figure 11:
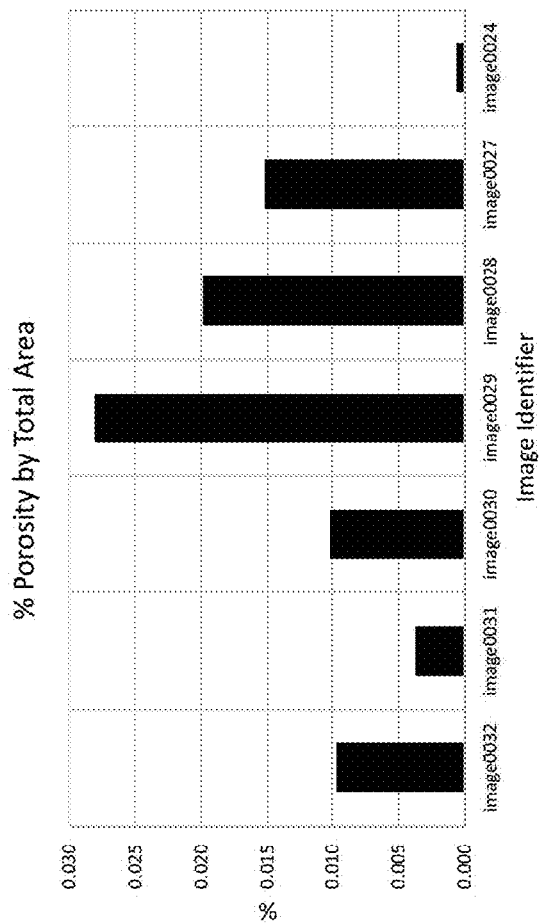
FIG. 11 a) depicts an SEM micrograph of a surface of the at least one layer of the multilayer sintered ceramic body comprising YAG, and b) shows the total % of surface area comprising porosity within the 7 images of FIGS. 9 & 10.
Figure 11:
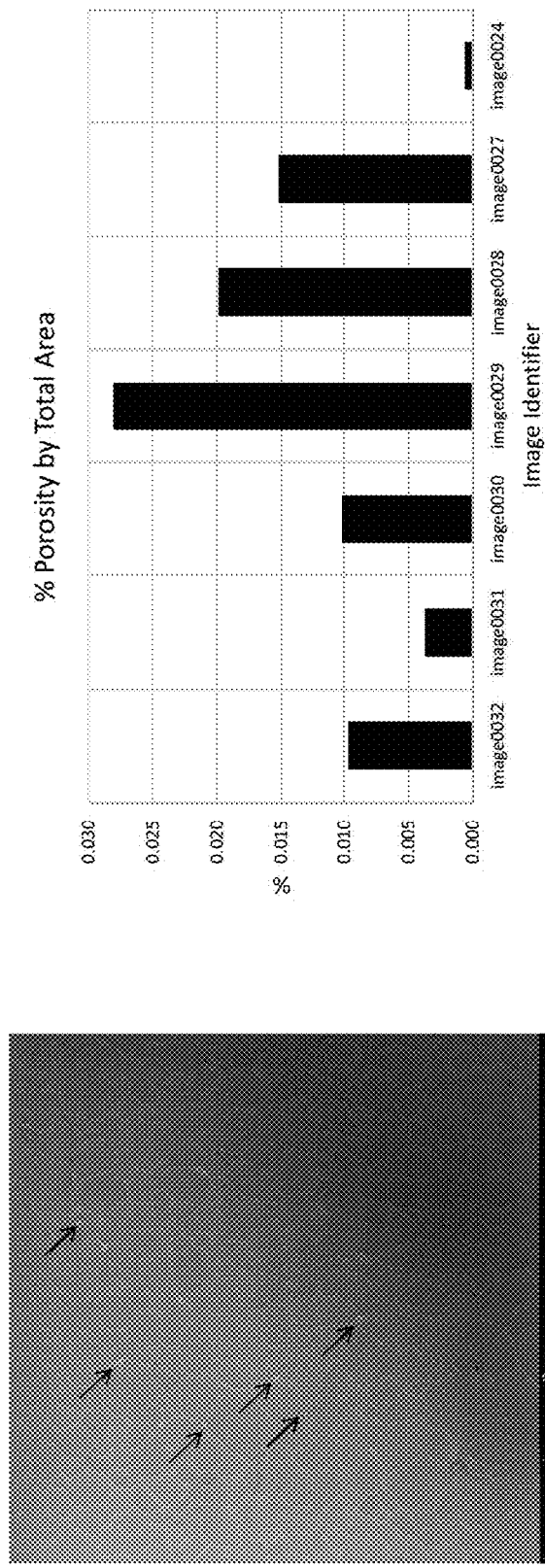

FIG. 11 a) illustrates a 5000× SEM image illustrating a high density, sintered microstructure after a thermal etching process of a surface 106 of the at least one first layer 100 comprising a polycrystalline YAG phase. Very fine scale porosity with few pores are depicted on a surface 106 of the YAG at least one first layer 100 is indicated. A nearly fully dense microstructure is depicted, having minimal porosity and pore sizes of about 1 um and less are visible. The multilayer sintered ceramic body according to embodiment B comprises at least one first layer 100 comprising polycrystalline YAG having a surface 106 comprising pores wherein the pores have pore sizes on the order of 5 um and less, down to sub-micron scale pore sizes of from about 0.1 to about 5 um, preferably from about 0.1 to about 4 um, preferably from about 0.1 to about 3 um preferably from about 0.1 to about 2 um, and preferably from about 0.1 to about 1 um. According to embodiment B as disclosed herein, the at least one first layer 100 comprising YAG of the multilayer sintered ceramic body 98 formed from the materials and processes may comprise pores which have a maximum size of from 0.1 to 5 um, preferably from 0.1 to 4 um, preferably from 0.1 to 3 um, preferably from 0.1 to 2 um, and from 0.1 to 1 um as measured using SEM and image processing methods as disclosed herein. About 22 pores were counted across the 54 um×54 um surface area.

FIG. 11 b) depicts a summation of the total surface area comprising pores or porosity (in % of surface area) for each of 7 SEM images measured for FIG. 10 on the vertical axis and a horizontal axis representing the corresponding pore size for a given % pore area in microns. Within a given image, the total area comprising porosity and the total image measurement area were used to calculate the % pore area. As depicted in FIG. 11, the measurements across 7 SEM images correspond to an at least one first layer 100 having a surface 106 comprising YAG comprising porosity in a percent of total area in an amount of from 0.0005 to 2%, preferably from 0.0005 to 1%, preferably from 0.0005 to 0.5%, preferably from 0.0005 to 0.05%, preferably from 0.0005 to 0.03%, preferably from 0.0005 to 0.005%, preferably from 0.0005 to 0.003%, preferably from 0.0005 to 0.001%, preferably from 0.005 to 2%, preferably from 0.05 to 2%, preferably from 0.5 to 2%, preferably from 0.005 to 2%, preferably from 0.005 to 10%, preferably from 0.05 to 2%, preferably from 0.05 to 1%, and preferably from 0.5 to 2% as measured from SEM images and using ImageJ software and methods as disclosed herein. Thus, across an image of area about 54 um×54 um, the multilayer sintered ceramic bodies as disclosed herein comprise a surface 106 comprising porosity in very low (<1% by total area) percentages, thus providing a corrosion and erosion resistant surface of the multilayer sintered ceramic body 98 for use in plasma processing chambers.

Density measurement of multilayer bodies comprising multiple phases proves challenging due to differences in the inherent densities of the phases. Density measurements were performed on a multilayer sintered ceramic body sample 032 by sectioning a sample cut from the full thickness of the multilayer sintered body into its respective layers and performing density measurements on each layer separately. Measurements were performed in accordance with the Archimedes immersion method of ASTM B962-17, and a density of about 4.57 g/cc was measured for the YAG at least one first layer 100. Density values as reported are for an average across 5 measurements. A commercially available, single crystal sample of bulk YAG was measured for density using the methods as disclosed herein. An Archimedes density of 4.56 g/cc across 5 measurements was obtained and this value is taken as the theoretical density of YAG as used herein. As such, the at least one first layer 100 of the multilayer sintered ceramic body comprising YAG according to Embodiment B has a density of from 99 to 100%, preferably from 99.5 to 100%, preferably from 99.7 to 100%, and preferably about 100% of the theoretical density of YAG. The at least one second layer 102 comprising about 16% by volume of at least one of stabilized and partially stabilized zirconia (and the balance alumina) was measured for density under similar conditions and a density of about 4.32 g/cc was calculated. The volumetric mixing rule was used to calculate a theoretical density of ZTA comprising about 16% by volume of zirconia, and a density of 4.32 was measured and taken as the theoretical density of the at least one second layer 102 comprising about 16 volume % zirconia. As such, the at least one second layer 102 of the multilayer sintered ceramic body comprising about 16% by volume of zirconia has a percent of theoretical density of from 99 to 100%, preferably from 99.5 to 100%, preferably about 100% of that of the theoretical density. The multilayer sintered ceramic body as disclosed in accordance with this embodiment has a % of theoretical density (also expressed as relative density, RD) which is greater than 99%, preferably from 99 to 100%, preferably from 99.5 to 100%, preferably about 100% of the theoretical density of the unitary, multilayer sintered ceramic body comprising at least one first and second layers.

The relative density (RD) for a given material is defined as the ratio of the measured density of the sample to the theoretical density for the same material, as shown in the following equation. Volumetric porosity (Vp) is calculated from density measurements as follows:

$$RD = \frac{\rho \text{ sample}}{\rho \text{ theoretical}} = 1 - Vp$$

where ρ sample is the measured (Archimedes) density according to ASTM B962-17, ρ theoretical is the theoretical density as disclosed herein, and RD is the relative fractional density. Using this calculation, volumetric porosity levels by percent of from 0.1 to 5%, preferably from 0.1 to 4%, preferably from 0.1 to 3%, preferably from 0.1 to 2%, preferably from 0.1 to 1%, and preferably from 0.1 to 0.5% were calculated from measured density values for each of the at least one first layer comprising YAG and the at least one second layer comprising ZTA (having about 16 volume % of at least one of stabilized and partially stabilized zirconia) of the multilayer ceramic sintered bodies in accordance with embodiments as disclosed herein.

These density, purity and porosity levels may provide enhanced resistance to the effects of erosion and corrosion resulting from plasma etch and deposition processing. The method and materials as disclosed are particularly useful in the preparation of ceramic sintered bodies of large dimension, for example from a greatest dimension of from 200 to 625 mm. The high densities, and thereby high mechanical strength, of the ceramic sintered body also provide increased handleability, in particular at large dimensions. Successful fabrication of sintered yttrium aluminum oxide bodies or multilayered bodies comprising sintered yttrium aluminum oxide, and in particular bodies formed of phase pure YAG in ranges as disclosed herein, across a longest (from about 200 to 625 mm) dimension may be enabled by controlling variation in density across at least one, longest dimension. An average density of 98.5% and greater and 99.5% and greater is obtainable, with a variation in density of 5% or less, preferably 4% or less, preferably 3% or less, preferably 2% or less, preferably 1% or less across the greatest dimension, whereby the greatest dimension may be for example about 625 mm and less, 622 mm and less, 610 mm and less, preferably 575 mm and less, preferably 525 mm and less, preferably from 100 to 625 mm, preferably from 100 to 622 mm, preferably from 100 to 575 mm, preferably from 200 to 625 mm, preferably from 200 to 510 mm, preferably from 400 to 625 mm, preferably from 500 to 625 mm. Reducing the variation in density may improve handleability and reduce overall stress in the ceramic sintered body. This combination of fine grain size, uniform and high density provides for a high strength sintered YAG-containing layer of a multilayer sintered ceramic body of large dimension suitable for machining, handling and use as a component in a semiconductor processing chamber. Density measurements may be performed in accordance with ASTM B962-17 across a greatest dimension of the sintered body.

The high density of the polycrystalline YAG-containing at least one first layer may enable high hardness values of the plasma-facing, at least one first layer which may provide resistance to the erosive effects of ion bombardment used during typical plasma processes. Erosion or spalling may result from ion bombardment of component or layer surfaces through use of inert plasma gases such as Ar. Those materials having a high value of hardness may be preferred for use as materials for components due to their enhanced hardness values providing greater resistance to ion bombardment and thereby, erosion. As such, Vickers hardness measurements were performed on the at least one first layer 100 comprising polycrystalline YAG in accordance with ASTM Standard C1327 "Standard Test Method for Vickers Indentation Hardness of Advanced Ceramics." The test equipment used for all hardness measurements was a Wilson Micro Hardness Tester Model VH1202. Hardness values of at least 1200 HV, preferably at least 1400 HV, preferably at least 1800 HV, preferably at least 2000 HV, from 1300 to 1600 HV, from 1300 to 1500 HV, from 1300 to 1450 HV, from 1300 to 1400 HV, from 1400 to 1600 HV, from 1450 and 1600 HV, from 1450 and 1550 HV were measured for the at least one first layer 100 of the multilayer sintered ceramic body 98 as disclosed herein. Measurements performed using Vickers hardness methods as known in the art were converted to SI units of GPa. Hardness values of from 12.75 to 15.69 GPa, from 12.75 to 14.71 GPa, from 12.75 to 14.22 GPa, from 12.75 to 13.73 GPa, from 13.73 and 15.69 GPa, from 14.22 and 15.69 GPa, preferably from 14.22 and 15.20 GPa were measured.

Surface roughness of the at least one first layer may impact performance in semiconductor processing chambers. Surface roughness measurements were performed using a Keyence 3D laser scanning confocal digital microscope model VK-X250X under ambient conditions in a class 1 cleanroom. The microscope rests on a TMC tabletop CSP passive benchtop isolator with 2.8 Hz Natural Frequency. This non-contact system uses laser beam light and optical sensors to analyse the surface through reflected light intensity. The surface roughness parameters Sa, Sdr and Sz are well-known in the underlying technical field and, for example, described in ISO standard 25178-2-2012. Section 4.17 of the ISO standard describes surface roughness Sa, section 4.1.6 describes Sz and section 4.3.2 describes Sdr. The ISO 25178 Surface Texture (Areal Roughness Measurement) is a collection of international standards relating to the analysis of surface roughness with which this microscope is compliant. Sa represents an average roughness value calculated across a user-defined area of a surface of the multilayer sintered ceramic body (arithmetical mean height of the scale limited surface). Sz represents the maximum peak-to-valley distance across a user-defined area of a surface of the multilayer sintered ceramic body (maximum height, peak to valley, of the scale-limited surface). Sdr is a calculated numerical value defined as the "developed interfacial area ratio" and is a proportional expression for an increase in actual surface area beyond that of a completely flat surface. A flat surface is assigned an Sdr of zero, and the value increases with the slope of the surface. Larger numerical values correspond with greater increases in surface area. This allows for numerical comparison of the degree of surface area increase of a sample. It represents additional surface area arising from texture or surface features as compared to a planar area.

The surface of samples was laser scanned using the confocal microscope at 50× magnification to capture a detailed image of the sample. The parameters of Sa (arithmetical mean height), Sz (maximum height), Ra (line roughness) and Sdr (developed interfacial area) were measured on a selected area of a polished surface of the at least one layer 100 of the multilayer sintered ceramic body. These parameters were obtained on a profile of 7 partitioned blocks. The lambda chi(a), which represents the measurement sampling lengths or areas, was adjusted so that the line reading was limited to measurements from the 5 middle blocks of the 7 according to ISO specification 4288: Geometrical Product Specifications (GPS)—Surface texture: Profile method—Rules and procedures for the assessment of surface texture. Surface areas were selected within polished surfaces of a sample for measurement. Areas were selected to be most representative of the typical sample surface and used to calculate Ra, Sdr, Sa and Sz.

According to embodiment B wherein the at least one first layer comprises YAG, surface roughness measurements were performed in accordance with ISO standard 25178-2-2012, and Sa values of from 0.0005 to 2 um, preferably from 0.0005 to 1.5 um, preferably from 0.0005 to 1 um, preferably from 0.0005 to 0.75 um, preferably from 0.0005 to 0.5 um, preferably from 0.0005 to 0.25 um, preferably from 0.0005 to 0.125 um, preferably from 0.0005 to 0.075 um, preferably from 0.0005 to 0.050 um, preferably from 0.0005 to 0.025 um, preferably from 0.0005 to 0.020 um, preferably from 0.0005 to 0.015 um, preferably from 0.0005 to 0.010 um, preferably from 0.001 to 0.030 um, preferably from 0.001 to 0.020 um, and preferably from 0.001 to 0.010 um, across a surface were measured. The following Table 5 lists Sa, Sz and Sdr values for an at least one first layer 100 comprising a surface 106 comprising YAG according to embodiments as disclosed herein.

TABLE 5

| YAG | | | | |
|---|---|---|---|---|
| Sa µm | Sz µm | Sdr N/A | Ra µm | Rz µm |
| 0.0018 | 0.5514 | 0.00052 | 0.0018 | 0.0373 |
| 0.0021 | 0.6236 | 0.00058 | 0.0017 | 0.0259 |
| 0.0025 | 0.6902 | 0.00136 | 0.0027 | 0.0714 |
| 0.0016 | 0.5379 | 0.00041 | 0.0015 | 0.0251 |
| 0.0007 | 0.3702 | 0.00007 | 0.0006 | 0.0060 |
| 0.0007 | 0.4437 | 0.00007 | 0.0006 | 0.0044 |
| 0.0007 | 0.3488 | 0.00007 | 0.0007 | 0.0150 |
| 0.0009 | 0.8121 | 0.00015 | 0.0008 | 0.0196 |
| 0.0030 | 0.6495 | 0.00028 | 0.0017 | 0.0250 |
| 0.0029 | 0.6752 | 0.00043 | 0.0016 | 0.0162 |
| 0.0060 | 1.1173 | 0.00526 | 0.0054 | 0.1176 |
| 0.0029 | 2.2639 | 0.00039 | 0.0017 | 0.0179 |
| 0.0059 | 1.3057 | 0.00546 | 0.0048 | 0.1378 |
| 0.0051 | 0.9395 | 0.00389 | 0.0041 | 0.0910 |
| 0.0054 | 0.7969 | 0.00432 | 0.0044 | 0.1092 |
| 0.0030 | 1.1078 | 0.00033 | 0.0017 | 0.0401 |
| Average 0.0028 | 0.8271 | 0.00148 | 0.0022 | 0.0475 |
| SD 0.0019 | 0.4711 | 0.00199 | 0.0016 | 0.0434 |

Thus, the at least one first layer 100 comprising YAG of the multilayer sintered ceramic body according to embodiment B as disclosed may have a surface 106 having a surface roughness, Sa, of from 0.0005 to 2 um, preferably from 0.0005 to 1.5 um, preferably from 0.0005 to 1 um, preferably from 0.0005 to 0.75 um, preferably from 0.0005 to 0.5 um, preferably from 0.0005 to 0.25 um, preferably from 0.0005 to 0.125 um, preferably from 0.0005 to 0.075 um, preferably from 0.0005 to 0.050 um, preferably from 0.0005 to 0.025 um, preferably from 0.0005 to 0.020 um, preferably from 0.0005 to 0.015 um, preferably from 0.0005 to 0.010 um, preferably from 0.001 to 0.030 um, preferably from 0.001 to 0.020 um, and preferably from 0.001 to 0.010 um as measured according to ISO standard 25178-2-2012.

According to Table 5, the at least one first layer 100 comprising YAG of the multilayer sintered ceramic body according to embodiment B as disclosed may have a surface 106 having a peak to valley, Sz of from 0.3 to 5 um, preferably from 0.3 to 4 um, preferably from 0.3 to 3 um, preferably from 0.3 to 2 um, preferably from 0.3 to 1 um, preferably from 0.65 to 5 um, preferably from 1 to 5 um, preferably from 2 to 5 um, preferably from 0.35 to 3 um, and preferably from 0.5 to 1 um as measured according to ISO standard 25178-2-2012.

According to Table 5, the at least one first layer 100 comprising YAG of the multilayer sintered ceramic body according to embodiment B as disclosed may have a surface 106 having a developed interfacial area, Sdr of from $5 \times 10^{-5}$ to $550 \times 10^{-5}$, preferably from $30 \times 10^{-5}$ to $400 \times 10^{-5}$, preferably from $30 \times 10^{-5}$ to $200 \times 10^{-5}$, and preferably from $40 \times 10^{-5}$ to $100 \times 10^{-5}$, as measured according to ISO standard 25178-2-2012.

Color

Referring again to FIG. 1, another advantage of the sintered ceramic bodies disclosed herein is the color of surface 106. As used herein "color" is determined using the 1976 CIELAB color space, which reduces colors to a lightness/darkness variable L*, for which absolute black is 0 and complete white is 100, and other parameters a* and b* which describe the hue of an object. Typically, an object having L* greater than 65 and absolute values of a* and b* of less than 5 are considered "white".

The presence of certain elements or contaminants on a plasma-facing surface and in the at least one first layer may be undesirable for use in plasma processing reactor chambers. Exposure to these contaminants during semiconductor processing may for example be a source of chamber contamination. These contaminants usually appear as dark spots or regions. For example, transition metal elements such as Fe, Co, Cr, V, Zn, Mn, Ni and Cu are undesirable for their diffusion within silicon as they will likely modify the electrical properties. Oxides, such as those of Li, Na and K also diffuse readily into silicon, and may affect performance at a device level. As such, easy detection of contaminants is desirable, thus lighter colors for the parts are preferred as the spots show up more clearly. Thus, to enable easy detection of contaminants, an at least one first layer having a plasma-facing surface having a high L* value, preferably a white surface, is advantageous so that dark spots are readily visible, and unacceptable parts or components may be discarded before use.

But ceramics having L* values of 90 and greater typically indicate a material having significant porosity. Porosity in the at least one first layer is undesirable for plasma processing applications as it serves as a site for initiation of corrosion and erosion by the halogen-based plasmas used in processing, and results in subsequent release of contaminant particles into the reactor chamber.

Moreover, surfaces having L* values of 90 and greater such as those disclosed in U.S. patent application Publication No. 2017/0250057 may interfere with endpoint signal detection in plasma etch processes. Interference with endpoint signal detection may result in false readings of the state of the etch process, resulting in defective products. Thus, a lower L* value and thus a darker surface of the plasma facing surface is preferable to overcome said endpoint signal detection interference and prevent release of particles into the chamber.

On the other hand, a component surface being too dark makes the easy detection of dark spots difficult because the lightness or color of the dark spots and the component surface are similar to the extent that the spots are not readily visible by the eye. This makes the culling of unacceptable parts or components challenging.

Plasma-facing surface 106 of the embodiments of the multilayer sintered ceramic bodies of the present disclosure exhibits an L* value of less than 90, preferably less than 82, preferably from not less than 65 to not greater than 82, preferably from not less than 70 to not greater than 82, and more preferably from not less than 75 to not greater than 80, as measured on a plasma-facing surface of the at least one first layer. In other embodiments, plasma-facing surface 106 of the embodiments of the multilayer sintered ceramic bodies of the present disclosure exhibits an L* value of from 65 to 90, preferably from 65 to 89, preferably from 70 to 82, preferably from 65 to 82, preferably from 70 to 82, and more preferably from 75 to 80, as measured on a plasma-facing surface of the at least one first layer.

The at least one first layer 100 having a plasma-facing surface 106 having L* values in said interval above combine two effects: it is easy to detect dark spots or contaminants on the plasma facing surface and within the at least one first layer of the sintered bodies or components fabricated therefrom; and the endpoint signal of the etch process is able to be detected accurately while minimizing particle release into the chamber.

In one embodiment, components fabricated from the multilayer sintered ceramic body of the present invention such as, for example, windows, disks, and showerheads, are characterized as having at least one first layer having an L* of from 65 to 85 as disclosed herein. In another embodiment, components fabricated from the multilayer sintered ceramic body of the present invention such as, for example, windows, disks, and showerheads, are characterized as having at least one first layer having an L* of from 65 to 82 as disclosed herein. In another embodiment, components fabricated from the multilayer sintered ceramic body of the present invention such as, for example, windows, disks, and showerheads, are characterized as having at least one first layer having an L* of from 65 to 75 as disclosed herein.

Uniformity and lightness may be assessed visually by eye or measured using commercially available instrumentation such as a FRU WR-18 colorimeter, as one non-limiting example, using the CIELAB L*a*b* scale. CIELAB L*a*b* values are also referred to as CIE Lab values or L*, a*, b* values interchangeably herein. Values for "L*" indicate the ratio of light to dark or, in other words, shading. Values for "a*" and "b*" generally relate to hue. Values for "a*" refer to the redness-greenness coordinate in certain transformed color spaces, generally used as the difference in "a*" between a specimen and a standard reference color. If "a*" is positive, there is more redness than greenness; if "a*" is negative, there is more greenness than redness. The value for a* is normally used with b* as part of the chromaticity or chromaticity color difference. Values for "b*" refer to the yellowness-blueness coordinate in certain color spaces, generally used as the difference in "b*" between a specimen and a standard reference color, normally used with "a*" or a as part of the chromaticity difference. Generally, if "b*" is positive, there is more yellowness than blueness; if "b*" is negative, there is more blueness than yellowness.

Etch Procedure:

In order to assess performance in halogen-based plasma applications, etching was carried out on a sintered ceramic body prepared according to embodiment B comprising a YAG at least one first layer 100 as described following.

To assess etch performance, polished ceramic samples having a surface comprising a first layer of YAG of dimension 6 mm×6 mm×2 mm were mounted onto a c plane sapphire wafer using a silicone-based heat sink compound. Regions of each part were blocked from exposure to the etch process by bonding a 5 mm×5 mm square sapphire ceramic to the sample surface.

The dry etch process was performed using a Plasma-Therm Versaline DESC PDC Deep Silicon Etch which is standard equipment for the industry. Etching was completed using a 2-step process for a total duration of 6 hours. The etch method was performed having a pressure of 10 millitorr, a bias of 600 volts and ICP power of 2000 watts. The etch method was conducted with a first etch step having a $CF_4$ flow rate of 90 standard cubic centimetres per minute (sccm), an oxygen flow rate of 30 standard cubic centimetres per minute (sccm), an argon flow rate of 20 standard cubic centimetres per minute (sccm), and a second etch step having an oxygen flow rate of 100 standard cubic centimetres per minute (sccm) and an argon flow rate of 20 standard cubic centimetres per minute (sccm), wherein first and second etch steps are performed for 300 seconds each and repeated for a combined duration of 6 hours. The etch conditions as used here to assess sample performance were selected to subject the disclosed materials to extreme etch conditions in order to differentiate performance. Upon completion of the etch procedure, surface roughness parameters of Sa, Sz and Sdr were measured using the methods as disclosed herein. Table 6 lists results after etching (using the 2 step process as disclosed herein) on a variety of samples having at least one first layer comprising YAG.

TABLE 6

| Sample | Description | anneal | Sa (nm) pre etch | Sa (nm) post etch | Sz (um) pre etch | Sz (um) post etch | Sdr (×10−5) pre etch | Sdr (×10−5) post etch | Process (T/P/t) |
|---|---|---|---|---|---|---|---|---|---|
| 322 | 0.5% alumina | N | 10 | 10 | 3.9 | 4.7 | <400 | <400 | 1450/20/45 |
| 322-1 | 0.5% alumina | Y | 24 | 21 | N/A | N/A | <500 | <500 | 1450/20/45 |
| 298 | zr doping | N | 10 | 14 | 3.9 | 3.8 | 300 | 300 | 1450/20/30 |
| 298-2 | zr doping | Y | 26 | 28 | 7.2 | 7.7 | 4800 | 5500 | 1450/20/30 |
| 454 | YAG | N | 14 | 16 | 3.7 | 4.8 | 300 | 800 | 1525/20/45 |
| 454-1 | 98-98.5% RD | Y | 16 | 18 | 6.6 | 6.8 | 700 | 1400 | 1525/20/45 |
| 223 | YAG | N | 20 | 20 | 3.1 | 4.9 | 400 | 400 | 1450/20/45 |
| TSC-3 | quartz glass | N/A | 58 | 59 | 4.3 | 22 | 300 | 17,300 | N/A |
| 311 | 0.25% alumina | N | 20 | 18 | 7.4 | 7.1 | 2100 | 1700 | 1450/20/30 |
| 311-1 | 0.25% alumina | Y | 30 | 30 | 7.3 | 7.4 | 4700 | 4500 | 1450/20/30 |

The exemplary at least one first layer 100 comprising YAG were made with excess alumina (samples 311 and 322), zirconia doping (samples 298), stoichiometric YAG (samples 454 and 223), and lowered relative density (RD), sample 454-1. As listed in Table 6, the process conditions (Process) are listed as temperature, T (° C.), pressure, P (MPa), and time, t (minutes) used to make each of the respective samples according to the method as disclosed herein. Annealing was performed at 1400° C. for 8 hours in air.

In an embodiment, the present disclosure relates to a multilayer sintered ceramic body and/or component made therefrom having an at least one first layer 100 comprising YAG having a surface before an etch or deposition process providing an arithmetical mean height, Sa, in an unetched area of less than 15 nm, more preferably loss than 13 nm, more preferably less than 10 nm, more preferably less than 8 nm, and more preferably less than 5 nm, according to ISO standard 25178-2-2012, section 4.1.7. surface roughness and not exceeding a specific value.

In an embodiment, the present disclosure relates to a multilayer sintered ceramic body and/or component made therefrom having an at least one first layer 100 comprising YAG having a surface before an etch or deposition process providing a maximum height, Sz, of less than 5.0 μm, more preferably loss than 4.0 μm, most preferably less than 3.5 μm, more preferably less than 2.5 μm, more preferably less than 2 μm, and more preferably less than 1.5 μm, according to ISO standard 25178-2-2012, and not exceeding a specific value.

In an embodiment, the present disclosure relates to a multilayer sintered ceramic body and/or component made therefrom having an at least one first layer 100 comprising YAG having a surface before an etch or deposition process providing a developed interfacial area, Sdr, of less than $1500\times10^{-5}$, more preferably loss than $1200\times10^{-5}$, more preferably less than $1000\times10^{-5}$, more preferably less than $800\times10^{-5}$, more preferably less than $600\times10^{-5}$, and more preferably less than $400\times10^{-5}$, according to ISO standard 25178-2-2012, section 4.1.7. surface roughness and not exceeding a specific value.

In an embodiment, the present disclosure relates to a multilayer sintered ceramic body and/or component made therefrom having an at least one first layer comprising YAG having a surface after the etch or deposition process as disclosed herein providing an arithmetical mean height, Sa, of less than 25 nm, less than 20 nm, more preferably loss than 18 nm, more preferably less than 16 nm, more preferably less than 14 nm, and more preferably less than 12 nm, according to ISO standard 25178-2-2012, section 4.1.7. surface roughness and not exceeding a specific value.

In an embodiment, the present disclosure relates to a multilayer sintered ceramic body and/or component made therefrom having an at least one first layer comprising YAG having a surface after the etch or deposition process as disclosed herein providing a maximum height, Sz, of less than 4.8 µm, more preferably less than 3.8 µm, most preferably less than 3.2 µm, more preferably less than 2.5 µm, more preferably less than 2 µm, and more preferably less than 1.5 µm, according to ISO standard 25178-2-2012, section 4.1.7. surface roughness and not exceeding a specific value.

In an embodiment, the present disclosure relates to a multilayer sintered ceramic body and/or component made therefrom having an at least one first layer comprising YAG having a surface after the etch or deposition process as disclosed herein providing a developed interfacial area, Sdr, of less than $3000\times10^{-5}$, more preferably less than $2500\times10-5$, more preferably less than $2000\times10^{-5}$, more preferably less than $1500\times10^{-5}$, more preferably less than $1000\times10^{-5}$, and more preferably less than $800\times10^{-5}$, according to ISO standard 25178-2-2012, section 4.1.7. surface roughness and not exceeding a specific value. By using the above-described multilayer sintered ceramic body according to embodiment B, a significant corrosion and erosion resistant material is provided which allows continuous, extended use as components in etch and deposition processes. This corrosion and erosion resistant material minimizes particle generation through improved surface characteristics as disclosed herein, providing improved performance during use and reduced contamination of semiconductor substrates during processing.

The starting powders, powder mixtures and calcined powder mixtures used for making the at least one first layer 100 having very high purity may provide corrosive and erosive resistance to enable use as components in semiconductor etch and deposition applications. This high purity provides a chemically inert surface (the term inert as used herein is intended to mean chemically inactive) which may prevent roughening of the surface of the at least one first layer 100 by halogen based gaseous species which may otherwise chemically attack and etch, or erode by ion bombardment, those materials made from powders and powder mixtures lower in purity. Impurities and contaminants within the at least one first layer 100 serve as a site for initiation of corrosion and erosion, and as such high purity (and correspondingly low impurity content as expressed in ppm of contaminants) is preferable within the at least one first layer 100 of the multilayer corrosion resistant sintered ceramic body. Table 10 lists impurities of exemplary calcined powder mixtures according to embodiment B, which is sintered to form at least one first layer, 100 comprising substantially phase pure, polycrystalline YAG.

In accordance with the disclosure herein, a multilayer sintered ceramic body having at least one first layer comprising the yttrium aluminum garnet (YAG) phase in amounts of greater than 90% by volume may be formed by in situ, reactive sintering during the sintering step by way of the combined properties of particle size distribution, purity and/or surface area of the calcined powder mixtures as disclosed herein. In embodiments, the calcined powder mixtures comprise crystalline powders of yttria and alumina. In specific embodiments, in addition to the crystalline powders of yttria and alumina, it may be preferred that the calcined powder mixture comprises less than 10% by volume of YAG, preferably less than 8% by volume of YAG, and preferably less than 5% by volume of YAG; in other embodiments disclosed herein is a calcined powder mixture which is free of, or substantially free of, the YAG phase (comprising crystalline powders of yttria and alumina). In other embodiments, it is preferred that the calcined powder mixture has a specific surface area of greater than 2 m²/g. In other embodiments, it is preferable that the calcined powder mixture is free of a YAG phase having a specific surface area of about 2 m²/g and greater in order to form a sintered ceramic body comprising YAG through the in situ, reactive phase sintering process as disclosed herein. All purity measurements disclosed herein are as measured above the reporting limit for a specific element and were completed using an ICP-MS (inductively coupled plasma mass spectrometry) from Agilent, 7900 ICP-MS model G8403, a quadrupole mass spectrometry system. Liquid samples are introduced into the ICP-MS as a fine aerosol which is ionized in the plasma discharge and later separated using a quadrupole mass analyser as known to those skilled in the art. Detection limits using the ICP-MS methods as disclosed herein to identify presence of lighter elements are higher than reporting limits of heavier elements. In other words, heavier elements, such as from Sc and higher, are detected with greater accuracy, for example to as low as 0.06 ppm, than those lighter elements, from for example, Li to Al (detected at for example accuracy of as low as 0.7 ppm). Thus, impurity contents for those powders comprising lighter elements, such as from Li to Al, may be determined to about 0.7 ppm and greater, and impurity contents of heavier elements, from Sc (scandium) to U (uranium) may be determined to about 0.06 ppm and greater. Using the ICPMS methods as disclosed herein, silica may be detected in amounts as low as about 14 ppm, while K (potassium) and Ca (calcium) may be identified in amounts of 1.4 ppm and greater. Iron may be detected with accuracy in amounts of as low as 0.14 ppm and greater. Total impurity contents as disclosed herein do not include silica.

The at least one first layer 100 comprising a crystalline phase of YAG may have a total impurity content of less than 100 ppm, preferably less than 75 ppm, less than 50 ppm, preferably less than 25 ppm, preferably less than 15 ppm, preferably less than 10 ppm, preferably less than 8 ppm, preferably less than 5 ppm, preferably from 5 to 30 ppm, preferably from 5 to 20 ppm relative to a total mass of the at least one first layer comprising a crystalline phase of YAG as measured using ICPMS methods. The total impurity contents as disclosed herein do not include Si in the form of silica.

Detection limits using the ICP-MS methods as disclosed herein to identify presence of lighter elements are higher than reporting limits of heavier elements. In other words, heavier elements, such as from Sc and higher, are detected with greater accuracy, for example to as low as 0.06 ppm, than those lighter elements, from for example Li to Al (detected at for example accuracy of as low as 0.7 ppm). Thus, impurity contents for those powders comprising lighter elements, such as from Li to Al, may be determined to about 0.7 ppm and greater, and impurity contents of heavier elements, from Sc (scandium) to U (uranium) may be determined to about 0.06 ppm and greater. Using the ICPMS methods as disclosed herein, silica may be detected in amounts as low as about 14 ppm, while K (potassium) and Ca (calcium) may be identified in amounts of 1.4 ppm and greater. Iron may be detected with accuracy in amounts of as low as 0.14 ppm.

Sintering aids such as $SiO_2$, MgO, CaO, $Li_2O$ and LiF, are known to promote densification, and LiF in particular is known to be used to promote grain growth and thereby increase grain size in YAG and spinel. However, these sintering aids may degrade corrosion resistance, strength and performance in etch and deposition applications. Thus, in embodiments, the at least one first layer 100 of the multilayer sintered ceramic bodies as disclosed herein may be formed from at least one calcined powder mixture having a calcia, magnesia, lithia and/or a lithium fluoride content of about 2 ppm each, relative to a total mass of the powder mixture. The high purity of the calcined powder mixtures (which are thereafter sintered using the methods as disclosed herein) is thereby transferred to the multilayer sintered ceramic body upon sintering. In embodiments B to D detailed above, for example, the multilayer sintered ceramic bodies may have at least one first layer 100 comprising at least one crystalline phase of a ceramic material selected from the group consisting of YAG, magnesium aluminate spinel and yttria and zirconia wherein each of the at least one first layers 100 comprise silica in amounts of from 14 to 100 ppm, preferably from 14 to 75 ppm, preferably from 14 to 50 ppm, preferably from 14 to 25 ppm, preferably from 14 to 20 ppm, preferably about 14 ppm each relative to a mass of the at least one first layer 100. In other embodiments, each of the at least one first layers 100 may comprise magnesia, lithia/lithium fluoride and/or calcia in amounts of from about 2 to 100 ppm, preferably from about 2 to 75 ppm, preferably from about 2 to 50 ppm, preferably from about 2 to 25 ppm, preferably from about 2 to 20 ppm, preferably from about 2 to 10 ppm each relative to a mass of the at least one first layer 100. In order to enhance strength and provide chemical inertness in the at least one first layer 100 comprising YAG, magnesium aluminate spinel, and zirconia and alumina, it is preferable that each of the at least one first layer 100 does not comprise Li or LiF in amounts greater than about 2 ppm each relative to a mass of the at least one first layer 100. As such, in further embodiments, each of the at least one first layers 100 may comprise lithium fluoride, calcia, and/or magnesia in amounts of from about 2 to 100 ppm, preferably from about 2 to 75 ppm, preferably from about 2 to 50 ppm, preferably from about 2 to 25 ppm, preferably from about 2 to 20 ppm each relative to a mass of the at least one first layer 100.

In preferred embodiments, the at least one first layer comprising YAG may have a purity of 99.99% and greater, preferably 99.995% and greater, each relative to a material having 100% purity as measured using the ICPMS methods as disclosed herein.

In embodiments A through D, each of the at least one first layers 100 comprising at least one crystalline phase of a ceramic material selected from the group consisting of YAG, magnesium aluminate spinel, and yttria and zirconia may comprise Si in the form of silica in amounts of from 14 to 100 ppm, preferably from 14 to 75 ppm, preferably from 14 to 50 ppm, preferably from 14 to 25 ppm, preferably from 14 to 20 ppm, and preferably about 14 ppm each relative to a total mass of the at least one first layer.

In embodiments A through D of the multilayer sintered ceramic bodies, each of the at least one first layers 100 comprising at least one crystalline phase of a ceramic material selected from the group consisting of YAG, magnesium aluminate spinel, and yttria and zirconia may be made with optional dopants of for example a rare earth oxide selected from the group consisting of Sc, La, Er, Ce, Cr, Pr, Nd, Pm, Sm, Eu, Gd, Tb, Dy, Ho, Tm, Yb, and Lu and oxides and combinations thereof in amounts of >0.002% by weight, preferably >0.0035% by weight, preferably >0.005% by weight, and preferably >0.0075% by weight, which may be added into the starting powders or powder mixtures at step a).

In embodiments A through D of the multilayer sintered ceramic bodies embodiments, the at least one first layer 100 of the aforementioned ceramic sintered bodies may be made with optional dopants of for example a rare earth oxide selected from the group consisting of Sc, La, Er, Ce, Cr, Pr, Nd, Pm, Sm, Eu, Gd, Tb, Dy, Ho, Tm, Yb, and Lu and oxides and combinations thereof in amounts of <0.05% by weight, preferably <0.03% by weight, preferably <0.01% by weight, and preferably from 0.002 to 0.02% by weight, which may be added into the starting powders or powder mixture at step a.

In embodiments A through D of the multilayer sintered ceramic bodies as disclosed herein, the at least one first layer 100 comprising at least one crystalline phase of a ceramic material selected from the group consisting of YAG, magnesium aluminate spinel, and yttria and zirconia may be made without the aforementioned dopants. In particular, for semiconductor chamber applications requiring chemical inertness and resistance to corrosion and erosion combined with high strength, it may be preferable that each of the at least one first layers 100 comprising at least one crystalline phase of a ceramic material selected from the group consisting of YAG, magnesium aluminate spinel, and yttria and zirconia of the multilayer sintered ceramic body are free of, or substantially free of, dopants. Thus, in certain embodiments, the multilayer sintered ceramic body having at least one first layer 100 comprising at least one crystalline phase of a ceramic material selected from the group consisting of YAG, magnesium aluminate spinel, and yttria and zirconia is substantially free of, or free of, at least one of, or all of the aforementioned dopants.

According to embodiment B, excess yttria and/or alumina within the YAG layer 100 are not considered dopants or sintering aids to the extent they may remain in the at least one first layer. The high purity and correspondingly low impurity of the at least one first layer as disclosed may enable reductions in particle generation and corrosion and erosion as required for use in semiconductor reactors. Purities of for example 99.995% and higher, preferably 99.999% and higher, preferably 99.9995% and higher, preferably about 99.9999% may be measured for the at least one first layer 100 comprising YAG.

However, these corrosion and erosion resistant materials pose challenges to sinter to the high densities required for application to semiconductor etch and deposition chambers.

As such, typically pressure assisted sintering methods, and in some embodiments pressure and current assisted sintering methods are required.

Figure 12B:
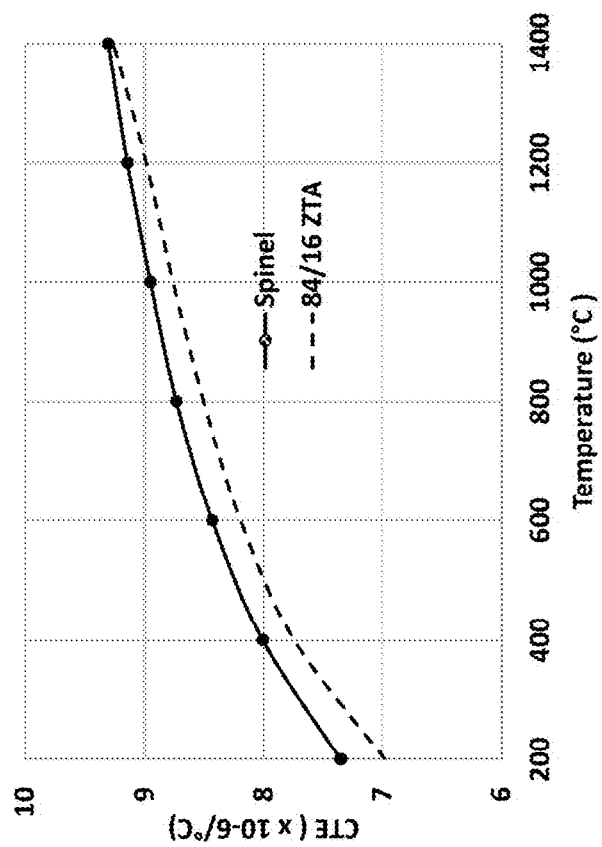
FIGS. 12 a) b) and c) depict variation in CTE of a multilayer sintered ceramic body comprising an at least one first layer 100 comprising spinel and at least one second layer 102 according to embodiments as disclosed herein.
Figure 12A:
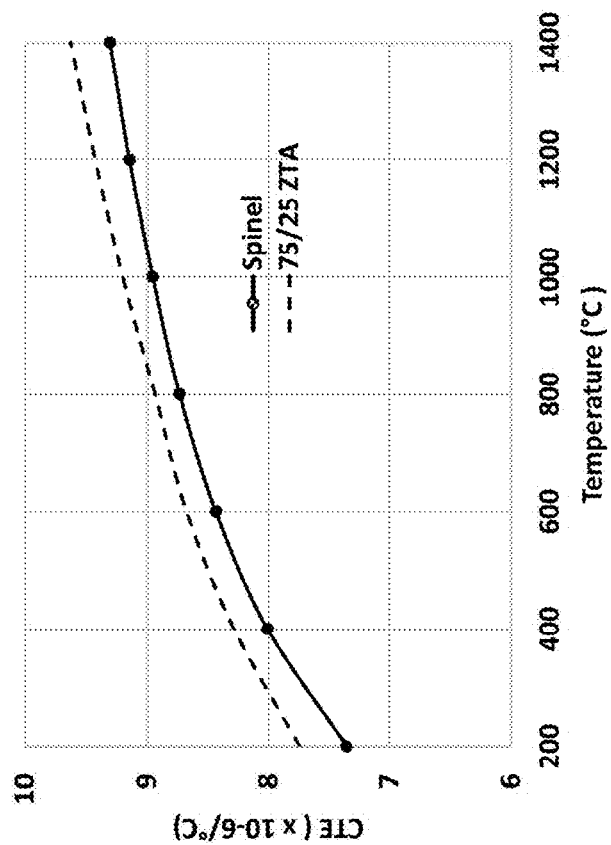
Figure 12:
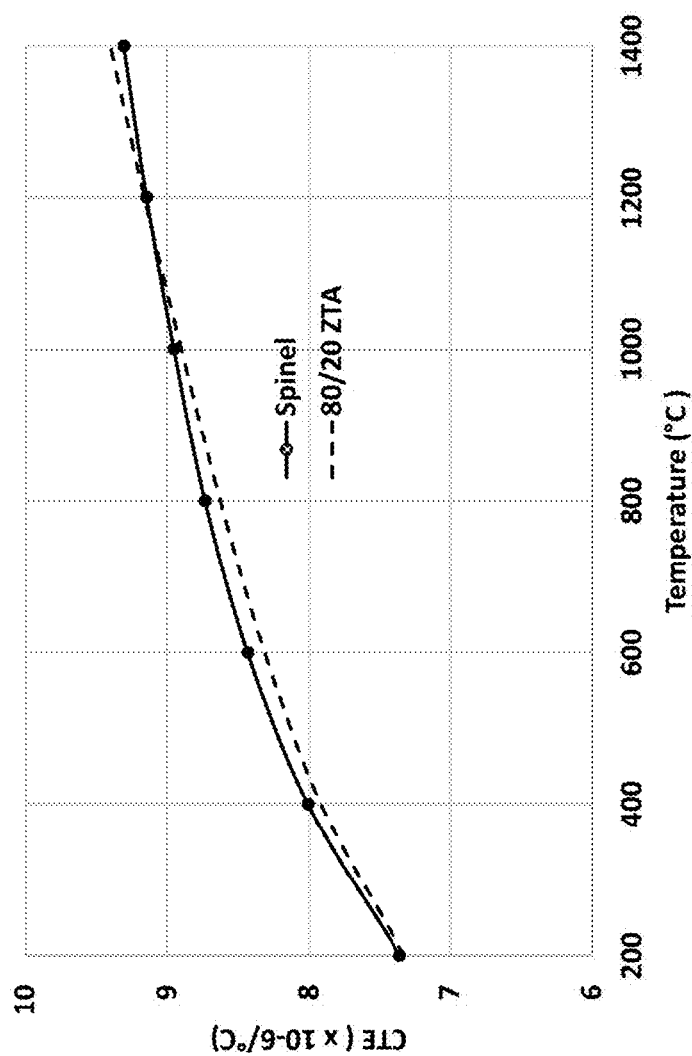

According to embodiment C, FIGS. 12 a), b) and c) depict a variation in the absolute value of CTE of about $0.4 \times 10^{-6}/°$ C. and less across a temperature of from 200 to 1400° C. of exemplary multi-layer sintered ceramic bodies comprising at least one first layer 100 comprising magnesium aluminate spinel and at least one second layer 102 comprising alumina wherein the alumina comprises at least one of stabilized zirconia and partially stabilized zirconia. FIG. 12 a) depicts a spinel first layer 100 and a second layer 102 comprising alumina wherein the alumina comprises at least one of stabilized zirconia and partially stabilized zirconia in an amount of about 25% by volume (and the balance alumina). FIG. 12 b) depicts the spinel first layer and a second layer 102 comprising alumina wherein the alumina comprises at least one of stabilized zirconia and partially stabilized zirconia in an amount of about 16% by volume of zirconia and the balance alumina. FIG. 12 c) depicts a variation in absolute value of CTE about $0.2 \times 10^{-6}/°$ C. and less across a temperature from 200 to 1400° C. of an exemplary sintered ceramic body comprising an at least one first layer 100 of magnesium aluminate spinel and at least one second layer 102 comprising alumina wherein the alumina comprises at least one of stabilized zirconia and partially stabilized zirconia in an amount of about 20% by volume of zirconia and the balance alumina. Compositions of the ZTA at least one second layer 102 may be tailored to CTE match the at least one first layer 100 comprising spinel. A range of compositions (from 16% to 25% by volume zirconia and the balance alumina) of the at least one second layer 102 comprising zirconia and alumina may be suitable to CTE match the at least one first layer 100 comprising spinel. As such, multi-layer sintered ceramic bodies comprising a second layer comprising from about 16 to about 25% by volume of zirconia (and the balance alumina) and at least one first layer 100 comprising magnesium aluminate spinel are disclosed herein. In order to more closely CTE match the spinel first layer 100 and the second layer 102 according to embodiment C, a second layer 102 comprising from about 15% to about 25%, preferably from about 18% to about 20%, more preferably about 20%, each by volume of zirconia (and the balance alumina) may be preferable. The variation in CTE between the at least one second layer 102 (comprising zirconia and alumina) and the first layer (comprising magnesium aluminate spinel) 100 is within the disclosed ranges for successful fabrication of multilayer sintered ceramic bodies as disclosed herein.

Figure 13:
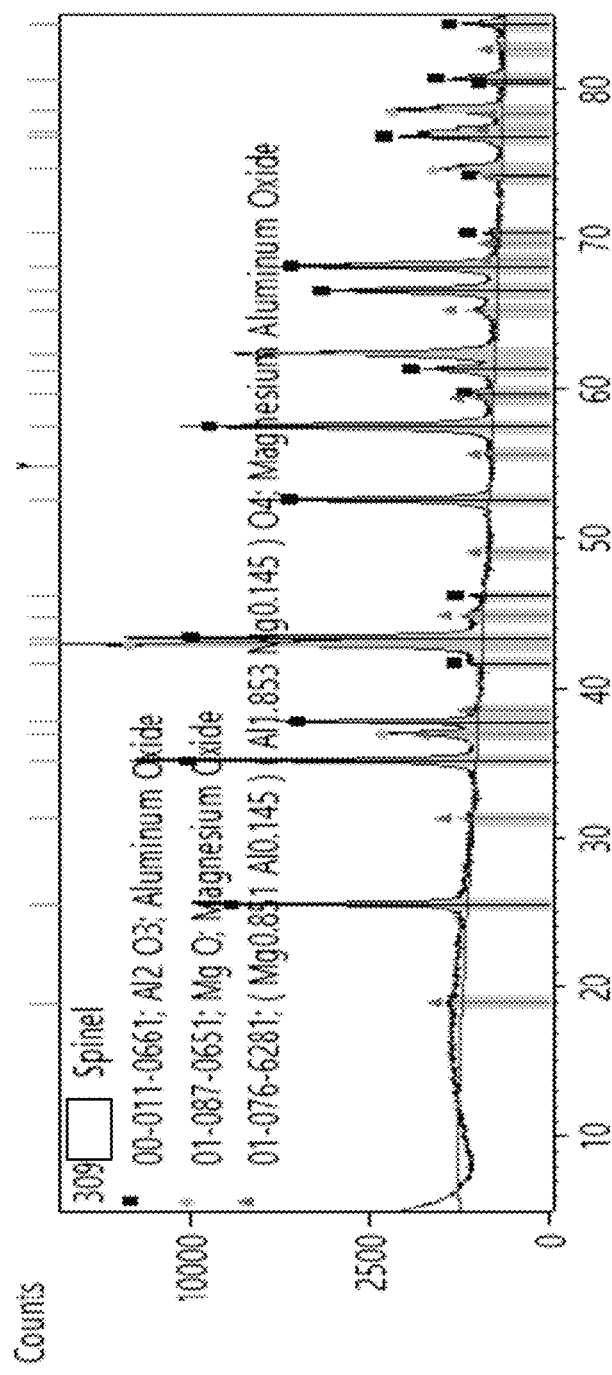
FIG. 13 illustrates x ray diffraction results of a calcined powder mixture of composition to form at least one first layer 100 comprising spinel.

FIG. 13 depicts x ray diffraction results of a calcined powder mixture (calcined at 850° C. for 4 hours) of magnesia and alumina (with small amounts of spinel phase formation) batched to form at least one first layer 100 comprising the magnesium aluminate spinel phase ($MgAl_2O_4$) upon sintering according to embodiment C of the unitary, multilayer sintered ceramic body as disclosed herein. In embodiments, the at least one first layer 100 comprising spinel according to embodiment C is substantially free of, or free of, dopants and substantially free of, or free of, sintering aids and substantially free of, or free of LiF. In other embodiments, the spinel first layer may comprise sintering aids in the amounts as disclosed herein (with the exception of magnesia as a sintering aid, which is one main component of spinel).

Figure 14:
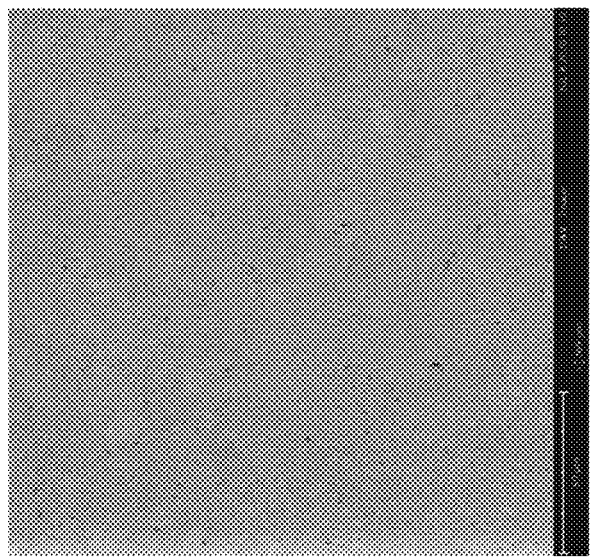
FIG. 14 illustrates an SEM image at 1000× of a surface of at least one first layer 100 comprising magnesium aluminate spinel.

FIG. 14 illustrates a 1000x SEM image of a high density, sintered microstructure of the at least one first layer 100 comprising magnesium aluminate spinel according to embodiment C as disclosed herein. The at least one first layer 100 comprising spinel is free of, or substantially free of dopants, sintering aids and LiF as disclosed herein. Nearly fully dense microstructures are depicted, having minimal porosity.

According to embodiment C, wherein the at least one first layer comprises spinel, an Sa of from about 2 to about 20 nm may be measured across a surface using the methods for surface roughness measurements as disclosed herein.

Figure 15B:
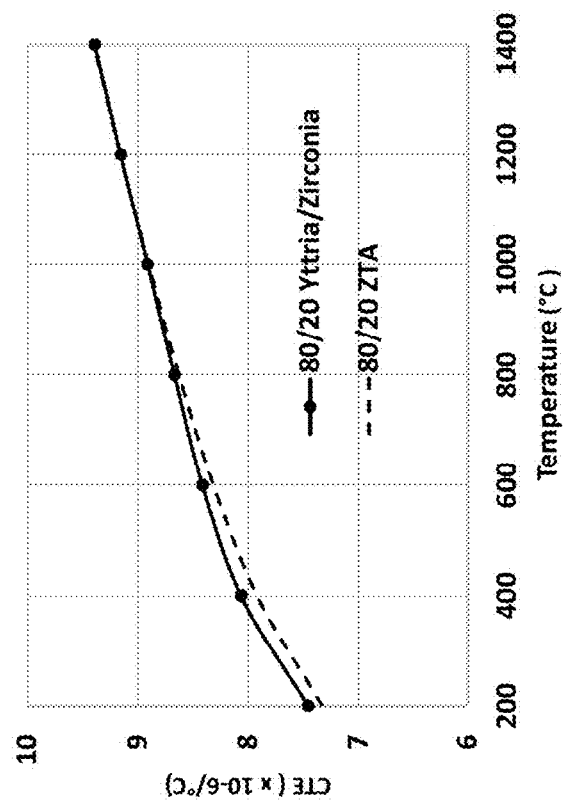
FIGS. 15 a) b) and c) depict variation in CTE of a unitary, multilayer sintered ceramic body comprising at least one first layer 100 comprising at least one crystalline phase of a ceramic material comprising yttria and zirconia, and embodiments of at least one second layers 102 according to embodiments as disclosed herein.
Figure 15:
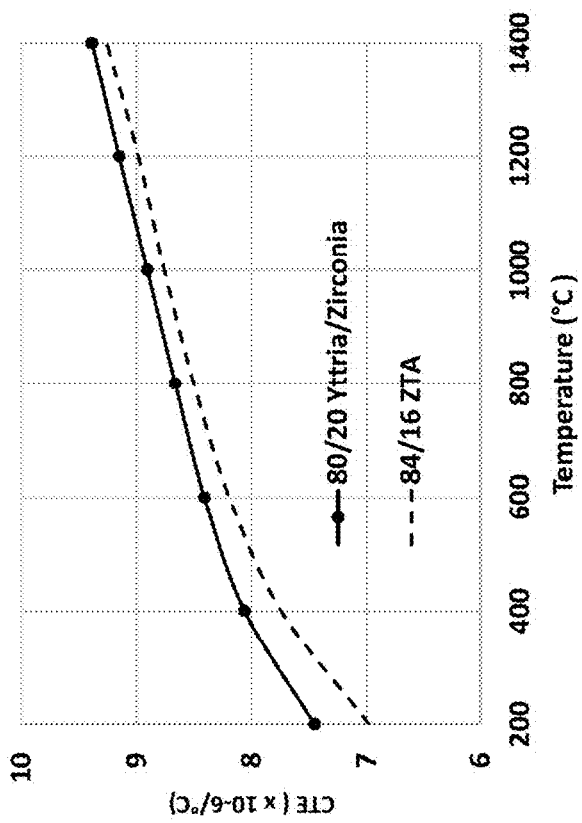
Figure 15:
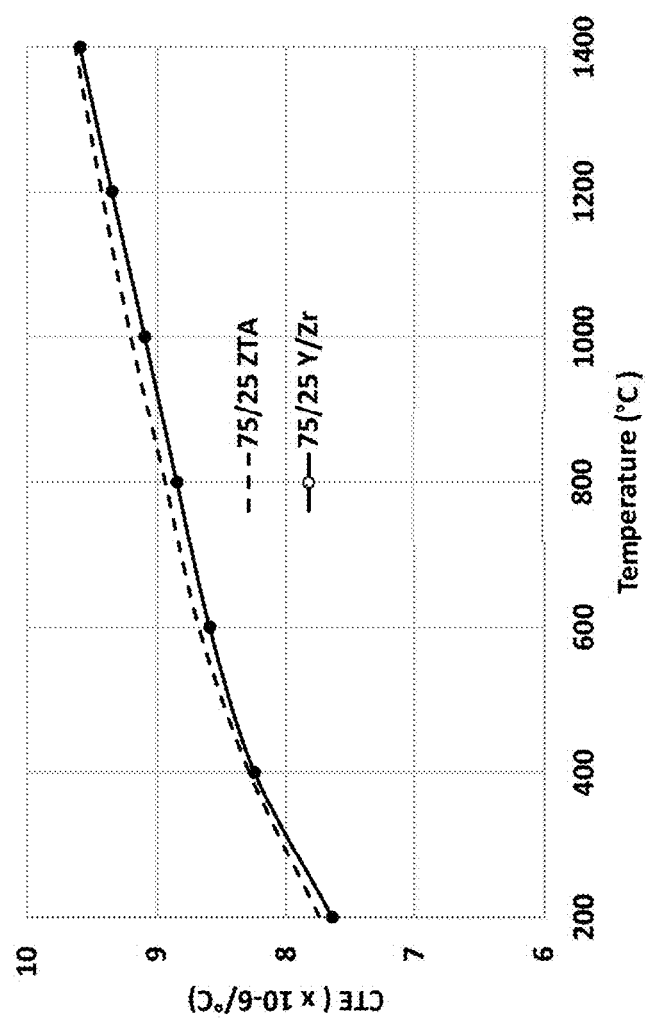

According to embodiment D, FIGS. 15 a), b) and c) illustrates a variation in the absolute value of CTE of from 0 to $0.6 \times 10^{-6}/°$ C., preferably from 0 to $0.5 \times 10$-$6/°$ C., preferably from 0 to $0.45 \times 10$-$6/°$ C., preferably from 0 to $0.4 \times 10$-$6/°$ C., preferably from 0 to $0.35 \times 10$-$6/°$ C., preferably from 0 to $0.3 \times 10$-$6/°$ C., preferably from 0 to $0.25 \times 10$-$6/°$ C., preferably from 0 to $0.2 \times 10$-$6/°$ C., preferably from 0 to $0.15 \times 10$-$6/°$ C., preferably from 0 to $0.1 \times 10$-$6/°$ C., preferably from 0 to $0.08 \times 10$-$6/°$ C., preferably from 0 to $0.06 \times 10$-$6/°$ C., preferably from 0 to $0.04 \times 10$-$6/°$ C., preferably from 0 to $0.02 \times 10$-$6/°$ C., and preferably from 0 to $0.01 \times 10$-$6/°$ C. across a temperature of from 200 to 1400° C. of exemplary multilayer sintered ceramic bodies comprising at least one first layers 100 comprising at least one crystalline phase of a ceramic material comprising yttria and zirconia wherein the zirconia is present in an amount of not less than 10 mol % and not greater than 25 mol %, and at least one second layers 102 comprising zirconia and alumina (ZTA) of a unitary, multilayer sintered ceramic body. FIG. 15 a) depicts a multilayer sintered ceramic body comprising at least one first layer 100 comprising about 20 mol % zirconia and the balance yttria, and at least one second layer 102 having 16% by volume zirconia and the balance alumina. Example 5 of the examples section as disclosed herein corresponds to a multilayer sintered ceramic body comprising an at least one first layer comprising about 20 mol % zirconia and the balance yttria, and at least one second layer comprising 16% by volume zirconia. FIG. 15 b) depicts a multilayer sintered ceramic body 98 comprising at least one first layer 100 comprising about 20 mol % zirconia and the balance yttria, and at least one second layer 102 having about 20% by volume zirconia and the balance alumina. FIG. 15 c) depicts a multilayer sintered ceramic body comprising at least one first layer 100 comprising about 25 mol % zirconia and the balance yttria, and at least one second layer 102 comprising about 25% by volume zirconia and the balance alumina. Embodiment D may in additional embodiments comprise at least one first layer 100 comprising at least one crystalline phase of a ceramic material comprising yttria and zirconia, wherein the zirconia is present in an amount of not less than 10 mol % $ZrO_2$ and not greater than 25 mol % $ZrO_2$, preferably not less than 12 and not greater than 25 mol % $ZrO_2$, preferably not less than 15 and not greater than 25 mol % $ZrO_2$, preferably not less than 18 and not greater than 25 mol % $ZrO_2$, preferably not less than 10 and not greater than 23 mol % $ZrO_2$, preferably not less than 10 and not greater than 20 mol % $ZrO_2$, preferably not less than 15 and preferably not greater than 23 mol % $ZrO_2$, and the balance comprising $Y_2O_3$. These compositions for at least one first layer 100 may be combined with compositions of the at least one second layer 102 as disclosed herein wherein the at least one second layer 102 has suitable composition (of zirconia and alumina) to CTE match the at least one crystalline phase of yttria and zirconia wherein the at least one crystalline phase is selected from the group consisting of a type C solid solution, or combinations of a fluorite solid solution and a type C solid solution, or combinations of a compound phase comprising $Zr_3Y_4O_{12}$ and a type C solid solution, comprising the at least one first layer 100. A type C solid solution refers to a rare earth yttria type solid solution. These crystalline phases are consistent with the disclosed compositional ranges as reported in "phase relationships in the yttria-rich part of the yttria-zirconia system", (J. Mater. Sci 12 (1977) 311-316, H. G. Scott). In embodiments, the at least one first layer 100 having yttria and zirconia comprising at least one crystalline phase of yttria and zirconia, wherein the zirconia is present in an amount of not less than 10 mol % $ZrO_2$ and not greater than 25 mol % $ZrO_2$ are substantially free of, or free of, dopants and/or substantially free of, or free of, sintering aids. In other embodiments, the at least one first layer 100 (having yttria and zirconia) comprising at least one crystalline phase of yttria and zirconia may comprise sintering aids in the amounts as disclosed herein. The starting powder of zirconia comprising the at least one first phase 100 comprising yttria and zirconia according to Embodiment D may comprise at least one selected from the group consisting of unstabilized, partially stabilized and stabilized zirconia and combinations thereof.

Figure 16:
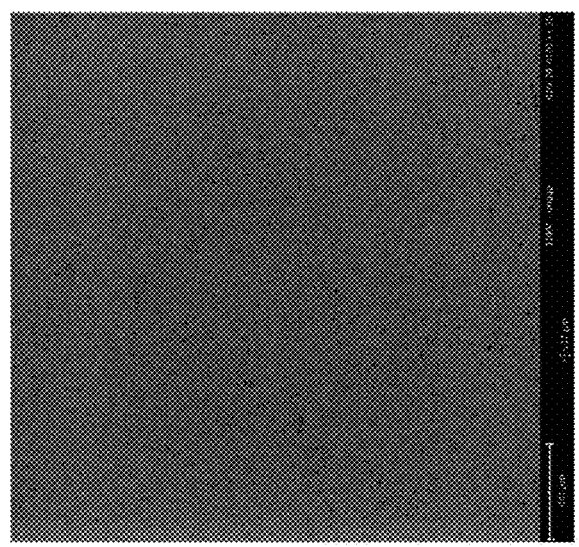
FIG. 16 a) illustrates a non-linear interface 104 of the unitary, multilayer sintered ceramic body, and b) depicts an SEM image at 500× of a surface of at least one first layer 100 comprising about 20 mol % zirconia and about 80 mol % yttria according to embodiments as disclosed herein.
Figure 16:
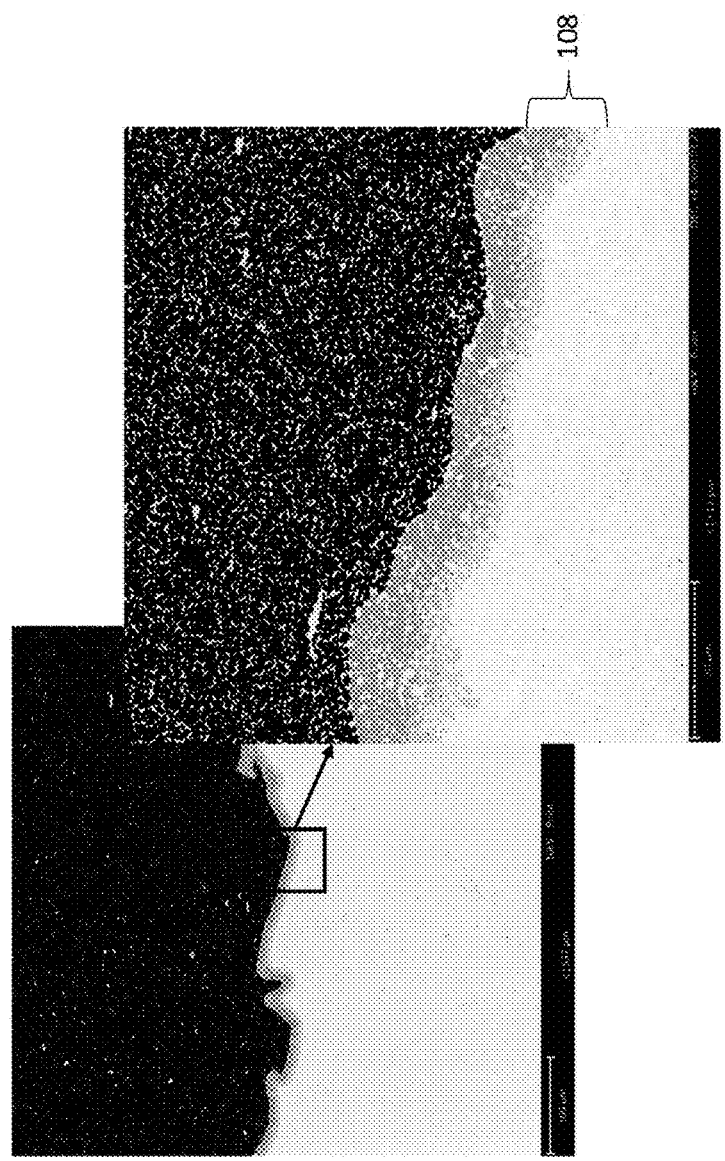

FIG. 16 a) illustrates an SEM image showing a non-linear interface 104 of the unitary, multilayer sintered ceramic body 98 according to embodiment D wherein the first layer 100 comprises at least one crystalline phase of a ceramic material comprising yttria and zirconia wherein the zirconia is partially stabilized and comprises about 3 mol % yttria and is present in an amount of about 20 mol % and the balance yttria. In embodiments, the at least one first layer 100 may comprise a reaction layer 108 contiguous with the at least one second layer 102 wherein the at least one second layer 102 and the reaction layer 108 form a border comprising the nonlinear interface 108. As may be viewed in the SEM results of FIG. 16, the reaction layer is highly dense and having minimal porosity. The reaction layer 108 may have a thickness of from 10 to 30 um, preferably from 15 to 30 um, preferably from 20 to 30 um, preferably from 25 to 30 um, preferably about 20 um as measured from SEM imaging. Adhesion strength of the non-linear interface 104 may be enhanced by the reaction layer 108. In embodiments, the reaction layer 108 may comprise at least one crystalline phase selected from the group consisting of YAG, YAP, YAM, a cubic crystalline phase (comprising a solid solution of at least two of yttria, alumina and zirconia), and a fluorite crystalline phase (comprising a solid solution of at least two of yttria, alumina and zirconia) and combinations thereof FIG. 16 b) depicts a high density, sintered microstructure of an at least one first layer 100 about 20 mol % zirconia and the balance yttria. A nearly fully dense microstructure is depicted, having minimal porosity.

According to embodiment D, wherein the at least one first layer comprises a solid solution of yttria and zirconia, an average Ra across 5 measurements of from 10 to 25 nm was measured.

Multilayered sintered bodies as known to those skilled in the art are often formed from pre-cast layers or tapes which are laminated and co-sintered or laminated or deposited onto a sintered substrate and sintered. However, these multilayer laminates often suffer from delamination at interfaces between the layers due to insufficient interfacial bonding between layers, resulting in spalling and particle release during use in semiconductor reactors. Typically, these laminates have an interface which is linear and therefore does not provide the advantages of the interlocking, nonlinear interface 104 having enhanced adhesion strength and bonding which is characteristic of the unitary, multilayer, sintered ceramic bodies as disclosed herein.

Figure 17B:
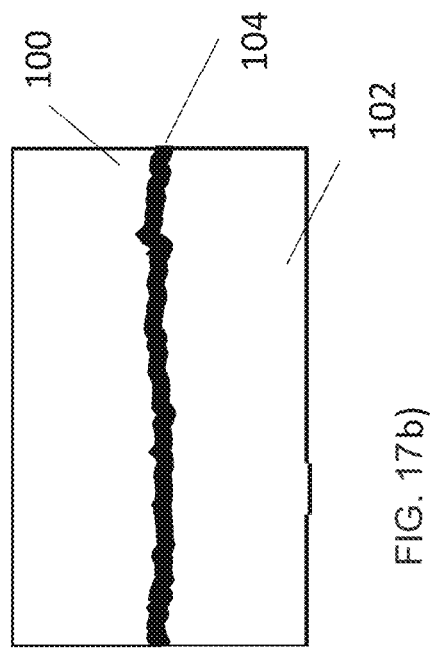
FIG. 17 a) depicts a schematic of the multilayer sintered ceramic body 98 and b) illustrates a view illustrating a non-linear interface 104 according to embodiments as disclosed herein.
Figure 17A:
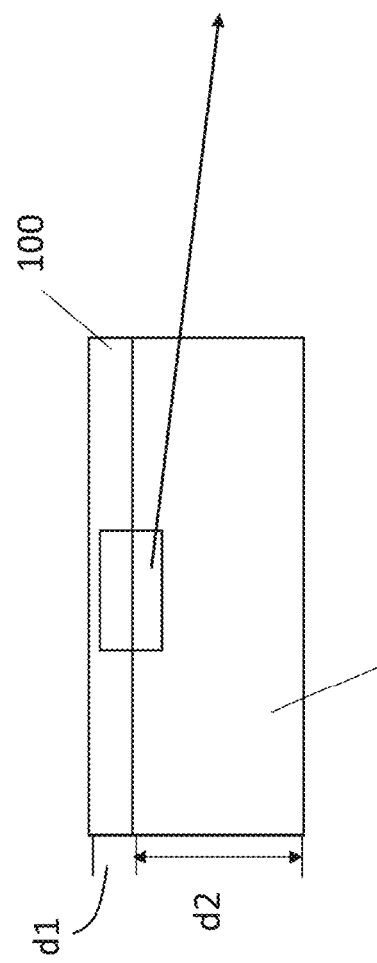

Disclosed herein is a multilayer sintered ceramic body comprising at least one first layer 100 and at least one second layer 102 which are contiguous and bounded by a non-linear interface 104 as depicted in the schematic of FIG. 17 b). As illustrated, the interface 104, which is non-linear (as is described in greater detail herein), may provide for enhanced adhesion between the at least one first layer 100 and the at least one second layer 102. This improved adhesion may be achieved by a number of factors, including the increased interfacial length, and related increased area of the interface, the tortuosity (T), the arithmetical mean of the interface (distance of the interface from an average interfacial line), the non-linearity and an interlocking effect provided by the morphology of the interface 104. FIGS. 19 a) and b) illustrates SEM images depicting characteristics of the interface 104 between the at least one first layer 100 and the at least one second layer 102 wherein a straight line length between ends (L) is about 54 um, and the measured interfacial length or curve (C) along interface 104 is about 90 um, as depicted in the exemplary image of FIG. 19 b). The tortuosity according to FIG. 19 b) using the calculations as disclosed herein is 1.7. Measurements were taken across 9 SEM images using ImageJ software analysis as disclosed herein. An average interfacial length of about 90 um was measured, representing about a 66% increase in interfacial length (C) relative to the linear distance (L). Thus, disclosed herein is a multilayer sintered ceramic body having an interface 104 defined by the at least one second layer and the at least one first layer wherein the interfacial length is increased by from 20 to 70%, preferably from 20 to 60%, preferably from 20 to 40%, preferably from 30 to 80%, preferably from 40 to 80%, preferably from 50 to 70%. Correspondingly, the at least one second layer 102 and the at least one first layer 100 may contact one another at an interface commensurate in interfacial area to the greatest dimension of the multilayer sintered ceramic body. For unitary, multilayer sintered bodies having greatest dimensions of from 100 to about 625 mm, the at least one second layer 102 and the at least one first layer 100 contact one another at a nonlinear interface 104 having an area of about 3,117 $cm^2$, preferably about 3,068 $cm^2$ and less, preferably 2,919 $cm^2$ and less, preferably from 78 to about 3,117 $cm^2$, preferably from 78 to about 3,068 $cm^2$, preferably from 78 to 2,919 $cm^2$, preferably from 78 to 1,963 $cm^2$, preferably from 78 to 1,257 $cm^2$, preferably from 78 to 707 $cm^2$, preferably from 78 to 314 $cm^2$, preferably from 314 to about 3,117 $cm^2$, preferably from 314 to about 3,068 $cm^2$, preferably from 314 to 2,919 $cm^2$, preferably from 314 to 1,963 $cm^2$, preferably from 314 to 1,257 $cm^2$, preferably from 707 to about 3,068 $cm^2$, and preferably from 1257 to 3,039 $cm^2$. In embodiments, it is preferable that the first and second layers are in direct contact, forming nonlinear interface 104, and thus the at least one first and second layers are contiguous layers. In other embodiments, circuitry, heating elements, RF coils/RF antennae and the like may be disposed between first and second layers as required by the specific component application, and irrespective of these features, first and second layers may be contiguous or substantially contiguous. This increased interfacial length and interfacial area will enhance adhesion at the nonlinear interface 104 between the at least one first layer 100 and the at least one second layer 102.

Figure 18:
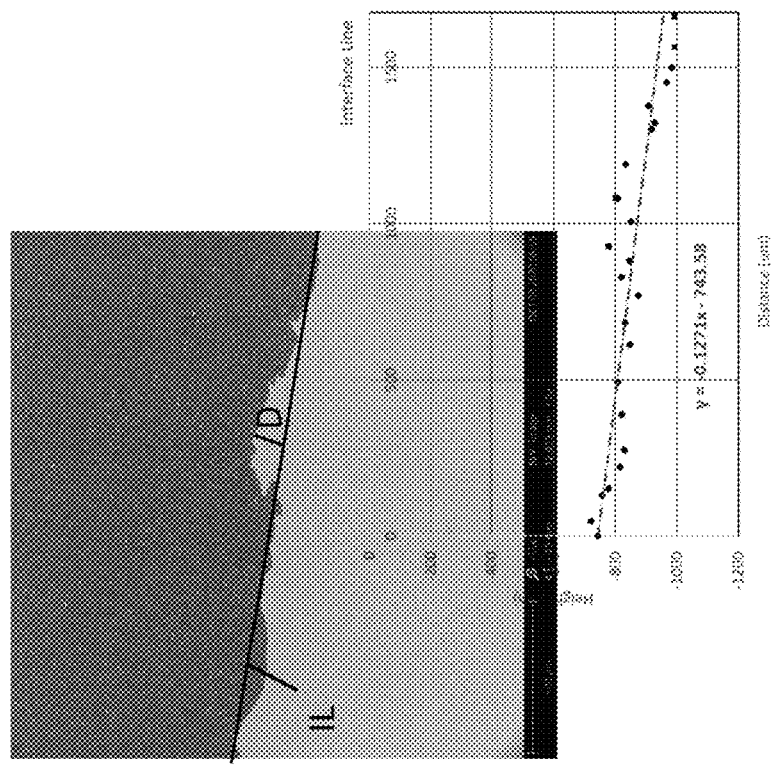
FIG. 18 a) illustrates the tortuosity (T) and b) depicts an average interface line (IL), characterizing the non-linear interface, 104 according to embodiments as disclosed herein.
Figure 18:
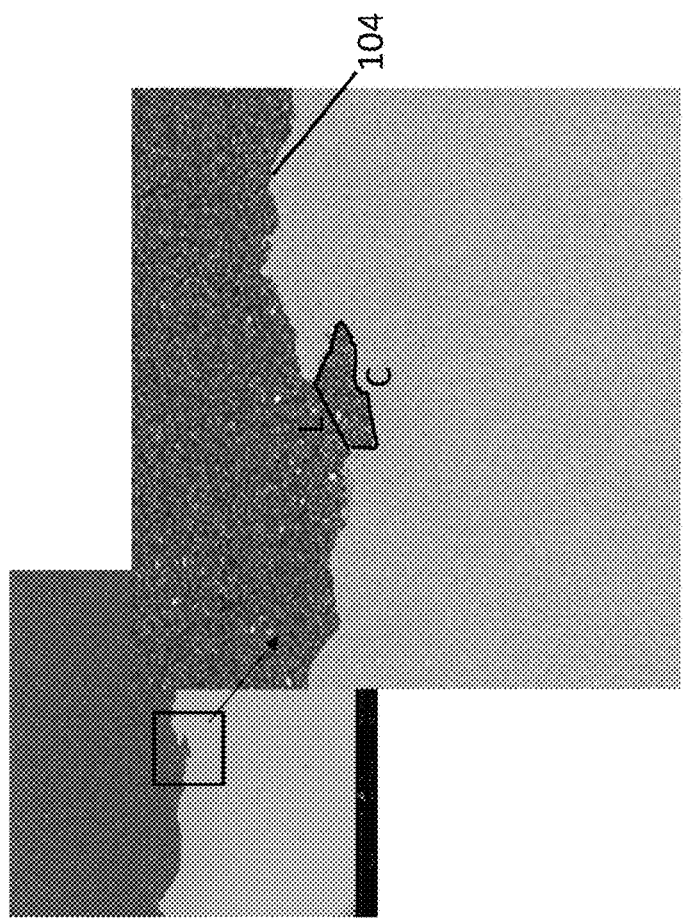

FIG. 18 a) illustrates a SEM micrograph at 500× of an interface 104 of the multilayer sintered ceramic body wherein the interface defined by the at least one second layer 102 and the at least one first layer 100 is an irregular, nonlinear boundary which in embodiments may comprise retrograde angles. In some embodiments as depicted in FIG. 18 a), the interface may comprise at least one dovetail structure and/or at least a portion of a dovetail structure. In other embodiments at least a portion of the interface may comprise a trapezoidal shape. The tortuosity (T) as disclosed herein, is defined mathematically as the ratio of the length of the curve, C, to the linear distance between its ends, L, whereby T=C/L. The image of FIG. 18 a) was measured to have a tortuosity of 2.7. The nonlinear interface 104 as disclosed herein may have a tortuosity, T, of from greater than 1 to about 1.5, preferably from greater than 1 to about 2.0, preferably from greater than 1 to about 2.5, preferably from greater than 1 to about 3.0, and preferably from greater than 1.1 to about 3.0 as measured using SEM and image processing methods (measurements within ImageJ software) as disclosed herein. A straight-line interface (as is typical of laminates and structures using pre-sintered bodies onto which layers are applied) has a tortuosity of about 1. The increased tortuosity of the interface 104 of the multilayer bodies as disclosed herein provides an interlocking effect between layers, thereby increasing adhesion strength such that an indivisible, unitary multilayer ceramic sintered body is formed.

FIG. 18 b) depicts an interface line (IL) of the interface 104 as calculated from SEM and image processing methods. As depicted, exemplary SEM images depicting nonlinear interface 104 were imported into ImageJ software, and x/y coordinates corresponding to points along the interface were used to obtain the linear equation of the interface line (IL) as shown in FIG. 18 b) and the interface 104 was characterized by a distance of the nonlinear interface 104 from the interface line (IL). A distance (D) of the interface 104 from the interface line (IL) varies in amount of from 10 to 100 um, preferably from 20 to 100 um, preferably from 30 to 100 um, preferably from 40 to 100 um, from 50 to 100 um, preferably from 25 to 85 um as measured using SEM and image processing. Increased distance (D) from the interface line (IL) may contribute to the enhanced adhesion and interlocking effect of the multilayer sintered ceramic bodies as disclosed herein.

These reverse or retrograde angles, characteristics and structures may provide an anchoring effect thereby increasing interfacial and tensile strength and bonding across the interface 104 defined by the at least one second layer 102 and the at least one first layer 100.

Grain size measurements were performed on the multilayer sintered ceramic body of Embodiment B, comprising at least one first layer comprising YAG and at least one second layer comprising alumina wherein the alumina comprises at least one of stabilized and partially stabilized zirconia present in an amount of about 16% by volume. The grain size of the at least one YAG, first layer and the at least one second layer were measured to be about 0.78 um and 0.74 um, respectively. These differences may be within the accuracy of measurement, thus the multilayer sintered ceramic bodies as disclosed herein may comprise at least one first and second layers comprising grains wherein the grains have the same size, or substantially the same size between the at least one first 100 and second 102 layers.

Figures 20, 20B:
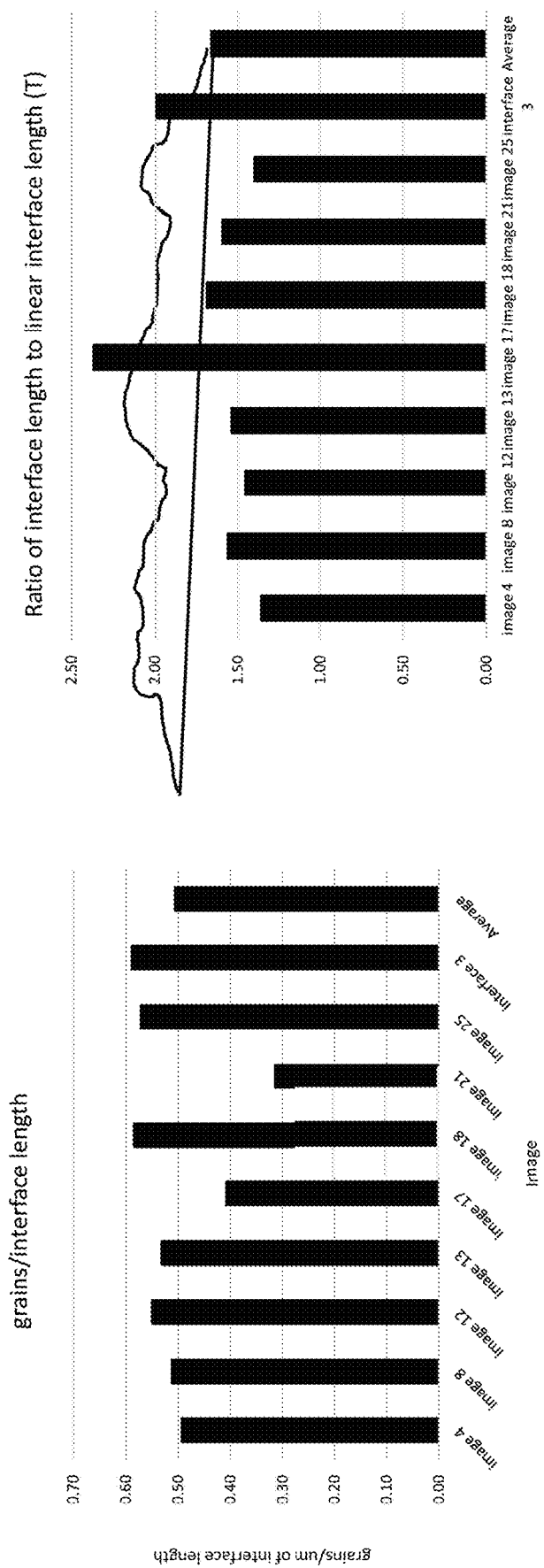
FIG. 20 a) illustrates the number of grains per interface length in um of the non-linear interface 104 and b) depicts the tortuosity (T) of the interface 104 according to embodiments as disclosed herein.

The number of grains in contact across the interface may also play a role in adhesion and strength characteristics of interface 104. The number of grains were counted across an interface length to obtain the number of grains per um. FIG. 20 a) illustrates the number of grains per interface length in um of the interface defined by the at least one first layer 100 and the at least one second layer 102 across 10 images, with smaller numbers of grains per micron preferable. In embodiments, the number of grains per micron comprises from 0.2 to 0.8 grains per um, preferably from 0.3 to 0.6 grains per um, preferably from 0.4 to 0.55 grains per micron for a multilayer sintered ceramic body comprising YAG as an at least one first layer 100 and a second layer of about 16% by volume of zirconia in an alumina matrix. FIG. 20 b) depicts the ratio of interface length to the linear measurement (also defined herein as the tortuosity, T) across the image as disclosed, of about 54 um. Higher ratios of interface length to linear interface length (tortuosity, T) are preferable to increase adhesion strength between the at least one first 100 and second layers 102.

In order to provide high mechanical strength and rigidity, the thickness d2 of the at least one second layer 102 as depicted in FIG. 1 is preferably greater than the thickness d1 of the at least one first layer 100. The thickness d1 of the at least one first layer 100 may be from 0.5 to 5 mm, preferably from 0.5 to 4 mm, preferably from 0.5 to 3 mm, preferably from 0.5 to 2 mm, preferably from 0.6 to 5 mm, preferably from 0.6 to 3 mm, preferably from 1 to 5 mm, preferably from 1 to 4 mm, preferably from 1 to 3 mm, preferably from 2 to 4 mm, and preferably from 2 to 3 mm. The multilayer sintered ceramic bodies 98 as disclosed herein may have a total thickness (d1+d2) of from about 10 to about 40 mm, preferably from about 10 to about 35 mm, preferably from about 10 to about 33 mm, preferably from about 10 to about 30 mm, preferably from about 10 to about 25 mm, and preferably from about 10 to about 20 mm. In certain embodiments, it may be desirable to minimize the thickness of the at least one first layer 100, and as such the multilayer sintered ceramic body 98 may be optionally machined after sintering and/or after annealing to reduce the thickness d1 of layer 100 to modify electrical, thermal or other properties of the multilayer sintered body 98 or component formed therefrom.

The pressure-assisted (and in preferred embodiments pressure-and-current assisted, such as SPS) sintering processes as disclosed herein provide for the preparation of unitary, multilayer sintered ceramic bodies from at least two layers of calcined powder mixtures disposed in the tool set (powder compact) without the use of dopants and/or sintering aids. The unitary, multilayer sintered body 98 is formed from layers of the calcined powder mixtures which are thereafter formed into the at least one first 100 and second 102 layers, respectively, of the sintered body in an in-situ sintering step (without the formation of films, tapes, or green bodies as is common in the art). The pressure-assisted methods produce a unitary, multilayer sintered ceramic body of high density without the requirement of matching sintering rates of the pressureless methods as known to those skilled in the art. The absolute value of the CTE difference between the at least one first 100 and second 102 layers of the sintered body is preferably within the ranges as disclosed herein, to avoid the cracking and fracture arising from CTE mismatch outside the disclosed ranges (which may be experienced during sintering as well as during other thermal excursions such as annealing and similar).

The aforementioned corrosion resistant, unitary multilayer sintered ceramic components, comprising a at least one second layer 102 of high strength having a CTE within a specific range of the at least one first layer 100, may lend themselves to fabrication of large corrosion resistant, multilayer sintered components of dimensions from 100 mm to 625 mm, with regard to the greatest dimension of the multilayer sintered body. The large component dimensions described herein may further be enabled by the increased interfacial length and interlocking effect of the nonlinear interface 104 between the at least one first layer 100 and the at least one second layer 102.

Method of Preparing

Preparation of the multilayer sintered ceramic body may be achieved by use of pressure assisted sintering, such as for example Spark Plasma Sintering (SPS), also known as Field Assisted Sintering Technology (FAST), or Direct Current Sintering (DCS). These direct current sintering assisted, and related techniques employ a direct current to heat up an electrically conductive die configuration or tool set, and thereby a material to be sintered. This manner of heating allows the application of very high heating and cooling rates, enhancing densification mechanisms over grain growth promoting diffusion mechanisms, which may facilitate preparation of ceramic sintered bodies of very fine grain size, and transferring the intrinsic properties of the original powders into their near or fully dense products. The pressure and current assisted methods as disclosed herein utilize a preferably unpulsed, continuous direct current to heat the tool set as disclosed herein.

Preparation of the multilayer sintered ceramic bodies as disclosed herein may also be achieved through use of pressure assisted sintering methods such as Uniaxial Hot Pressing whereby the die configuration or tool set is heated by way of an externally applied heat source such as induction heating.

The above-mentioned characteristics of the corrosion resistant multilayer sintered ceramic body according to an embodiment are achieved in part by adapting the purity and specific surface area (SSA) of the first and second powder mixtures, the pressure to the first and second powder mixtures, the temperature of the first and second powder mixtures, the duration of sintering of the first and second powder mixtures, the temperature of the multilayer sintered ceramic body during the optional annealing step, and the duration of the annealing step.

Disclosed is a method for preparing a multilayer sintered ceramic body, the method comprising the steps of: a) combining at least two powders selected from the group consisting of yttria, alumina, zirconia, and magnesia to make a first powder mixture; b) combining alumina powder wherein the alumina powder comprises at least one of stabilized zirconia and partially stabilized zirconia to make a second powder mixture; c) calcining the first and second powder mixtures by applying heat to raise the temperature of the powder mixtures to a calcination temperature and maintaining the calcination temperature to perform calcination to form first and second calcined powder mixtures; d) separately disposing the first and second calcined powder mixtures inside a volume defined by a tool set of a sintering apparatus to form at least one layer of the first calcined powder mixture and at least one layer of the second calcined powder mixture and creating vacuum conditions inside the volume; e) applying pressure to the layers of the first and second calcined powder mixtures while heating to a sintering temperature and performing sintering to form the multilayer sintered ceramic body, wherein the at least one layer of the first calcined powder mixture upon sintering forms at least one first layer, and the at least one layer of the second powder mixture forms at least one second layer; and f) lowering the temperature of the multilayer sintered ceramic body, wherein the first layer comprises at least one crystalline phase of a ceramic material selected from the group consisting of (i) YAG, (ii) magnesium aluminate spinel, and (iii) yttria and zirconia wherein the zirconia is present in an amount of not less than 10 mol % $ZrO_2$ and not greater than 25 mol % $ZrO_2$, preferably not less than 12 mol % and not greater than 25 mol % $ZrO_2$, preferably not less than 15 mol % and not greater than 25 mol % $ZrO_2$, preferably not less than 18 and not greater than 25 mol % $ZrO_2$, preferably not less than 10 mol % and not greater than 23 mol % $ZrO_2$, preferably not less than 10 mol % and not greater than 20 mol % $ZrO_2$, and preferably not less than 15 mol % and not greater than 23 mol % $ZrO_2$, and the balance comprising $Y_2O_3$, wherein first and second calcined powder mixtures have a total impurity content of 150 ppm and less, wherein the at least two powders selected from the group consisting of yttria, alumina, zirconia and magnesia each have a specific surface area of about 18 $m^2/g$ and less as measured according to ASTM C1274.

The following additional steps are optional; g) annealing the multilayer sintered ceramic body by applying heat to raise the temperature of the multilayer sintered ceramic body to reach an annealing temperature, performing annealing; and h) lowering the temperature of the annealed multilayer sintered ceramic body; and i) machining the multilayer sintered ceramic body or the annealed multilayer sintered ceramic body to create a multilayer sintered ceramic component in the shape of a dielectric window, an RF window, a focus ring, a process ring, a deposition ring, a nozzle or a gas injector, a shower head, a gas distribution plate, an etch chamber liner, a plasma source adapter, a gas inlet adapter, a diffuser, an electrostatic wafer chuck (ESC), a chuck, a puck, an ion suppressor element, a faceplate, an isolator, a spacer, and/or a protective ring in plasma processing chambers.

Step a) of the method as disclosed herein comprises combining at least two powders selected from the group consisting of yttria, alumina, zirconia, and magnesia to make a first powder mixture; the starting powder materials comprising the first powder mixture are combined and mixed in proportions such that the at least one first powder mixture upon sintering forms an at least one first layer comprising at least one crystalline phase of a ceramic material comprising YAG, magnesium aluminate spinel or comprising yttria and zirconia, wherein the zirconia is present in an amount of not less than 10 mol % $ZrO_2$ and not greater than 25 mol % $ZrO_2$, and the balance comprising $Y_2O_3$. The powders selected to form the at least one first powder mixture are preferably high purity (>99.99%) commercially available powders. However, other oxide powders may be used, for example those produced from chemical synthesis processes and related methods as long as the high purity requirement is satisfied. In preferred embodiments, the first powder mixture comprises yttria and alumina.

Particle sizes for the starting powders, powder mixtures and calcined powder mixtures can be measured using a Horiba model LA-960 Laser Scattering Particle Size Distribution Analyzer capable of measuring particle size from 10 nm to 5 mm. Specific surface area (SSA) for the starting powders, powder mixtures and calcined powder mixtures can be measured using a Horiba BET Surface Area Analyzer model SA-9601 capable of measuring across a specific surface area of 0.01 to 2000 $m^2/g$ with an accuracy of 10% and less for most samples. Purity of the starting powders, powder mixtures and calcined powder mixtures can be measured using ICP-MS measurements using an Agilent 7900 ICP-MS model G8403 capable of analysis of lighter elements (such as from Sc and smaller atomic numbers) to about 1.4 ppm, and heavier elements (such as higher atomic numbers than Sc) to about 0.14 ppm. Purity is reported herein as a percent relative to 100% purity, which represents a material comprising the intended constituents only, without impurities, dopants, sintering aids and the like. Impurity contents are reported herein in ppm relative to a total mass of the material under assessment. Silica is not disclosed in the purity and impurity reporting and may be measured in amounts of about 14 ppm using the ICP-MS methods as disclosed herein.

The d10 particle size of the yttrium oxide powder used as a starting material according to embodiments as disclosed herein is preferably from 1 to 6 µm, preferably from 1 to 5 µm, preferably from 1 to 4 µm, preferably from 2 to 6 µm, preferably from 3 to 6 µm, preferably from 4 to 6 µm, preferably from 2 to 4 µm.

The d50 particle size of the yttrium oxide powder used as a starting material according to embodiments as disclosed herein is preferably from 3 to 9 µm, preferably from 3 to 8.5 µm, preferably from 3 to 8 µm, preferably from 3 to 7 µm, preferably from 4 to 9 µm, preferably from 5 to 9 µm, preferably from 6 to 9 µm, preferably from 4 to 8 µm. The yttria powder as disclosed herein may have an average particle size of from about 5 to 9 µm.

The d90 particle size of the yttrium oxide powder used as a starting material according to embodiments as disclosed herein is preferably from 6 to 16 µm, preferably from 6 to 15 µm, preferably from 6 to 14 µm, preferably from 6.5 to 16 µm, preferably from 7 to 16 µm, preferably from 7.5 to 16 µm, preferably from 7.5 to 14 µm.

The yttrium oxide powder typically has a specific surface area (SSA) of from 2 to 10 $m^2/g$, preferably from 2 to 8 $m^2/g$, preferably from 2 to 6 $m^2/g$, preferably from 3 to 10 $m^2/g$, preferably from 4 to 10 $m^2/g$, preferably from 6 to 10 $m^2/g$, preferably from 2 to 4 $m^2/g$.

The purity of the yttrium oxide starting material is preferably higher than 99.99%, preferably higher than 99.995%, preferably higher than 99.999%, more preferably higher than 99.9995%, and more preferably about 99.9999%. This corresponds to impurity levels of 100 ppm and less, preferably 50 ppm and less, preferably 25 ppm and less, preferably 10 ppm and less, more preferably about 1 ppm, preferably from 1 to 100 ppm, preferably from 1 to 50 ppm, preferably from 1 to 25 ppm, preferably from 1 to 10 ppm, preferably from 1 to 5 ppm.

The average or d50 particle size of the magnesium oxide powder used as a starting material according to embodiments as disclosed herein is typically from 1.5 to 5.5 µm, from 2 to 5.5 µm, from 2.5 to 5.5 µm, from 3 to 5.5 µm, from 1.5 to 5 µm, from 1.5 to 4.5 µm, more preferably from 2 to 4.5 µm.

The d90 particle size of the magnesium oxide powder used as a starting material according to embodiments as disclosed herein is typically from 4 to 9 µm, preferably from 5 to 9 µm, preferably from 6 to 9 µm, preferably from 4 to 8 µm preferably from 4 to 7 µm and more preferably from 5 to 7.5 µm.

The magnesium oxide powder typically has a specific surface area (SSA) of from 0.5 to 10 $m^2/g$, preferably from 0.5 to 8 $m^2/g$, preferably from 0.5 to 6 $m^2/g$, preferably from 1 to 10 $m^2/g$ preferably from 2 to 10 $m^2/g$ preferably from 3 to 10 $m^2/g$ and more preferably from 2 to 6 $m^2/g$. The purity of the magnesium oxide starting material is preferably higher than 99.99%, preferably higher than 99.995%, more preferably higher than 99.9975%, preferably higher than 99.999%, and preferably higher than 99.9992% as measured using ICPMS methods as known in the art. Correspondingly, the impurity content of the magnesia powder may be 100 ppm and less, preferably 50 ppm and less, preferably 25 ppm and less, preferably about 10 ppm.

The zirconia powder in accordance with step a) may be selected from the group consisting of unstabilized, partially stabilized and stabilized zirconia. Reaction between the zirconia and yttria powders to form at least one crystalline phase makes it possible to use any zirconia powder, without the need for stabilization of the tetragonal/monoclinic phase transformation that occurs with phase pure zirconia. As such, the zirconia powder to form the at least one first layer may comprise any one of or combinations of unstabilized, partially stabilized and stabilized zirconia. Additional powder characteristics of zirconia and alumina (according to the second powder mixture) are disclosed in step b) of the method following.

The d50 as used herein is defined as the median and represents the value where half of the particle size distribution resides above this point, and half resides below this point. Similarly, 90 percent of the distribution lies below the d90, and 10 percent of the distribution lies below the d10.

The starting powders as disclosed herein of zirconia, yttria, magnesia and alumina are preferably crystalline, and thereby have a long-range crystallographic order. Starting powders having high surface areas such as those exceeding 20 $m^2/g$ pose issues in handleability when loading the tool set with the powder mixtures as disclosed herein, and also create difficulty in achieving uniform dispersion and intimate mixing during the powder combination/mixing step. Thus, in embodiments it is preferable that the powder mixtures and/or calcined powder mixtures as disclosed herein are free of, or substantially free of nanopowders, and have a specific surface area (SSA) of about 18 $m^2/g$ and less.

Starting powders having specific surface area of less than about 1 $m^2/g$ may suffer from agglomeration and require higher energy for mixing and extended mixing times and may reduce the sintering activation energy, thus producing sintered ceramic bodies having lower densities and higher porosity. Preferable for use in the method as disclosed are starting powders as disclosed herein having a SSA of from 1 to 18 $m^2/g$, preferably from 2 to 15 $m^2/g$, preferably from 3 to 12 $m^2/g$.

Combining the at least two alumina, magnesia, yttria and zirconia powders to make at least first and second powder mixtures (in accordance with either or both of steps a) and b) may be performed using the powder preparation techniques of wet or dry ball (axially rotating) milling, wet or dry tumble (end over end or vertical) mixing, jet milling, and combinations of these. Use of these powder combination methods provide a high energy process which breaks down particulates and agglomerates.

Using dry conditions, the starting powders may be ball milled or end-over-end/tumble mixed using high purity (>99.9%) alumina media in order to preserve the purity of the starting powders during mixing. In other embodiments, zirconia media may be used to break up hard agglomerates. The high purity alumina media was tested using ICPMS methods as disclosed herein and found to have a purity of from 99.9 to about 99.99%. Use of zirconia media may result in trace amounts, such as less than 100 ppm, of zirconia in the multilayer sintered ceramic body. Media used to perform dry ball milling may have a range of dimensions, from for example 5 to 15 mm in diameter, added at a loading of from about 50 to about 100% by powder weight. Media used to perform dry tumble mixing may comprise at least one media element of large dimension (from about 20 to 40 mm diameter) without limitation. Dry ball milling and/or dry tumble mixing may be performed for durations of from 12 to 48 hours, preferably from 16 to 48 hours, preferably from 16 to 24 hours, preferably from 18 to 22 hours. Dry ball milling or tumble milling processes (axially rotating) may use an RPM of from 50 to 250 RPM, preferably from 75 to 200 RPM, preferably from 75 to 150 RPM, preferably from 100 to 125 RPM, each for containers having about 200 mm diameter. RPMs may vary dependent upon the dimensions of containers selected for use, and as such, those containers greater than 200 mm in diameter may have correspondingly lower RPMs as known to those skilled in the art. Dry end-over-end/tumble mixing may be performed at an RPM of from 10 to 30 rpm, preferably about 20 RPM. After dry ball milling and/or end-over-end/tumble milling/mixing, the powder mixture may be optionally sieved using any number of meshes which may have openings of for example from 45 to 400 um, and blended, without limitation as to repetition or order as known to those skilled in the art.

Wet ball milling or wet end-over-end/tumble mixing may be performed by suspending the starting powders in various solvents such as ethanol, methanol, and other alcohols, to form a slurry. The slurries in either process may be formed having a powder loading during milling or mixing of from 25 to 75% by powder weight, preferably from 40 to 75% by powder weight, preferably from 50 to 75% by powder weight. Wet ball milling or wet end-over-end/tumble mixing may provide for improved dispersion of the powders through increased mobility, resulting in fine scale, uniform mixing before heat treatment or calcination. In embodiments, a dispersant may optionally be added to the slurry using any number of commercially available dispersants such as for example poly methyl methacrylate (PMMA) and polyvinyl pyrrolidone (PVP) and other dispersants as known to those skilled in the art. The dispersant may optionally be added in amounts from 0.05 to 0.2% by powder weight, preferably from 0.05 to 0.1% by powder weight. Media loadings for either wet ball or wet tumble/end-over-end mixing may be varied from a loading of 30 to 100% by powder weight, preferably from 30 to 75% by powder weight, preferably from 30 to 60% by powder weight. Wet ball milling or tumble mixing may be performed for durations of from 8 to 48 hours, preferably from 12 to 48 hours, preferably from 16 to 48 hours, preferably from 8 to 36 hours, preferably from 8 to 24 hours, preferably from 16 to 24 hours preferably from 12 to 24 hours. Ball milling may use an RPM of from 50 to 250 RPM, preferably from 75 to 200 RPM, preferably from 75 to 150 RPM, preferably between 100 and 125 RPM, each for containers having about 200 mm diameter. RPMs may vary dependent upon the dimensions of containers selected for use, and those greater than for example 200 mm in diameter may have correspondingly lower RPM as known to those skilled in the art. Wet end over end/tumble mixing may be performed at an RPM of from 10 to 30 rpm, preferably about 20. After wet ball milling and/or wet end-over-end/tumble mixing, the powder mixture may be optionally sieved using any number of meshes which may have openings of for example from 45 to 400 um, and blended, without limitation as to repetition or order as known to those skilled in the art.

Jet milling processes as known to those skilled in the art may also be used to thoroughly mix the powders to form a powder, powder mixture or calcined powder mixture having a narrow particle size distribution. Jet milling uses high velocity jets of either inert gases or air to collide particles of the starting powders and/or powder mixtures and/or calcined powder mixtures without the use of milling or mixing media, thus preserving initial purity of the powder to be milled. The chamber may be designed such that larger particles may be preferentially reduced in size, which may provide a narrow particle size distribution in the final powders, powder mixture or calcined powder mixture. Powders exit the jet milling chamber upon reaching a predetermined particle size as determined at setup of the machine prior to processing, thus ending the process. Starting powders, powder mixtures and/or calcined powder mixtures as disclosed herein may be subjected to jet milling at pressures of about 100 psi, whether separately, or in combination with any, or all of, the as disclosed powder milling/mixing processes as disclosed herein. After jet milling, the powders or powder mixtures may be optionally sieved using any number of meshes which may have openings of for example from 45 to 400 um, and blended, without limitation as to repetition or order as known to those skilled in the art.

The additional powder preparation procedures of attrition milling, high shear mixing, planetary milling, and other known procedures may also be applied. The aforementioned powder preparation techniques may be used alone or in any combination thereof, or upon more than one powder mixture which are thereafter sintered to form a unitary, multilayer sintered ceramic body.

Where wet mixing or milling processes are used, the slurry may be dried by rotary evaporation methods for example at a temperature of from about 40° C. to 90° C. for a duration of from 1 to 4 hours, dependent upon the volume of slurry to be dried, as known to those skilled in the art. In other embodiments, the slurry may be dried using spray drying techniques as known to those skilled in the art. After drying, the powder mixture may be optionally sieved using a mesh having openings of for example from 45 to 400 um, and blended, without limitation as to repetition or order. The aforementioned powder preparation techniques may be used alone or in any combination thereof.

After drying, the specific surface area of the powder mixture of step a) may be from 2 to 18 $m^2$/g, preferably from 2 to 17 $m^2$/g, preferably from 2 to 14 $m^2$/g, preferably from 2 to 12 $m^2$/g, preferably from 2 to 10 $m^2$/g, preferably from 4 to 17 $m^2$/g, preferably from 6 to 17 $m^2$/g, preferably from 8 to 17 $m^2$/g, preferably from 10 to 17 $m^2$/g, preferably from 4 to 12 $m^2$/g, preferably from 4 to 10 $m^2$/g, and preferably from 5 to 8 $m^2$/g.

The purity of the powder mixtures may be maintained after mixing/milling from that of the starting materials through the use of milling media of high purity, for example aluminum oxide media of purity 99.99% and greater. In embodiments, use of zirconium oxide milling media may be preferable and may introduce zirconium oxide to the extent it remains in the at least one first and second layer of the multilayer sintered ceramic body in amounts of from 15 to 100 ppm, from 15 to 75 ppm, preferably from 15 to 60 ppm, preferably from 20 to 30 ppm.

Step b) of the method as disclosed herein comprises combining alumina powder wherein the alumina comprises at least one of stabilized zirconia and partially stabilized zirconia to make a second powder mixture; the starting powder materials comprising the second powder mixture including aluminium oxide and zirconium oxide (comprising at least one of stabilized zirconia and partially stabilized zirconia) for forming at least one second layer are preferably high purity commercially available powders.

The following properties for powders of zirconia and alumina also apply to step a) (with the exception that the zirconia of step a) may comprise any one or combinations of unstabilized, partially stabilized and stabilized zirconia). The zirconia powders in accordance with step b) are preferably stabilized, partially stabilized and combinations thereof.

The zirconium oxide powder may have a particle size distribution having a d10 of between 0.08 and 0.20 um, a d50 of between 0.3 and 0.7 um and a d90 of between 0.9 and 5 μm. The average particle size of the zirconium oxide powder used as a starting material for the mixture according to one embodiment of the present invention may be from 0.3 to 1 um.

The zirconia powder typically has a specific surface area of from 1 to 16 m²/g, preferably between 2 to 12 m²/g, and more preferably between 5 to 9 m²/g, and the purity of the zirconia powder starting material is typically higher than 99.5%, preferably higher than 99.8%, preferably higher than 99.9%, and preferably higher than 99.99%. This corresponds to a total impurity content of 5000 μm and less, preferably 2000 ppm and less, preferably 1000 ppm and less, preferably 100 ppm and less. Zirconia as used herein comprises Hf in low amounts of about 2 to 5 mol % as is common in many commercially available zirconia powders.

In embodiments, the zirconia powder may comprise stabilizing compounds comprising at least one selected from the group consisting of yttria, lanthanum oxide ($La_2O_3$), ceria, magnesia, samaria ($Sm_2O_3$), and calcia and combinations thereof. To form partially stabilized zirconia (PSZ), these stabilizing compounds may each be present in amounts of from 0.5 to 50 mol %, preferably from 0.5 to 30 mol %, preferably from 0.5 to 15 mol %, preferably from 0.5 to 10 mol %, preferably from 1 to 50 mol %, preferably from 1 to 30 mol %, preferably from 1 to 10 mol %, preferably from 1 to 5 mol %, and preferably about 3 mol %. To form stabilized zirconia (SZ), these stabilizing compounds may each be present in amounts of from greater than 6 to about 45 mol %, preferably from greater than 10 to about 45 mol %, preferably from greater than 25 to about 45 mol %, preferably from greater than 6 to 30 mol %, preferably from greater than 6 to about 15 mol %, preferably from greater than 8 to 15 mol %. The following Table 7 provides additional guidance for stabilizing or partially stabilizing zirconia.

The d90 particle size of the aluminum oxide powder used as a starting material according to one embodiment of the present invention is preferably from 15 to 40 μm, preferably from 15 to 30 μm, preferably from 15 to 25 μm, preferably from 20 to 40 μm, preferably from 30 to 40 μm, and preferably from 20 to 30 μm.

The aluminum oxide powder typically has a specific surface area of from 4 to 18 m²/g, preferably from 4 to 14 m²/g, preferably from 4 to 10 m²/g, preferably from 4 to 6 m²/g, preferably from 6 to 18 m²/g, preferably from 6 to 14 m²/g, preferably from 8 to 18 m²/g, preferably from 10 to 18 m²/g, preferably from 8 to 10 m²/g, and preferably from 6 to 10 m²/g.

The purity of the aluminum oxide starting material is typically higher than 99.99%, preferably higher than 99.995%, preferably higher than 99.999%, and preferably higher than 99.9995%, as measured using ICPMS methods. Correspondingly, the impurity content of the alumina powder may be 100 ppm and less, preferably 50 ppm and less, preferably 25 ppm and less preferably 10 ppm and less, and more preferably 5 ppm and less.

The alumina and zirconia powders are mixed in proportions such that the zirconia is present in an amount of from 10 to 30%, preferably from 10 to 25%, preferably from 10 to 20%, preferably from 15 to 25%, preferably from 20 to 25%, and preferably from 15 to 20% each by volume of the at least one second layer (upon sintering) of the multilayer sintered ceramic body.

Combining the alumina and zirconia powders to make a powder mixture may be performed in accordance with the materials and methods as disclosed in Step a).

Step c) of the method disclosed herein comprises calcining the first and second powder mixtures by applying heat to raise the temperature of the powder mixtures to a calcination temperature and maintaining the calcination temperature to

TABLE 7

| stabilizing compound | partially stabilized zirconia, mole % | stabilized zirconia, mole % | partially stabilized zirconia, wt % | stabilized zirconia, wt % |
|---|---|---|---|---|
| yttrium oxide (Y2O3) | 1 to 8 mole % | >8 to 15 mole % | 1.8 to 14 wt% | >14 to 25 wt % |
| magnesium oxide (MgO) | 1 to 50 mol % | N/A | 0.2 to 16 wt% | N/A |
| ceria (CeO2) | 1 to 12 mole % | >12 to 20 mol % | 1 to 15 wt% | >15 to 25 |
| lanthanum oxide (La2O3) | 0.5 to 7 mole % | >7 to 12 mol % | 1 to 15 wt% | >16 to 27 |
| calcia (CaO) | 1 to 28 mole % | >28 to 43 mol % | 0.5 to 15 wt% | >15 to 25 |
| samaria (Sm2O3) | 0.5 to 6 mole % | >6 to 12 mol % | 1 to 15 wt% | >15 to 27 |

In certain embodiments, the at least one second layer is yttria stabilized and formed from a powder mixture comprising zirconia selected from the group consisting of partially yttria stabilized or fully yttria stabilized zirconia. Yttria partially stabilized zirconia (YSZ) may be formed from powder mixtures comprising from about 1 to 10 mol % yttria, preferably from 1 to 8 mol % yttria, preferably from 1 to 5 mol % yttria, preferably from 2 to 4 mol % yttria, preferably about 3 mol % yttria.

The d10 particle size of the aluminum oxide powder used as a starting material according to one embodiment of the present invention is preferably from 0.1 to 0.5 μm, preferably from 0.1 to 0.4 μm, preferably from 0.1 to 0.3 μm, preferably from 0.2 to 0.5 μm, preferably from 0.3 to 0.5 μm, preferably from 0.4 to 0.5 μm, preferably from 0.1 to 0.2 μm.

The d50 particle size of the aluminum oxide powder used as a starting material according to one embodiment is usually from 2 to 8 μm, preferably from 2 to 7 μm, preferably from 2 to 6 μm, preferably from 3 to 8 μm, preferably from 4 to 8 μm, preferably from 5 to 8 μm and more preferably from 2.5 to 5 μm.

perform calcination to form first and second calcined powder mixtures. This step may be conducted such that moisture may be removed and surface condition of the powder mixture is uniform prior to sintering. Calcination in accordance with the heat treatment step may be performed at temperatures of from 600° C. to 1200° C., preferably from 600 to 1100° C., preferably from 600 to 1000° C., preferably from 600 to 900° C., preferably from 700 to 1100° C., preferably from 800 to 1100° C., preferably from 800 to 1000° C., and preferably from 850 to 950° C. Calcination may be performed for durations of from 4 to 12 hours, preferably from 4 to 10 hours, preferably from 4 to 8 hours, preferably from 6 to 12 hours, preferably from 4 to 6 hours in an oxygen containing environment. After calcination, the powder mixtures may be sieved and/or tumbled and/or blended according to known methods to form at least the first and second calcined powder mixtures. Calcination may or may not result in a reduction in specific surface area.

The first and second calcined powder mixtures may have a d10 particle size of preferably from 0.1 to 4 μm, preferably from 0.2 to 4 µm, preferably from 0.3 to 4 µm, preferably from 0.4 to 4 µm, preferably from 0.1 to 3 µm, preferably from 0.1 to 2 µm, preferably from 0.1 to 3 µm, preferably from 0.1 to 2 µm, preferably from 0.1 to 1 µm.

The first and second calcined powder mixtures may have a d50 particle size of from 3 to 50 µm, preferably from 3 to 40 µm, preferably from 3 to 30 µm, preferably from 3 to 20 µm, preferably from 3 to 10 µm, preferably from 5 to 50 µm, preferably from 10 to 50 µm, preferably from 20 to 50 µm, preferably from 30 to 50 µm, preferably from 3 to 8 µm, preferably from 5 to 10 µm, preferably from 6 to 15 µm.

The first and second calcined powder mixtures may have a d90 particle size of from 10 to 350 µm, preferably from 10 to 300 µm, preferably from 10 to 250 µm, preferably from 10 to 200 µm, preferably from 10 to 175 µm, preferably from 10 to 150 µm, preferably from 10 to 100 µm, preferably from 10 to 75 µm, preferably from 10 to 50 µm, preferably from 10 to 40 µm preferably from 10 to 25 µm, preferably from 20 to 350 µm, preferably from 40 to 350 µm, preferably from 60 to 350 µm, preferably from 100 to 350 µm, preferably from 150 to 350 µm, preferably from 200 to 350 µm, preferably from 12 to 330 um, preferably from 100 to 330 µm, and preferably from 100 to 250 µm.

In certain embodiments, higher temperature calcination conditions as disclosed herein may result in formation of crystalline phases and agglomeration of the calcined powder mixtures and thus greater variability in particle size distributions overall and in particular larger d50 and d90 particle sizes may result. In other embodiments, lower temperature calcination conditions as disclosed herein may not affect particle size distributions of the calcined powder mixtures relative to the starting materials and thereby particle size distributions are in the same range, or similar to, the starting powder materials. Lot to lot variation and management of heat transfer during calcination may also contribute to particle size distributions. Thus, a broad range of particle size distributions, and in particular d50 and d90 particle sizes of the powder mixtures, may result from calcination conditions as disclosed herein.

The first and second calcined powder mixtures may each have a specific surface area (SSA) of from about 1 $m^2/g$ to about 18 $m^2/g$, preferably from about 1 $m^2/g$ to about 14 $m^2/g$, preferably from about 1 $m^2/g$ to about 10 $m^2/g$, preferably from about 1 $m^2/g$ to about 8 $m^2/g$, preferably from about 2 $m^2/g$ to about 18 $m^2/g$, preferably from about 2 $m^2/g$ to about 14 $m^2/g$, preferably from about 2 $m^2/g$ to about 10 $m^2/g$, preferably from about 3 $m^2/g$ to about 9 $m^2/g$, preferably from about 3 $m^2/g$ to about 6 $m^2/g$ as measured according to ASTM C1274.

The first calcined powder mixture may have a total impurity content of from 5 to 200 ppm, preferably from 5 to 150 ppm, preferably less than 100 ppm, preferably less than 50 ppm, preferably less than 25 ppm, preferably less than 15 ppm, preferably from 10 to 100 ppm, preferably from 10 to 80 ppm, preferably from 10 to 60 ppm, preferably from 10 to 40 ppm, preferably from 20 to 80 ppm, and preferably from 30 to 60 ppm relative to a mass of the first calcined powder mixture.

Table 8 shows ICPMS purity results of an exemplary precursor powder mixture prior to being formed into a spinel layer.

TABLE 8

Spinel ($MgAl_2O_4$) Calcined Powder Mixture

| Element | Average Impurity (ppm) | Element | Average Impurity (ppm) |
|---|---|---|---|
| Li 6/7 | 0.0601 | Cd 111 | <0.0035 |
| Be 9 | <0.007 | In 115 | <0.0035 |
| B 11 | <0.0007 | Sn 118 | 0.0201 |
| Na 23 * | <0.35 | Sb 121 | <0.007 |
| Mg 24 | N/A | Te 126, 8, 30 | 0.0824 |
| Al 27 | N/A | Cs 133 | 0.0564 |
| Si 28 | <14 | Ba 137 | 0.3269 |
| K 39/41* | 1.9072 | La 138/139 | 0.0660 |
| Ca 43/44* | 1.9106 | Ce 140 | 0.1585 |
| Sc 45 | <0.035 | Pr 141 | 0.0076 |
| Ti 47 | <0.035 | Nd 146 | 0.0215 |
| V 51 | 0.0990 | Sm 147 | 0.0041 |
| Cr 52 | 0.2889 | Eu 153 | 0.0024 |
| Mn 55 | 0.1675 | Gd 157 | 0.0081 |
| Fe 56 | 1.5463 | Tb 159 | 0.0023 |
| Co 59 | 0.0114 | Dy 163 | <0.0021 |
| Ni 60 | 0.3177 | Ho 165 | <0.0021 |
| Cu 63 | 0.0111 | Er 166 | 0.2206 |
| Zn 66 | 0.2776 | Tm 169 | 0.0061 |
| Ga 71 | 0.1831 | Yb 171, 2, 3 | <0.0021 |
| Ge 72 | 0.0084 | Lu 175 | 3.3365 |
| As 75 | <0.014 | Hf 178 | <0.007 |
| Se 78 | 0.1546 | Ta 181 | <0.0035 |
| Rb 85 | 0.0193 | W 182 | <0.007 |
| Sr 84/87/88 | 0.0147 | Re 185 | 0.0272 |
| Y 89 | 24.8145 | Ir 193 | 0.0366 |
| Zr 90/92/94 | 2.6021 | Pt 195 | <0.056 |
| Nb 93 | <0.007 | Au 197 | <0.007 |
| Mo 95 | 0.1680 | Tl 205 | 0.0187 |
| Ru 101 | <0.007 | Pb 208 | 0.0575 |
| Rh 103 | 0.0441 | Bi 209 | <0.007 |
| Pd 104, 8, 10 | 0.0350 | Th 232 | 0.0105 |
| Ag 107/109 | <0.014 | U 238 | <0.0035 |

* N/A represents elements present in starting powders forming the powder mixtures Table 9 shows ICPMS purity results of an exemplary precursor powder mixture prior to being formed into a yttria-zirconia layer.

TABLE 9

Yttria-Zirconia Calcined Powder Mixture

| Element | Average (ppm) | Element | Average (ppm) |
|---|---|---|---|
| Li 6/7 | 0.0289 | Cd 111 | <0.0035 |
| Be 9 | <0.007 | In 115 | <0.0035 |
| B 11 | <0.0007 | Sn 118 | <0.014 |
| Na 23 | <0.35 | Sb 121 | 0.3069 |
| Mg 24 | 0.9772 | Te 126, 8, 30 | <0.014 |
| Al 27 | 1.2251 | Cs 133 | 0.0083 |
| Si 28 | <14 | Ba 137 | 0.1805 |
| K 39/41* | <1.4 | La 138/139 | 0.0700 |
| Ca 43/44* | 2.2990 | Ce 140 | 0.0483 |
| Sc 45 | 0.0426 | Pr 141 | 0.0513 |
| Ti 47 | 1.0083 | Nd 146 | 0.0108 |
| V 51 | 0.0305 | Sm 147 | 0.0036 |
| Cr 52 | 0.0286 | Eu 153 | 0.0351 |
| Mn 55 | 0.0597 | Gd 157 | 0.0174 |
| Fe 56 | <0.14 | Tb 159 | 0.0402 |
| Co 59 | 0.0081 | Dy 163 | 0.4822 |
| Ni 60 | 0.0659 | Ho 165 | 0.3116 |
| Cu 63 | 0.1721 | Er 166 | 0.3463 |
| Zn 66 | 0.2433 | Tm 169 | 0.0723 |
| Ga 71 | <0.007 | Yb 171, 2, 3 | 0.0817 |
| Ge 72 | 0.0243 | Lu 175 | 0.0326 |
| As 75 | <0.014 | Hf 178 | N/A |
| Se 78 | <0.035 | Ta 181 | 0.0549 |
| Rb 85 | <0.007 | W 182 | <0.007 |
| Sr 84/87/88 | <0.014 | Re 185 | 0.0077 |
| Y 89 | N/A | Ir 193 | <0.035 |
| Zr 90/92/94 | N/A | Pt 195 | 0.2064 |

TABLE 9-continued

Yttria-Zirconia Calcined Powder Mixture

| Element | Average (ppm) | Element | Average (ppm) |
|---|---|---|---|
| Nb 93 | 0.2199 | Au 197 | 0.5017 |
| Mo 95 | 0.0663 | Tl 205 | 0.0657 |
| Ru 101 | <0.007 | Pb 208 | 0.0632 |
| Rh 103 | <0.042 | Bi 209 | 0.0092 |
| Pd 104, 8, 10 | 0.0308 | Th 232 | 0.0272 |
| Ag 107/109 | 1.0690 | U 238 | 0.0043 |

*N/A represents elements present in starting powders forming the powder mixtures Table 10 shows ICPMS purity results of an exemplary precursor powder mixture 10 prior to being formed into a polycrystalline YAG layer.

TABLE 10

YAG ($Y_3Al_5O_{12}$) Calcined Powder Mixture

| Element | Average Impurity (ppm) | Element | Average Impurity (ppm) |
|---|---|---|---|
| Li 6/7 | 0.0197 | Cd 111 | 0.1989 |
| Be 9 | 0.1808 | In 115 | <0.0035 |
| B 11 | <0.0007 | Sn 118 | 0.0798 |
| Na 23 * | 1.8755 | Sb 121 | 0.0297 |
| Mg 24 | <0.7 | Te 126, 8, 30 | <0.014 |
| Al 27 | N/A | Cs 133 | <0.007 |
| Si 28 | <14 | Ba 137 | <0.056 |
| K 39/41* | <1.4 | La 138/139 | 0.0743 |
| Ca 43/44* | 1.7173 | Ce 140 | 0.0507 |
| Sc 45 | 0.0451 | Pr 141 | 0.0083 |
| Ti 47 | <0.035 | Nd 146 | 0.0264 |
| V 51 | 0.0131 | Sm 147 | 0.0196 |
| Cr 52 | 0.2720 | Eu 153 | 0.0063 |
| Mn 55 | 0.1822 | Gd 157 | 0.0991 |
| Fe 56 | <0.14 | Tb 159 | 0.1991 |
| Co 59 | 0.2041 | Dy 163 | 0.0357 |
| Ni 60 | 0.0978 | Ho 165 | 0.2552 |
| Cu 63 | 0.0660 | Er 166 | 0.1507 |
| Zn 66 | 0.0409 | Tm 169 | 0.1131 |
| Ga 71 | 0.1525 | Yb 171, 2, 3 | 0.1682 |
| Ge 72 | <0.007 | Lu 175 | 0.0133 |
| As 75 | 0.0306 | Hf 178 | 0.0305 |
| Se 78 | <0.035 | Ta 181 | <0.0035 |
| Rb 85 | 0.0526 | W 182 | <0.007 |
| Sr 84/87/88 | 0.3379 | Re 185 | <0.0035 |
| Y 89 | N/A | Ir 193 | <0.035 |
| Zr 90/92/94 | 1.1108 | Pt 195 | <0.056 |
| Nb 93 | <0.007 | Au 197 | 0.0164 |
| Mo 95 | 0.0320 | Tl 205 | 0.0430 |
| Ru 101 | <0.007 | Pb 208 | 0.0094 |
| Rh 103 | <0.042 | Bi 209 | 0.0213 |
| Pd 104, 8, 10 | <0.007 | Th 232 | <0.007 |
| Ag 107/109 | 0.0592 | U 238 | 0.0043 |

* N/A represents elements present in starting powders forming the powder mixtures For each of Tables 8-10, N/D indicates the element was detected below the reporting limit of the ICPMS. The reported purities are across an average of 5 powder mixture lots upon sintering.

The second calcined powder mixture may have a total impurity content of from 5 to 200 ppm, preferably from 5 to 150 ppm, preferably less than 100 ppm, preferably less than 75 ppm, preferably less than 50 ppm, preferably less than 25 ppm, preferably less than 15 ppm, preferably less than 10 ppm, preferably less than 8 ppm, preferably less than 5 ppm, preferably from 5 to 50 ppm, preferably from 5 to 30 ppm, preferably from 3 to 20 ppm.

Table 11 shows ICPMS purity results of an exemplary precursor powder mixture prior to being formed into an alumina—zirconia (ZTA) second layer.

TABLE 11

| Element | Average (ppm) | Element | Average (ppm) |
|---|---|---|---|
| Li 6/7 | 0.177 | Cd 111 | 0.066 |
| Be 9 | N/D | In 115 | 0.039 |
| B 11 | 0.695 | Sn 118 | 0.129 |
| Na 23 * | N/D | Sb 121 | N/D |
| Mg 24 | 2.625 | Te 126, 8, 30 | 0.399 |
| Si 28 | 27.6 | Cs 133 | 0.095 |
| K 39/41* | 5.22 | Ba 137 | 0.660 |
| Ca 43/44* | 3.584 | La 138/139 | 0.165 |
| Sc 45 | 0.191 | Ce 140 | 0.665 |
| Ti 47 | 4.246 | Pr 141 | 0.024 |
| V 51 | 0.296 | Nd 146 | 0.112 |
| Cr 52 | 0.267 | Sm 147 | 0.051 |
| Mn 55 | 0.096 | Eu 153 | N/D |
| Fe 56 | N/D | Gd 157 | 0.016 |
| Co 59 | 0.109 | Tb 159 | 0.034 |
| Ni 60 | 0.203 | Dy 163 | 0.028 |
| Cu 63 | 0.276 | Ho 165 | 0.020 |
| Zn 66 | 0.877 | Er 166 | 0.048 |
| Ga 71 | 0.404 | Tm 169 | 0.023 |
| Ge 72 | 0.540 | Yb 171, 2, 3 | 0.050 |
| As 75 | 1.625 | Lu 175 | 0.028 |
| Se 78 | N/D | Ta 181 | N/D |
| Rb 85 | 0.245 | W 182 | 0.111 |
| Sr 84/87/88 | 0.213 | Re 185 | 0.140 |
| Nb 93 | 0.167 | Ir 193 | 0.059 |
| Mo 95 | 1.585 | Pt 195 | 0.605 |
| Ru 101 | 0.246 | Au 197 | 2.805 |
| Rh 103 | N/D | Tl 205 | 0.049 |
| Pd 104, 8, 10 | 0.123 | Pb 208 | 0.098 |
| Ag 107/109 | 0.854 | Bi 209 | 0.206 |
| | | Th 232 | 0.070 |
| | | U 238 | 0.016 |

The results of Table 11 are averaged across 5 powder lots. As depicted in Table 11, the second calcined powder mixture may comprise magnesia in an amount of about 5 ppm and less, preferably 3 ppm and less, as measured relative to a mass of the at least one second calcined powder mixture. The calcined powder mixtures comprising alumina and at least one of stabilized and partially stabilized zirconia as disclosed herein are free of, or substantially free of dopants and/or sintering aids as disclosed herein.

The starting powders comprising at least one first and second powder mixtures have varying properties of for example, particle size and purity. As such, features of the powder mixture, such as purity, may be higher than at least one of the starting powders alone due to combination with another starting powder which may be higher in purity.

Step d) of the method disclosed herein comprises separately disposing the first and second calcined powder mixtures inside a volume defined by a tool set of a sintering apparatus to form at least one layer of the first calcined powder mixture and at least one layer of the second calcined powder mixture and creating vacuum conditions inside the volume. A spark plasma sintering (SPS) apparatus used in the process as disclosed herein comprises at least a graphite die which is usually a cylindrical graphite die. In the graphite die, first and second calcined powder mixtures are separately disposed between two graphite punches to form at least two separate layers.

In preferred embodiments, the SPS tool comprises a die comprising a sidewall comprising an inner wall and an outer wall, wherein the inner wall has a diameter that defines an inner volume capable of receiving at least one ceramic powder; and an upper punch and a lower punch operably coupled with the die, wherein each of the upper punch and the lower punch have an outer wall defining a diameter that is less than the diameter of the inner wall of the die thereby defining a gap between each of the upper punch and the lower punch and the inner wall of the die when at least one of the upper punch and the lower punch are moved within the inner volume of the die, wherein the gap is from 10 μm to 100 μm wide. Preferably, the die and punches are made of graphite. Such SPS tool is disclosed in U.S. provisional patent application Ser. No. 63/087,204, filed Oct. 3, 2020, which is herein incorporated by reference.

In embodiments, two or more calcined powder mixtures may be disposed within the graphite die. Vacuum conditions as known to those skilled in the art are established within the powder between the punches surrounded by the die. Typical vacuum conditions include pressures of $10^{-2}$ to $10^{-3}$ torr. The vacuum is applied primarily to remove air to protect the graphite from burning and to remove a majority of the air from the powder mixtures. The order of powder mixture disposition may be reversed or repeated as necessary to achieve the desired structure of the multilayer sintered ceramic body and component formed therefrom. In embodiments, layers of the first and second calcined powder mixtures are contiguous as disposed within the graphite die during sintering, and thereafter sinter to form first and second contiguous layers thereby forming interface 104 of the multilayer sintered ceramic body. Disposing the at least one first and at least one second calcined powder mixtures inside the volume defined by the tool set typically results in intermixing of the first and second calcined powder mixtures, thereby creating the tortuosity as described above of the non-linear interface which is characteristic of the multilayer sintered bodies produced by the method as disclosed herein. This non-linear interface may provide an interlocking effect, and enhanced adhesion, between at least one first and second layers which differs significantly from that of laminates and sintered bodies formed from at least one laminate or pre-sintered body, which have a substantially linear (or one dimensional) interface and as such, the multilayer sintered ceramic bodies as disclosed herein are not laminates or laminated bodies. The at least first and second calcined powder mixtures may be directly loaded into the tool set of the sintering apparatus and sintered, without pre-sintering steps such as use of binders, dispersants and the like, which may contribute to contamination.

The process as disclosed utilizes commercially available, starting powders having micron-sized average particle size distributions or those prepared from chemical synthesis techniques without the requirement of forming a green body or machining the same prior to sintering.

The high densities and low porosities associated with the multi-layer sintered ceramic bodies resulting from the disclosed process and powder materials are achieved without the use of binders or sintering aids in the initial powders. Other sintering techniques require use of sintering aids to lower sintering temperatures, which may adversely impact etch performance and densification. Polymeric binders are also often used to create the aforementioned green bodies, which may contribute to residual porosity and lower densities upon burn out. No binders or sintering aids are required in the making of the sintered corrosion resistant ceramic bodies or multi-phase sintered components formed therefrom as disclosed herein.

Step e) of the method as disclosed herein comprises applying pressure to the layers of the first and second calcined powder mixtures while heating to a sintering temperature and performing sintering to form the multilayer sintered ceramic body, wherein the at least one layer of the first calcined powder mixture upon sintering forms at least one first layer and the at least one layer of the second calcined powder mixture forms at least one second layer; and f) lowering the temperature of the multilayer sintered ceramic body; after the at least first and second calcined powder mixtures are disposed in the die, pressure is applied axially to the calcined powder mixtures disposed between the graphite punches. The pressure is increased to reach a pressure of from 5 MPa to 100 MPa, preferably from 5 MPa to 60 MPa, preferably from 5 MPa to 40 MPa, preferably from 5 MPa to 20 MPa, preferably from 10 MPa to 60 MPa, preferably from 10 MPa to 40 MPa, preferably from 10 MPa to 30 MPa, preferably from 10 MPa to 20 MPa, preferably from 15 MPa to 60 MPa preferably from 15 MPa to 40 MPa, preferably from 15 MPa to 30 MPa, preferably from 20 to 40 MPa, preferably from 15 MPa to 20 MPa.

The application of heat to the powder mixture provided in the die facilitates sintering temperatures of from 1000 to 1700° C., preferably from 1200 to 1700° C., preferably from 1400 to 1700° C., preferably from 1500 to 1700° C., more preferably from 1600 to 1700° C., preferably from 1200 to 1600° C., preferably from 1200 to 1400° C., preferably from 1400 to 1600° C., and preferably from 1500 to 1600° C. Sintering may typically be achieved with a time of from 0.5 to 180 minutes, preferably from 0.5 to 120 minutes, preferably from 0.5 to 100 minutes, preferably from 0.5 to 80 minutes, preferably from 0.5 to 60 minutes, preferably from 0.5 to 40 minutes, preferably from 0.5 to 20 minutes, preferably from 0.5 to 10 minutes, preferably from 0.5 to 5 minutes, preferably from 5 to 120 minutes, preferably from 10 to 120 minutes preferably from 20 to 120 minutes preferably from 40 to 120 minutes preferably from 60 to 120 minutes, preferably from 80 to 100 minutes, preferably from 100 to 120 minutes preferably from 30 to 60 minutes, and preferably from 15 to 45 minutes. In certain embodiments, sintering may be achieved with an isothermal time of zero and upon reaching the sintering temperature, a cooling rate as disclosed herein is initiated. According to process step f), the ceramic sintered body is passively cooled by removal of the heat source. Natural or forced convection may be used until a temperature is reached which may facilitate the optional annealing process.

In preferred embodiments, the powder mixtures are heated directly by the punches and die of the sintering apparatus. The die and punches may be comprised of an electrically conductive material such as graphite, which facilitates resistive/joule heating. The sintering apparatus and procedures are disclosed in US 2010/0156008 A1, which is incorporated herein by reference.

Sintering the powder layers under pressure creates a co-compacted, unitary multilayer body. In accordance with the method as disclosed, the at least one layer of the first calcined powder mixture and the at least one layer of the second calcined powder mixture are simultaneously formed in-situ into the at least one first layer and at least one second layer of the multilayer sintered ceramic body during step e) of the method. This single step, concurrent sintering of the at least one first and second calcined powder mixtures into the at least one layer and the at least one second layer may provide enhanced adhesion, high mechanical strength and improved flatness of the multilayer sintered ceramic body. The CTE matching of the at least one first layer and the at least one second layer, in particular across the range of sintering temperatures as disclosed herein, prevents the generation of stress due to CTE mismatching at the interface between the at least one second layer and the at least one first layer upon cooling after sintering, thus enabling the formation of multilayer sintered ceramic bodies of large dimension having high interfacial strength and adhesion.

During sintering, a volume reduction typically occurs such that the ceramic sintered body may comprise a volume that is about one third that of the volume of the starting powder mixture when disposed in the tool set of the sintering apparatus.

The temperature of the sintering apparatus according to the present disclosure is measured usually within the graphite die of the apparatus. Thereby, it is preferred that the temperature is measured as close as possible to the powder mixtures being processed so that the indicated temperatures are indeed realized within the powder mixtures to be sintered.

The order of application of pressure and temperature may vary as disclosed herein. In an embodiment, the indicated pressure may be applied and thereafter heat may be applied to achieve the desired temperature of sintering. In another embodiment, heat may be applied to achieve the desired temperature of sintering and thereafter the indicated pressure may be applied. In a further embodiment, the temperature and the pressure may be applied simultaneously to the powder mixtures to be sintered and raised until the indicated values are reached.

The method as disclosed may comprise a pre-sintering step with a specific heating ramp of from 1 to 100° C./min, preferably 2 to 50° C./min, and more preferably 5 to 10° C./min until a specific pre-sintering time is reached.

The method as disclosed may comprise a pre-sintering step with a specific pressure ramp of from 0.50 MPa/min to 30 MPa/min, preferably 0.75 MPa/min to 10 MPa/min, and more preferably 1 to 5 MPa/min until a specific pre-sintering time is reached.

The method as disclosed herein may comprise a pre-sintering step with the above-mentioned specific heating ramp and with the above-mentioned specific pressure ramp.

In the aforementioned pre-sintering steps, the temperature and pressure are maintained for a time period of 10 min to 360 minutes.

Inductive or radiant heating methods may also be used for heating the sintering apparatus and indirectly heating the powders in the tool set.

Step g) of the method as disclosed herein comprises optionally annealing the multilayer sintered ceramic body (or component formed therefrom) by applying heat to raise the temperature of the multilayer sintered ceramic body to reach an annealing temperature, performing annealing; and step h) lowering the temperature of the annealed multilayer sintered ceramic body. In some embodiments, the method as disclosed herein may further include an optional annealing step. In the optional annealing step in accordance with embodiments of this disclosure, the multilayer sintered ceramic body may be subjected to an annealing procedure by removal from the sintering apparatus and annealing in a furnace at temperatures of from about 900 to about 1800° C., preferably from about 1250 to about 1700° C., more preferably from about 1300 to about 1650° C., and more preferably from about 1400 to about 1600° C.

In embodiments, optional annealing of the multilayer sintered ceramic body may be carried out at a heating and/or a cooling rate of from 0.5° C./min to 50° C./min, preferably from 0.5° C./min to 25° C./min, more preferably from 0.5° C./min to 10° C./min, and more preferably from 0.5° C./min to 5° C./min, more preferably from 1° C./min to 50° C./min, more preferably from 3° C./min to 50° C./min, more preferably from 5° C./min to 50° C./min, more preferably from 25° C./min to 50° C./min, preferably from 1° C./min to 10° C./min, preferably from 2° C./min to 10° C./min, and preferably from 2° C./min to 5° C./min.

Durations of the optional annealing step may be from 1 to 24 hours, preferably from 1 to 18 hours, preferably from 1 to 16 hours, preferably from 1 to 8 hours, preferably from 4 to 24 hours, preferably from 8 to 24 hours, preferably from 12 to 24 hours, preferably from 4 to 12 hours, and preferably from 6 to 10 hours.

In an embodiment, annealing in accordance with this disclosure may be performed after the sintering process and within the sintering apparatus. The optional process of annealing may be performed under oxidizing conditions. Annealing leads to a refinement of the chemical and physical properties of the multilayer sintered ceramic body or component fabricated therefrom through reduction of oxygen vacancies for stoichiometric correction and reduced stress in the sintered body or component. The optional process step of annealing the sintered corrosion resistant component is carried out in an oxidizing atmosphere, whereby the annealing process may provide increased albedo, improved mechanical handling and reduced porosity.

In some embodiments, the step of annealing may be performed by conventional methods used for the annealing of glass, ceramics and metals, and the degree of refinement may be selected by the annealing temperature and the duration of time that annealing is conducted. In other embodiments, annealing may not be performed on the sintered ceramic body.

After the optional process step of annealing the multilayer sintered ceramic body is performed, the temperature of the sintered, and in some instances annealed, multilayer sintered ceramic body is decreased to an ambient temperature by removal of the heat source to the sintered ceramic body or component fabricated therefrom in accordance with step h). The sintered and annealed multilayer sintered ceramic body or component fabricated therefrom is thereafter taken out of either the furnace in the instance that the annealing step is performed external to the sintering apparatus or removed from the tool set in case annealing is carried out in the sintering apparatus.

An improved multilayer sintered ceramic body and methods for fabrication of the same, in particular of large body size for use in plasma etching chambers, is disclosed herein. The multilayer sintered ceramic bodies as disclosed may have a size of from 100 mm to about 625 mm, with regard to the longest extension of the sintered body.

The process as disclosed herein provides for an improved control over the maximum pore size, higher density in particular within the at least one first layer, improved adhesion between layers of the multi-layer component, improved mechanical strength and thereby handleability of the multilayer sintered ceramic body, and the reduction of oxygen vacancies in the lattice of the multilayer sintered ceramic body.

The previously mentioned characteristics of the multilayer sintered ceramic body according to one embodiment are achieved in particular by adapting the purity of the first and second powders, the pressure applied to the first and second powders, the temperature while heating to sintering of the first and second powders, the duration of sintering, the temperature of the sintered component during the optional annealing step, the environment during the optional annealing step, and the duration of the optional annealing step.

The process steps as disclosed may have an order and repetitions varying from that as disclosed and may not be done in a particular order or specific number of repetitions. Further, it may be appreciated that additional powders beyond those disclosed may be used. The lack of sintering aids and the use of high purity rare earth elements or compounds as starting materials, having a purity of from 99.9% to 99.9999%, preferably from 99.99% to 99.9999%, preferably from 99.999% to 99.9999%, more preferably from 99.9995% to 99.99999% purity, enables the fabrication of a high purity, sintered multilayer corrosion resistant body as disclosed herein which provides improved plasma resistance particularly suitable for use as a multilayer corrosion-resistant member in a plasma processing-involving apparatus such as a semiconductor manufacturing apparatus. Furthermore, the process as disclosed herein does not require the formation of green or sintered bodies prior to the sintering step to join the at least one second layer 102 and corrosion resistant, at least one first layer 100. The multilayer corrosion resistant sintered body as disclosed herein is formed directly from powders which are sintered within a single process step without the use of green bodies, polymeric binders or sintering aids.

The pressure and current assisted process according to embodiments disclosed herein is suitable for use in the preparation of large multilayer sintered ceramic bodies. The process as disclosed provides for rapid powder consolidation and densification, retaining a maximum grain size of about 10 um and less in the sintered ceramic body, and achieving high densities and low porosities within the at least one first and second phases across a greatest dimension. Reducing the variation in density may improve handleability and reduce overall stress in the ceramic sintered body, in addition to CTE matching between the at least one first layer and the at least one second layer within the ranges as disclosed herein. This combination of fine grain size, uniform and high density and CTE matching provides for a high strength multilayer sintered ceramic body of large dimension suitable for machining, handling and use as a component in a semiconductor processing chamber.

A multilayer sintered ceramic component that is prepared by spark plasma sintering is proposed for use in plasma etch and deposition processing chambers. Examples of chamber components that may include the multilayer components as disclosed herein include a substrate support assembly such as a wafer chuck or wafer puck, an electrostatic chuck (ESC), a ring (e.g., a process kit ring or single ring), a chamber wall, a base, a gas distribution plate, a shower head, a liner, a liner kit, a shield, a plasma screen, a flow equalizer, a cooling base, a chamber viewport, a window, an RF window, a dielectric window, a chamber lid, a gas injector, an isolator, plasma adapters, diffusers, gas mixing gas mixing manifolds, gas box, ion restriction elements, and so on.

The methods and compositions disclosed herein will be illustrated in more detail with reference to the following Examples, but it should be understood that the it is not deemed to be limited thereto.

EXAMPLES

The following examples are included to more clearly demonstrate the overall nature of the disclosure. These examples are exemplary, not restrictive, of the disclosure.

The multilayer sintered ceramic bodies and components which may be fabricated therefrom according to the present disclosure are disclosed following. Measurements as disclosed within the examples section are performed in accordance with procedures as described in the specification.

The multilayer sintered ceramic bodies in accordance with the examples as disclosed herein are formed in a single sintering step from the calcined powder mixtures, without the formation of pre-sintered, cast or green bodies, or tapes, films or laminates.

The SPS tool used for each of the Examples below comprised a die comprising a sidewall comprising an inner wall and an outer wall, wherein the inner wall has a diameter that defines an inner volume capable of receiving at least one ceramic powder; and an upper punch and a lower punch operably coupled with the die, wherein each of the upper punch and the lower punch have an outer wall defining a diameter that is less than the diameter of the inner wall of the die thereby defining a gap between each of the upper punch and the lower punch and the inner wall of the die when at least one of the upper punch and the lower punch are moved within the inner volume of the die, wherein the gap could be from 10 μm to 100 μm wide.

Particle sizes for the starting powders, powder mixtures and calcined powder mixtures were measured using a Horiba model LA-960 Laser Scattering Particle Size Distribution Analyzer capable of measuring particle size from 10 nm to 5 mm. Specific surface area for the starting powders, powder mixtures and calcined powder mixtures was measured using a Horiba BET Surface Area Analyzer model SA-9601 capable of measuring across a specific surface area of 0.01 to 2000 $m^2/g$ with an accuracy of 10% and less for most samples. specific surface area (SSA) measurements were performed according to ASTM C1274.

Comparator Example

Multilayer sintered ceramic body comprising a YAG first layer and an aluminum oxide second layer;

A first layer of a multilayer sintered ceramic body was formed from a first powder mixture comprising alumina and yttria to form an at least one first layer comprising YAG as disclosed herein. The first powder mixture comprised an alumina powder wherein the alumina powder had a specific surface area of from 6.5 to 8.5 $m^2/g$, a d10 particle size of from 0.05 to 0.15 um, a d50 particle size of from 0.1 to 0.3 um, a d90 particle size of from 0.25 to 1 um, and a yttria powder having a specific surface area of from 6 to 8 $m^2/g$, a d10 particle size of from 2 to 4.5 μm, a d50 particle size of from 3.5 to 6 μm and a d90 particle size of from 6 to 10 μm. Total impurity content of the alumina and yttria powders was from about 2 to about 30 ppm. The alumina and yttria powders were combined in ratios to form a first layer comprising YAG (yttrium aluminum oxide, garnet phase) upon sintering. Combining the alumina and yttria powders to make the first powder mixture was performed using the powder preparation techniques of wet ball milling wherein zirconia milling media was added at about 2× by weight of media loading relative to powder weight. Ethanol was added to form a slurry in an amount of about 45% by slurry weight. The media was added to the slurry and milled for 12 hours at an RPM of 150 and thereafter dried, tumbled, and sieved according to methods known to those skilled in the art to form the first powder mixture. The first powder mixture was calcined at 1100° C. for 8 hours to form a first calcined powder mixture. The first calcined powder mixture had a specific surface area (as measured using BET methods) of from 4.5 to 5.5 $m^2/g$, a d10 particle size of from 4.5 to 6.5 um, a d50 particle size of from 9 to 15 um, and a d90 particle size of from 20 to 30 um (as measured using laser particle size methods).

The second layer of the multilayer sintered ceramic body was formed from an aluminum oxide powder. The aluminum oxide powder was measured to have a specific surface area of from 6.5 to 8.5 $m^2/g$, a d10 particle size of from 0.05 to 0.15 um, a d50 particle size of from 0.1 to 0.3 um, a d90 particle size of from 0.25 to 1 um using the BET methods and laser particle size analysis methods as disclosed herein. Total impurity content of the alumina powder was about 30 ppm as measured using ICPMS.

The first calcined powder mixture and the alumina powder were separately disposed inside a volume defined by a tool set of a sintering apparatus as disclosed herein to form at least one layer of the first calcined powder mixture and at least one layer of the alumina powder, and vacuum conditions as disclosed herein were created inside the volume.

A pressure of 30 MPa was applied to the layers of the first calcined powder mixture comprising yttria and alumina (batched to form YAG upon sintering) and the alumina powder while heating to a sintering temperature of 1450° C. for a duration of 30 minutes and performing sintering to form a multilayer sintered ceramic body wherein the layer of the first calcined powder mixture upon sintering forms a first layer comprising YAG, and the layer of the alumina powder forms the second layer comprising aluminum oxide. The multilayer sintered body was thereafter annealed at 1400° C. for 8 hours in an oxidizing environment. The multilayer sintered ceramic body fractured within the alumina layer near the interface between the first layer comprising YAG and the alumina layer. Thus, the difference in CTE between YAG and aluminum oxide across the process temperature range generated sufficient stress to cause fracture within the aluminum oxide layer.

Example 1: Multilayer Sintered Ceramic Body Comprising a YAG First Layer and Zirconia Toughened Alumina (ZTA) Second Layer A multilayer sintered ceramic body was formed from first and second powder mixtures. The first powder mixture comprised alumina and yttria combined in ratios to form a first layer 100 comprising YAG as disclosed herein. The second powder mixture comprised alumina and partially stabilized zirconia in ratios to form a zirconia toughened aluminum oxide (ZTA) second layer comprising about 16% by volume of partially stabilized zirconia as disclosed herein.

The first powder mixture comprised an alumina powder wherein the alumina powder has a specific surface area (SSA) of from 5.5 to 9 $m^2/g$, a d10 particle size of from 0.05 to 1 um, a d50 particle size of from 2 to 6 um, a d90 particle size of from 15 to 30 um, and a yttria powder having a specific surface area of 1.75 to 3.5 $m^2/g$, a d10 particle size of from 2 to 4 μm, a d50 particle size of from 5 to 9 μm and a d90 particle size of from 10 to 14 μm. Average impurity content of the alumina powder was about 6 ppm as measured across 3 powder lots, corresponding to a purity of about 99.9994% relative to 100% pure alumina. Average impurity content of the yttria powder was about 17 ppm as measured across 5 powder lots, corresponding to a purity of about 99.9983 relative to 100% pure yttria powder. Reporting limits to detect presence of lighter elements using ICPMS as disclosed herein are higher than reporting limits of heavier elements. In other words, heavier elements, such as from Sc and higher in atomic number, are detected with greater accuracy (for example to an accuracy of 1 ppm and less) than those lighter elements, from for example Li to Ca (detected at for example accuracy of about 2 ppm and less). Use of ICPMS to detect lighter elements such as Li, Ca and Mg may be done within a confidence of about 2 ppm and greater. Li, Ca and Mg were not detected using ICPMS as known to those skilled in the art in the yttria and alumina powders and as such, the yttria and alumina powders comprise about 2 ppm or less of Li, Ca and Mg, in the form of lithium fluoride, calcia and magnesia. Si was not detected using ICPMS as known to those skilled in the art in the yttria and alumina powders and as such, the yttria and alumina powders comprise about 14 ppm or less of Si in the form of silica.

The yttria and alumina powders were combined in ratios to form an at least one first layer comprising YAG (yttrium aluminum oxide, garnet phase) upon sintering. Combining the alumina and yttria powders to make the first powder mixture was performed using wet ball milling as known to those skilled in the art, wherein high purity (>99.9%) alumina media was used at from about 55% to about 65% loading relative to powder weight. A slurry was formed at from about 35% to about 45% of ethanol by slurry weight. The slurry was milled for about 15 hours at an RPM of about 150, and thereafter dried, tumbled, and sieved according to methods known to those skilled in the art to form the first powder mixture. The first powder mixture was calcined at 850° C. for 6 hours. The first calcined powder mixture had a specific surface area of from 3 to 5 $m^2/g$, and a d50 particle size of from 3 to 12 um. The first calcined powder mixture had total impurities (as measured using ICPMS) of about 8 ppm, comprising about 1 ppm or less of Mg in the form of magnesia MgO, about 0.5 ppm and less of Li, and about 5 ppm or less of sodium. Si was not detected using the ICPMS methods as disclosed herein in the first calcined powder mixture, thus within the accuracy of the ICPMS method, the first calcined powder mixture comprises about 14 ppm or less of Si in the form of silica. The first calcined powder mixture (batched to form YAG upon sintering) may be sieved, tumbled, blended, etc. as known to those skilled in the art.

The second powder mixture comprised an alumina powder and a partially stabilized zirconia (PSZ) powder.

The alumina powder had a specific surface area (SSA) of from 6.5 to 8.5 $m^2/g$, a d10 particle size of from 0.05 to 0.15 um, a d50 particle size of from 0.16 to 0.35 um, and a d90 particle size of from 0.36 to 0.8 um. Total impurity content of the alumina powder was from about 2 to about 11 ppm as measured using ICPMS methods. Li and Mg were measured in amounts of less than 1 ppm in the powder and as such, the alumina powder comprised about 1 ppm and less of Li and Mg, in the form of $Li_2O$, LiF and MgO. Calcium (CaO) was measured in an amount of less than 2 ppm. Si was not detected using ICPMS as disclosed herein in the zirconia powder and as such, the alumina powder comprised about 14 ppm or less of Si in the form of $SiO_2$.

The partially stabilized zirconia (PSZ) powder had a surface area of from 6 to 8 $m^2/g$, a d10 particle size of from 0.08 to 0.25 um, a d50 particle size of from 0.27 to 0.60 um, and a d90 particle size of from 1.0 to 3.0 um. The PSZ powder comprised from about 2 to 4 mol % Hf and was partially stabilized with yttria in an amount of from 2 mol % to 4 mol %, preferably about 3 mol % yttria. Hf and Y are not considered impurities in zirconia as disclosed herein. Hf is present in many commercially available zirconia powders, and yttria was added as a stabilizing compound in order to partially stabilize the zirconia. Excluding Hf and Y, the partially yttria stabilized zirconia powder had total impurities of about 61 ppm. Use of ICPMS to detect lighter elements such as Li, Ca and Mg may be done within a confidence of about 1 ppm and greater. Li and Mg were measured in amounts of less than 1 ppm in the PSZ powder and as such, the partially stabilized zirconia powder comprised about 1 ppm and less of Li and Mg, in the form of $Li_2O$, LiF and MgO. Calcium (CaO) was measured in an amount of about 15 ppm. Si was not detected using ICPMS as disclosed herein in the PSZ powder and as such, the PSZ powder comprised about 14 ppm or less of Si in the form of $SiO_2$.

The powders were combined in ratios to form at least one second layer upon sintering comprising about 16% by volume of partially stabilized zirconia and the balance alumina. Combining the alumina and PSZ powder to make the second powder mixture was performed using a wet ball milling process wherein high purity (>99.99%) alumina media was added at from about 75% to about 80% loading relative to powder weight. A slurry was formed at about 35 to 45% relative to slurry weight by adding ethanol. The slurry was ball milled for about 20 hours at an RPM of about 150 and thereafter dried, tumbled, and sieved according to methods known to those skilled in the art to form the second powder mixture. The second powder mixture was calcined at 600° C. for 8 hours and was measured to have a specific surface area of from 6 to 8 $m^2/g$. The second calcined powder mixture had total impurities of about 12 ppm (excluding Hf and Y) and may comprise about 14 ppm or less of Si in the form of silica, and about 3 ppm or less of Mg, in the form of magnesia, MgO. The second calcined powder mixture was sieved, tumbled, blended, etc. as known to those skilled in the art.

The first and second calcined powder mixtures were separately disposed inside a volume defined by a tool set of a sintering apparatus as disclosed herein to form at least one first layer of the first calcined powder mixture, and at least one second layer of the second calcined powder mixture, and vacuum conditions of from $10^{-2}$ to $10^{-3}$ torr were created inside the volume. Disposing the at least one first and at least one second calcined powder mixtures inside the volume defined by the tool set typically results in intermixing of the first and second calcined powder mixtures, thereby creating a nonlinear interface between the at least one first and second layers upon sintering.

The layers of the calcined powder mixtures were co-compacted by applying a pressure of 15 MPa to the layers of first and second calcined powder mixtures while heating to a sintering temperature of 1600° C. for a duration of 60 minutes to perform sintering to form a unitary, multilayer sintered ceramic body having a greatest dimension of 572 mm.

Density was separately measured for an exemplary partially yttria stabilized zirconia sintered body (prepared under similar conditions of temperature, pressure and duration to that as disclosed herein) comprising about 16% by volume of PSZ and the balance alumina, and the density was measured to be about 4.319 g/cc, corresponding to about 100% of theoretical density (the theoretical density was calculated to be about 4.317 g/cc using the volumetric mixing rule as known to those skilled in the art). The two measurements are within the measurement variance for the Archimedes density measurements as disclosed herein, thus the PSZ comprising the at least one second layer may have a density of about 100% of theoretical.

Density was separately measured for an exemplary YAG sintered body (prepared under similar conditions of temperature, pressure and duration to that as disclosed herein) and the density was measured to be 4.55 g/cc, corresponding to greater than 99% of the theoretical density of YAG (a commercially available, single crystal sample of bulk YAG was measured to have an Archimedes density of 4.56 g/cc across 5 measurements, and this value is taken as the theoretical density of YAG as used herein). The two measurements are within the measurement variance for the Archimedes density measurements as disclosed herein, thus the polycrystalline YAG comprising the at least one first layer may have a density of about 100% of theoretical.

The multilayer sintered ceramic body according to this embodiment comprising at least one second layer (comprising about 16% of partially stabilized zirconia by volume and the balance alumina) is preferably CTE matched to the at least one first layer comprising YAG (as depicted in FIG. 4 c). An absolute value of the difference in CTE between the at least one first and second layers was measured (using dilatometry methods as performed in accordance with ASTM E228-17) to be about $0.27 \times 10^{-6}$/° C. and less (a percentage difference of about 2% and less relative to the CTE of at least one first layer comprising YAG) across a temperature range of from ambient to about 1700° C. (or at least from about 200° C. to about 1400° C. as depicted in the figures).

Example 2: Multilayer Sintered Ceramic Body Comprising a YAG First Layer and Zirconia Toughened Alumina (ZTA) Second Layer (Results as Illustrated in FIGS. 8-11, 18-20 of the Specification)

A multilayer sintered ceramic body was formed from first and second powder mixtures. The first powder mixture comprised alumina and yttria combined in ratios to form a first layer 100 comprising YAG as disclosed herein. The second powder mixture comprised alumina and partially stabilized zirconia (partially stabilized zirconia as disclosed according to Example 1) in ratios to form a zirconia toughened aluminum oxide (ZTA) at least one second layer comprising about 16% by volume of partially stabilized zirconia as disclosed herein.

The yttria and alumina powders in accordance with Example 2 are as disclosed within Example 1 and were used to form the first powder mixture. Combining the alumina and yttria powders in accordance with this example to make the first powder mixture was performed using tumble (or vertical/end-over-end) mixing as known to those skilled in the art, wherein high purity (>99.9%) alumina media was used at from 80% to 100% media loading relative to powder weight. Ethanol was added to form a slurry at from about 35% to about 45% relative to slurry weight. The slurry was mixed for about 20 hours at an RPM of about 20, and thereafter dried, tumbled, and sieved according to methods known to those skilled in the art to form the first powder mixture. The first powder mixture was calcined at 950° C. for 4 hours. The first calcined powder mixture had a specific surface area of from 5 to 7 $m^2/g$, and a d50 particle size of from 5 to 20 um. The first calcined powder mixture had total impurities (as measured using ICPMS) of about 5 ppm, comprising about 2 ppm or less of Ca (CaO) and K, and at or below the reporting limits (less than for example 1 ppm) for all other elements, including Mg in the form of magnesia MgO, and Li in the form of $Li_2O$ and LiF. Si was not detected using the ICPMS methods as disclosed herein in the first calcined powder mixture, thus within the accuracy of the ICPMS method, the first calcined powder mixture comprises about 14 ppm or less of Si in the form of silica. The first calcined powder mixture (batched to form YAG upon sintering) may be sieved, tumbled, blended, etc. as known to those skilled in the art.

The partially stabilized zirconia (PSZ) and alumina powders as disclosed in accordance with Example 1 were used to form the second powder mixture. Combining the alumina and PSZ powders in accordance with this example to make the second powder mixture was performed using tumble (or vertical/end-over-end) mixing as known to those skilled in the art, wherein high purity (>99.9%) alumina media was used at from 70% to 90% loading relative to powder weight. Ethanol was added to form a slurry at from about 40% to about 50% relative to slurry weight. The slurry was mixed for between from 16 to 24 hours at an RPM of about 20, and thereafter dried, tumbled, and sieved according to methods known to those skilled in the art to form the second powder mixture. The second powder mixture was calcined at 600° C. for 8 hours. The second calcined powder mixture had a specific surface area of from 6 to 8 m$^2$/g, and a d50 particle size of from 90 to 110 um. The second calcined powder mixture had total impurities (as measured using ICPMS and excluding Hf and Y) of about 12 ppm, comprising about 3 ppm or less of Mg in the form of magnesia MgO, about 4 ppm of Ti, and about 0.75 ppm and less of all other elements, including Li in the form of Li$_2$O and LiF. Si was not detected using the ICPMS methods as disclosed herein in the second calcined powder mixture, thus within the accuracy of the ICPMS method, the second calcined powder mixture comprises about 14 ppm or less of Si in the form of silica. The second calcined powder mixture (batched to form about 16% by volume of PSZ upon sintering) may be sieved, tumbled, blended, etc. as known to those skilled in the art.

The first and second calcined powder mixtures were separately disposed inside a volume defined by a tool set of a sintering apparatus as disclosed herein to form at least one first layer of the first calcined powder mixture, and at least one second layer of the second calcined powder mixture, and vacuum conditions of from 10$^{-2}$ to 10$^{-3}$ torr were created inside the volume.

Disposing the at least one first and at least one second calcined powder mixtures inside the volume defined by the tool set typically results in intermixing of the first and second calcined powder mixtures, thereby creating a non-linear interface between the at least one first and second layers upon sintering.

The layers of the calcined powder mixtures were co-compacted by applying a pressure of 20 MPa was applied to the layers of first and second calcined powder mixtures while heating to a sintering temperature of 1500° C. for a duration of 30 minutes to perform sintering and form a unitary, multilayer sintered ceramic body having a greatest dimension of 150 mm.

FIG. 8 depicts x ray diffraction results confirming formation of highly phase pure, polycrystalline YAG comprising the at least one first layer 100 in accordance with this example. XRD of the at least one first layer 100 of the multilayer ceramic sintered bodies as disclosed herein may measure phase purity up to and including about 95% by volume. As such, the at least one first layer 100 of the unitary, multilayer sintered ceramic body comprises at least about 95% by volume of the YAG crystalline phase, and about 5% by volume or less of at least one crystalline phase selected from the group consisting of YAP, YAM, yttria and alumina and combinations thereof, in accordance with this example.

Scanning electron microscopy (SEM) in combination with image processing software (ImageJ, developed at the National Institute of Health (NIH), USA, an image processing and analysis program of scientific multi-dimensional images) were used to analyse the microstructure of the first layer 100 comprising YAG. FIGS. 9 to 11 illustrate features of the microstructure of the at least one first layer 100 comprising polycrystalline YAG.

FIG. 9 illustrates porosity results measured on a surface 106 of the at least one first layer 100 comprising YAG in accordance with this example, depicting total pore area (um$^2$) on the vertical axis and a horizontal axis representing pore size in microns. Measurements were performed across 7 images taken at 5000×, each of area 53.7 um×53.7 um for a total measurement area of about 2885 um$^2$. A total area comprising porosity within any one of the 7 images was measured as from about 0.015 to about 0.3 um$^2$, preferably from about 0.015 to about 0.2 um$^2$, preferably from about 0.015 to about 0.15 um$^2$. A maximum pore size on a surface 106 of the at least one first layer 100 comprising YAG of 0.7 um and less was measured, and a maximum area comprising porosity was found to be about 0.3 um$^2$ and less. No pores of pore size larger than 0.7 um were measured across the 7 images analyzed within the polycrystalline YAG at least one first layer 100 in accordance with this example.

FIG. 10 depicts the cumulative fractional area comprising porosity (cumulative pore area) in um$^2$ across an area in mm$^2$, expressed as the cumulative pore area (in um$^2$/mm$^2$) for a given pore size of the 7 images as referenced in FIG. 9. Using SEM images and ImageJ image processing methods as disclosed herein, porosity was measured within each image (in um$^2$) and normalized across the total image area measured (in mm$^2$) to calculate the cumulative pore area. The at least one first layer 100 comprising YAG as disclosed herein comprises a cumulative pore area of from about 2 to about 800 um$^2$/mm$^2$, preferably from about 2 to about 600 um$^2$/mm$^2$, preferably from about 2 to about 400 um$^2$/mm$^2$, preferably from about 2 to about 300 um$^2$/mm$^2$ as measured using SEM and image processing methods as disclosed herein. No pores of pore size larger than 0.6 um were measured across the 7 images analyzed within the YAG at least one first layer 100 of the multilayer sintered ceramic body. Thus, across 7 images, each of area about 54 um×54 um, the multilayer sintered ceramic bodies as disclosed herein have at least one first layer 100 having a surface 106 comprising porosity corresponding to pore sizes of less than 1 um in very low (<0.1% by area) percentages by area, thus providing a corrosion and erosion resistant surface of the multilayer sintered ceramic body for use in plasma processing chambers.

FIG. 11 a) illustrates a 5000× SEM image illustrating a high density, sintered microstructure after a thermal etching process of a surface 106 of the at least one first layer 100 comprising a polycrystalline YAG phase. Very fine scale porosity with few pores are depicted on a surface 106 of the YAG at least one first layer 100 is indicated. A nearly fully dense microstructure is depicted, having minimal porosity and pore sizes of about 1 um and less are visible. The multilayer sintered ceramic body according to embodiment B comprises at least one first layer 100 comprising polycrystalline YAG having a surface 106 comprising pores wherein the pores have pore sizes on the order of 5 um and less, down to sub-micron scale pore sizes of from about 0.1 to about 5 um, preferably from about 0.1 to about 4 um, preferably from about 0.1 to about 3 um preferably from about 0.1 to about 2 um, preferably from about 0.1 to about 1 um. According to embodiment B as disclosed herein, the at least one first layer 100 comprising YAG of the multilayer sintered ceramic body 98 formed from the materials and processes may comprise pores which have a maximum size of from 0.1 to 5 um, preferably from 0.1 to 4 um, preferably from 0.1 to 3 um, preferably from 0.1 to 2 um, from 0.1 to 1 um as measured using SEM and image processing methods as disclosed herein. About 22 pores were counted across the 54 um×54 um surface area.

FIG. 11 b) depicts a summation of the total surface area comprising pores or porosity (in % of surface area) for each of 7 SEM images measured for FIG. 10 on the vertical axis and a horizontal axis representing the corresponding pore size for a given % pore area in microns. Within a given image, the total area comprising porosity and the total image measurement area were used to calculate the % pore area. As depicted in FIG. 11, the measurements across 7 SEM images correspond to an at least one first layer 100 having a surface 106 comprising YAG comprising porosity in a percent of total area in an amount of from 0.0005 to 2%, preferably from 0.0005 to 1%, preferably from 0.0005 to 0.5%, preferably from 0.0005 to 0.05%, preferably from 0.0005 to 0.03%, preferably from 0.0005 to 0.005%, preferably from 0.0005 to 0.003%, preferably from 0.0005 to 0.001%, preferably from 0.005 to 2%, preferably from 0.05 to 2%, preferably from 0.5 to 2%, preferably from 0.005 to 2%, preferably from 0.005 to 10%, preferably from 0.05 to 2%, preferably from 0.05 to 1%, preferably from 0.5 to 2% as measured from SEM images and using ImageJ software and methods as disclosed herein. Thus, across an image of area about 54 um×54 um, the multilayer sintered ceramic bodies as disclosed herein comprise a surface 106 comprising porosity in very low (<1% by total area) percentages, thus providing a corrosion and erosion resistant surface of the multilayer sintered ceramic body 98 for use in plasma processing chambers.

The small pore/void maximum size and minimal % area of porosity of the at least one first layers 100 comprising YAG of the multilayer sintered bodies may enable reductions in particle generation and corrosion and erosion as required for use in semiconductor reactors. This minimal porosity corresponds to a high density, which also provides the corrosive and erosive properties to enable their use as components in semiconductor etch and deposition applications.

FIG. 18 a) illustrates an SEM micrograph at 500× of an interface 104 of the multilayer sintered ceramic body wherein the interface defined by the at least one second layer 102 and the at least one first layer 100 is an irregular, nonlinear boundary which in embodiments may comprise retrograde angles. In some embodiments as depicted in FIG. 18 a), the interface may comprise at least one dovetail structure and/or at least a portion of a dovetail structure. In other embodiments at least a portion of the interface may comprise a trapezoidal shape. The tortuosity (T) as disclosed herein, is defined mathematically as the ratio of the length of the curve, C to the linear distance between its ends, L, whereby T=C/L. The image of FIG. 18 a) was measured to have a tortuosity of 2.7. The nonlinear interface 104 as disclosed herein may have a tortuosity, T, of from greater than 1 to about 3, preferably from greater than 1 to about 2.5, preferably from greater than 1 to about 2, preferably from greater than 1 to about 1.5 as measured using SEM and image processing methods (measurements within ImageJ software) as disclosed herein. A straight-line interface (as is typical of laminates and structures using pre-sintered bodies onto which layers are applied) has a tortuosity of about 1. The increased tortuosity of the interface 104 of the multilayer bodies as disclosed herein provides an interlocking effect between layers, thereby increasing adhesion strength such that a unitary, multilayer ceramic sintered body is formed.

FIG. 18 b) depicts an interface line (IL) of the interface 104 as calculated from SEM and image processing methods. As depicted, exemplary SEM images depicting nonlinear interface 104 were imported into ImageJ software, and x/y coordinates corresponding to points along the interface were used to obtain the linear equation of the interface line (IL) as shown in FIG. 18 b) and the interface 104 was characterized by a distance of the nonlinear interface 104 from the interface line (IL). A distance (D) of the interface 104 from the interface line (IL) varies in amount of from 10 to 100 um, preferably from 20 to 100 um, preferably from 30 to 100 um, preferably from 40 to 100 um, from 50 to 100 um, preferably from 25 to 85 um as measured using SEM and image processing. Increased distance (D) from the interface line (IL) may contribute to the enhanced adhesion and interlocking effect of the multilayer sintered ceramic bodies as disclosed.

These reverse or retrograde angles, characteristics and structures may provide an anchoring effect thereby increasing interfacial and tensile strength and bonding across the interface 104 defined by the at least one second layer 102 and the at least one first layer 100.

FIGS. 19 a) and b) illustrates SEM images depicting characteristics of the interface 104 between the at least one first layer 100 and the at least one second layer 102 wherein a straight line length between ends (L) is about 54 um, and the measured interfacial length or curve (C) along interface 104 is about 90 um, as depicted in the exemplary image of FIG. 19 b). The tortuosity according to FIG. 19 b) using the calculations as disclosed herein is 1.7. Measurements were taken across 9 SEM images using ImageJ software analysis as disclosed herein. An average interfacial length of about 90 um was measured, representing about a 66% increase in interfacial length (C) relative to the linear distance (L). Thus, disclosed herein is a multilayer sintered ceramic body having an interface 104 defined by the at least one second layer and the at least one first layer wherein the interfacial length is increased by from 20 to 70%, preferably from 20 to 60%, preferably from 20 to 40%, preferably from 30 to 80%, preferably from 40 to 80%, preferably from 50 to 70%. Correspondingly, the at least one second layer 102 and the at least one first layer 100 may contact one another at an interface commensurate in interfacial area to the greatest dimension of the multilayer sintered ceramic body. For unitary, multilayer sintered bodies having greatest dimensions of from 100 to about 625 mm, the at least one second layer 102 and the at least one first layer 100 contact one another at a nonlinear interface 104 having an area of about 3,117 $cm^2$, preferably about 3,068 $cm^2$ and less, preferably 2,919 $cm^2$ and less, preferably from 78 to about 3,117 $cm^2$, preferably from 78 to about 3,068 $cm^2$, preferably from 78 to 2,919 $cm^2$, preferably from 78 to 1,963 $cm^2$, preferably from 78 to 1,257 $cm^2$, preferably from 78 to 707 $cm^2$, preferably from 78 to 314 $cm^2$, preferably from 314 to about 3,117 $cm^2$, preferably from 314 to about 3,068 $cm^2$, preferably from 314 to 2,919 $cm^2$, preferably from 314 to 1,963 $cm^2$, preferably from 314 to 1,257 $cm^2$, preferably from 707 to about 3,068 $cm^2$, preferably from 1257 to 3,039 $cm^2$. In embodiments, it is preferable that the first and second layers are in direct contact, forming nonlinear interface 104, and thus the at least one first and second layers are contiguous layers. In other embodiments, circuitry, heating elements, RF coils/RF antennae and the like may be disposed between first and second layers as required by the specific component application, and irrespective of these features, first and second layers may be contiguous or substantially contiguous. This increased interfacial length and interfacial area will enhance adhesion at the nonlinear interface 104 between the at least one first layer 100 and the at least one second layer 102.

The number of grains in contact across the interface may also play a role in adhesion and strength characteristics of interface 104. The number of grains were counted across an interface length to obtain the number of grains per um. FIG. 20 a) illustrates the number of grains per interface length in um of the interface defined by the at least one first layer 100 and the at least one second layer 102 across 10 images, with smaller numbers of grains per micron preferable. In embodiments, the number of grains per micron comprises from 0.2 to 0.8 grains per um, preferably from 0.3 to 0.6 grains per um, preferably from 0.4 to 0.55 grains per micron for a multilayer sintered ceramic body comprising YAG as an at least one first layer and an at least one second layer of about 16% by volume of zirconia in an alumina matrix. FIG. 20 b) depicts the ratio of interface length to the linear measurement (also defined herein as the tortuosity, T) across the image as disclosed, of about 54 um. Higher ratios of interface length to linear interface length (tortuosity, T) are preferable to increase adhesion strength between the at least one first 100 and second layers 102.

Surface roughness measurements were performed using a Keyence 3D laser scanning confocal digital microscope model VK-X250× under ambient conditions in a class 1 cleanroom. The microscope rests on a TMC tabletop CSP passive benchtop isolator with 2.8 Hz Natural Frequency. This non-contact system uses laser beam light and optical sensors to analyse the surface through reflected light intensity. The surface roughness parameters Sa, Sdr and Sz are well-known in the underlying technical field and, for example, described in ISO standard 25178-2-2012. Sa represents an average roughness value calculated across a user-defined area of a surface of the multilayer sintered ceramic body (arithmetical mean height of the scale limited surface). Sz represents the maximum peak-to-valley distance across a user-defined area of a surface of the multilayer sintered ceramic body (maximum height, peak to valley, of the scale-limited surface). Sdr is a calculated numerical value defined as the "developed interfacial area ratio" and is a proportional expression for an increase in actual surface area beyond that of a completely flat surface. A flat surface is assigned an Sdr of zero, and the value increases with the slope of the surface. Sa values of from 0.0005 to 2 um, preferably from 0.0005 to 1.5 um, preferably from 0.0005 to 1 um, preferably from 0.0005 to 0.75 um, preferably from 0.0005 to 0.5 um, preferably from 0.0005 to 0.25 um, preferably from 0.0005 to 0.125 um, preferably from 0.0005 to 0.075 um, preferably from 0.0005 to 0.050 um, preferably from 0.0005 to 0.025 um, preferably from 0.0005 to 0.020 um, preferably from 0.0005 to 0.015 um, preferably from 0.0005 to 0.010 um, preferably from 0.001 to 0.030 um, preferably from 0.001 to 0.020 um, preferably from 0.001 to 0.010 um, across a surface 106 of the at least one first layer 100 comprising YAG were measured. The peak to valley, or Sz, across a surface 106 of the at least one first layer 100 comprising YAG was measured to be from 0.3 to 5 um, preferably from 0.3 to 4 um, preferably from 0.3 to 3 um, preferably from 0.3 to 2 um, preferably from 0.3 to 1 um, preferably from 0.65 to 5 um, preferably from 1 to 5 um, preferably from 2 to 5 um, preferably from 0.35 to 3 um, preferably from 0.5 to 1 um, and the developed interfacial area, Sdr, of a surface 106 of the at least one first layer 100 may have a developed interfacial area, Sdr of from $5 \times 10^{-5}$ to $550 \times 10^{-5}$, preferably from $30 \times 10^{-5}$ to $400 \times 10^{-5}$, preferably from $30 \times 10^{-5}$ to $200 \times 10^{-5}$, preferably from $40 \times 10^{-5}$ to $100 \times 10^{-5}$. Table 5 lists surface roughness results in accordance with this example.

The multilayer sintered ceramic body according to this embodiment comprising at least one second layer (comprising about 16% of partially stabilized zirconia by volume and the balance alumina) is CTE matched to the at least one first layer comprising YAG as depicted in FIG. 4 c). An absolute value of the difference in CTE between the at least one first and second layers was measured (using dilatometry methods as performed in accordance with ASTM E228-17) to be about $0.27 \times 10^{-6}/°$ C. and less (a percentage difference of about 2% and less relative to the CTE of at least one first layer) across a temperature range of from ambient to about 1700° C. (or at least from about 200° C. to about 1400° C. as depicted in the figures).

Example 3: Plasma Resistant First Layers Comprising Stoichiometric YAG and Variations Exemplary at least one first layers 100 comprising YAG and variations thereof were made in accordance with methods and materials as disclosed in accordance with aspects of Example 2 and Table 6. The starting powders and methods for powder combining are as disclosed in accordance with Example 2. The at least one first layers comprising YAG (and variations as disclosed) were formed using the sintering pressure, temperature and time conditions as listed in Table 6.

Stoichiometric YAG and variations (excess alumina, zirconia doped and reduced density) were subjected to halogen based plasma processing in order to analyse corrosion and erosion performance.

A two-step etch process was conducted, having a pressure of 10 millitorr, a bias of 600 volts and ICP power of 2000 watts, with a first etch step having a $CF_4$ flow rate of 90 standard cubic centimetres per minute (sccm), an oxygen flow rate of 30 standard cubic centimetres per minute (sccm), an argon flow rate of 20 standard cubic centimetres per minute (sccm), and a second etch step having an oxygen flow rate of 100 standard cubic centimetres per minute (sccm) and an argon flow rate of 20 standard cubic centimetres per minute (sccm), wherein first and second etch steps are performed for 300 seconds each and repeated for a combined duration of 6 hours.

Upon completion of the etch procedure, surface feature parameters of Sa, Sz and Sdr were measured according to ISO standard 25178-2-2012 as listed in Table 6. Stoichiometric YAG, YAG having excess alumina (0.25% and 0.5%), and slightly reduced density YAG each had an Sa (after plasma processing) that was the same as, or substantially the same as that measured prior to plasma exposure.

Zr doped YAG, YAG having excess alumina (0.25%), and slightly reduced density YAG each had an Sz (after plasma processing) that was substantially the same as that measured prior to plasma exposure.

Stoichiometric YAG, YAG having excess alumina (0.25% and 0.5% by volume) and Zr doped YAG each had an Sdr (after plasma processing) that was substantially the same as that measured prior to plasma exposure.

Other features of Sa, Sz and Sdr are as disclosed in accordance with this example are as listed in Table 6. The at least one first layer comprising YAG as disclosed herein provides a surface which is resistant to the corrosive and erosive effects of halogen based plasmas.

Example 4: Multilayer Sintered Ceramic Body Comprising a YAG First Layer and Zirconia Toughened Alumina (ZTA) Second Layer A multilayer sintered ceramic body having 0.5% by volume excess alumina was formed from first and second powder mixtures. The first powder mixture comprised alumina and yttria combined in ratios to form an at least one first layer 100 comprising YAG as disclosed herein with 0.5% by volume excess alumina. The second powder mixture comprised alumina and partially stabilized zirconia (the partially stabilized zirconia as disclosed according to Example 1) in ratios to form a zirconia toughened aluminum oxide (ZTA) at least one second layer (comprising about 16% by volume of zirconia) as disclosed herein.

The alumina and yttria powders forming the first powder mixture according to this example are as disclosed according to Example 2 with the addition of 0.5% by volume of excess alumina added to the powder mixture forming the at least one first layer comprising polycrystalline YAG.

Combining and calcining the alumina and yttria powders to make the first powder mixture was performed as disclosed according to Example 2.

The second powder mixture was formed using the powders and methods for combination in accordance with Example 2.

The first and second calcined powder mixtures were separately disposed inside a volume defined by a tool set of a sintering apparatus as disclosed herein to form at least one first layer of the first calcined powder mixture, and at least one second layer of the second calcined powder mixture, and vacuum conditions of from $10^{-2}$ to $10^{-3}$ torr were created inside the volume.

Disposing the at least one first and at least one second calcined powder mixtures inside the volume defined by the tool set typically results in intermixing of the first and second calcined powder mixtures, thereby creating a non-linear interface between the at least one first and second layers upon sintering.

The layers of the first and second calcined powder mixtures were co-compacted by applying a pressure of 15 MPa and sintered at a temperature of 1625° C. for 60 minutes to form a multilayer sintered ceramic body having a greatest dimension of about 625 mm.

Density measurements were performed on the multilayer sintered ceramic body in accordance with this example by sectioning a sample cut from the full thickness of the multilayer sintered body into its respective layers and performing density measurements on each layer separately. Measurements were performed in accordance with the Archimedes immersion method of ASTM B962-17, and a density of about 4.57 g/cc was measured for the YAG at least one first layer 100. Density values as reported are for an average across 5 measurements. A commercially available, single crystal sample of bulk YAG was measured for density using the methods as disclosed herein. An Archimedes density of 4.56 g/cc across 5 measurements was obtained and this value is taken as the theoretical density of YAG as used herein. As such, the at least one first layer 100 of the multilayer sintered ceramic body comprising YAG has a theoretical density of from 99 to 100%, preferably from 99.5 to 100%, preferably from 99.7 to 100%, preferably about 100% of the theoretical density of YAG.

The at least one second layer 102 comprising about 16% by volume of partially stabilized zirconia (and the balance alumina) was measured for density using the same methods, and a density of about 4.32 g/cc was calculated. Due to the zirconia and alumina comprising separate crystalline phases, the volumetric mixing rule as known in the art may be used to calculate a theoretical density of ZTA comprising about 16% by volume of zirconia. A density of 4.32 was measured and taken as the theoretical density of the at least one second layer 102 comprising about 16 volume % of partially stabilized zirconia. As such, the at least one second layer 102 of the multilayer sintered ceramic body comprising about 16% by volume of zirconia has a percent of theoretical density of from 99 to 100%, preferably from 99.5 to 100%, preferably about 100% of that of the theoretical density.

The multilayer sintered ceramic body as disclosed in accordance with this example has a very high density (about 100% of theoretical density, also expressed as relative density), which in embodiments may be greater than 99%, preferably from 99 to 100%, preferably from 99.5 to 100%, preferably from 99.8 to 100%, preferably about 100% of the theoretical density of the unitary, multilayer sintered ceramic body comprising at least one first and second layers. Thus, the unitary, multilayer sintered ceramic body comprises at least one first layer comprising YAG having greater than 99% of theoretical density, and further comprises at least one second layer comprising alumina and about 16 volume % partially stabilized zirconia (ZTA) having greater than 99% of theoretical density of the at least one second layer.

The multilayer sintered ceramic body according to this example comprising at least one second layer (comprising about 16% of partially stabilized zirconia by volume and the balance alumina) is preferably CTE matched to the at least one first layer comprising YAG as depicted in FIG. 4 c). An absolute value of the difference in CTE between the at least one first and second layers was measured (using dilatometry methods as performed in accordance with ASTM E228-17) to be about $0.27 \times 10^{-6}/°$ C. and less (a percentage difference of about 2% and less relative to the CTE of at least one first layer) across a temperature range of from ambient to about 1700° C. (or at least from about 200° C. to about 1400° C. as depicted in the figures).

Example 5: Multilayer Sintered Ceramic Body Comprising at Least One First Layer Comprising at Least One Crystalline Phase of Yttria and 20 Mol % Zirconia, and at Least One Second Layer Comprising Zirconia Toughened Alumina (ZTA)

A multilayer sintered ceramic body was formed from first and second powder mixtures. The first powder mixture comprised zirconia and yttria combined in amounts to form at least one first layer comprising at least one crystalline phase of 80 mol % yttria and 20 mol % zirconia. The second powder mixture comprised alumina and partially stabilized zirconia (the partially stabilized zirconia as disclosed according to Example 1) in ratios to form a zirconia toughened aluminum oxide (ZTA) second layer (comprising about 16% by volume of zirconia) as disclosed herein.

The first powder mixture comprised a partially stabilized zirconia powder (stabilization by about 3 mol % yttria in zirconia) having a surface area of from 6 to 8 m²/g, a d10 particle size of from 0.5 to 0.2 um, a d50 particle size of from 0.2 to 0.5 um, and a d90 particle size of from 1.2 to 3 um, and a yttria powder having a specific surface area of 2 to 3 m²/g, a d10 particle size of from 2 to 4 μm, a d50 particle size of from 6 to 8 μm and a d90 particle size of from 11 to 13 μm. Reaction of the zirconia and yttria powders to form at least one crystalline phase makes it possible to use any zirconia powder, without the need for stabilization of the tetragonal/monoclinic phase transformation that occurs with phase pure zirconia. As such, the zirconia powder to form the at least one first layer may comprise any one of or combinations of unstabilized, partially stabilized and stabilized zirconia. Total impurity content of the zirconia and yttria powders was from about 2 to 10 ppm. Use of ICPMS methods as disclosed herein to detect lighter elements such as Ca, Li and Mg may be done within a confidence of about 2 ppm and greater. Ca, Li and Mg were not detected (using ICPMS methods as disclosed herein) in the yttria and zirconia powders and as such, the yttria and zirconia powders comprise about 2 ppm or less of Ca, Li and Mg, in the form of calcia, lithia or lithium fluoride and magnesia. Si was not detected in the yttria and zirconia powders and as such, the yttria and zirconia powders comprise about 14 ppm or less of Si in the form of silica (according to the ICPMS methods as disclosed). The powders were combined in ratios to form at least one first layer comprising at least one crystalline phase comprising 20 mol % zirconia and the balance yttria upon sintering. Combining the partially stabilized zirconia and yttria powders to make the first powder mixture was performed using wet ball milling wherein 3 mol % yttria stabilized zirconia media was used at about 90% loading relative to powder weight. A slurry was formed at about 40 volume % by adding ethanol. The slurry was milled for about 12 hours at an RPM of 150 and thereafter dried, tumbled, and sieved according to methods known to those skilled in the art to form the first powder mixture. The first powder mixture was calcined at 850° C. for 6 hours. The first calcined powder mixture had a specific surface area of from 2 to 4 m$^2$/g, and a d50 particle size of from about 5 to 10 um. The first calcined powder mixture had total impurities of about 8 ppm and comprised about 14 ppm (or less) of Si, in the form of silica and may be sieved, tumbled, blended, etc. as known to those skilled in the art.

The second powder mixture comprised alumina and partially stabilized zirconia (partially stabilized zirconia as disclosed in accordance with Example 1) to form the at least one second layer as disclosed herein. The second powder mixture comprised an alumina powder wherein the alumina powder has a specific surface area of from 6 to 8 m$^2$/g, a d10 particle size of from 0.05 to 0.15 um, a d50 particle size of from 0.2 to 0.5 um, a d90 particle size of from 0.51 to 1 um, and a partially stabilized zirconia (PSZ) powder having a surface area of from 6 to 8 m$^2$/g, a d10 particle size of from 0.08 to 0.2 um, a d50 particle size of from 0.2 to 0.8 um, and a d90 particle size of from 1.2 to 5 um. Total impurity content of the alumina powder was from about 2 to 10 ppm. The zirconia powder comprised from about 2 to 4 mol % Hf and was stabilized with yttria in an amount of about 3 mol %. Hf and Y are not considered impurities in zirconia as disclosed herein. Excluding Hf and Y, the zirconia powder had total impurities of about 20 ppm. Use of ICPMS to detect lighter elements such as Si may be done within a confidence of about 14 ppm and greater. Use of ICPMS to detect lighter elements such as Mg, Ca and Li may be done within a confidence of about 2 ppm and greater. Mg, Ca and Li were not detected (using ICPMS methods as disclosed herein) in the zirconia and alumina powders and as such, the zirconia and alumina powders comprise about 2 ppm (or less) of Mg, Ca and Li in the form of magnesia, calcia and lithia or lithium fluoride.

The powders were combined in ratios to form at least one second layer comprising about 16% by volume of zirconia and the balance alumina upon sintering. Combining the alumina and zirconia powders to make the second powder mixture was performed using the conventional powder preparation techniques of wet ball milling wherein high purity (>99.99%) alumina media was used at about 75 to 80% loading relative to powder weight. A slurry was formed at about 40 volume % by adding ethanol. The slurry was ball milled for about 20 hours at an RPM of about 150 and thereafter dried, tumbled, and sieved according to methods known to those skilled in the art to form the second powder mixture. The second powder mixture was calcined at 900° C. for 6 hours. The second calcined powder mixture had a specific surface area of from 5 to 7 m$^2$/g. The second calcined powder mixture had total impurities of about 15 ppm and comprised about 14 ppm or less of Si, in the form of silica and may be sieved, tumbled, blended, etc. as known to those skilled in the art.

The first and second calcined powder mixtures were separately disposed inside a volume defined by a tool set of a sintering apparatus as disclosed herein to form at least one first layer of the first calcined powder mixture, and at least one second layer of the second calcined powder mixture, and vacuum conditions of from $10^{-2}$ to $10^{-3}$ torr were created inside the volume.

Disposing the at least one first and at least one second calcined powder mixtures inside the volume defined by the tool set typically results in intermixing of the first and second calcined powder mixtures, thereby creating a non-linear interface between the at least one first and second layers upon sintering.

The layers of the first and second calcined powder mixtures were co-compacted by applying a pressure of 15 MPa and sintering at a temperature of 1500° C. for 45 minutes to form a multilayer sintered ceramic body having a greatest dimension of 150 mm. Density was measured for an exemplary, composite oxide sintered body comprising 16% by volume of zirconia and the balance alumina, and the density was measured to be 4.319 g/cc, corresponding to nearly 100% of theoretical density (as calculated using the volumetric mixing rule as known to those skilled in the art).

The multilayer sintered ceramic body according to this example, comprising at least one second layer of about 16% zirconia by volume and the balance alumina, is preferably closely CTE matched to the at least one first layer comprising at least one crystalline phase of 80 mol % yttria and 20 mol % zirconia (in accordance with embodiments as depicted in FIG. 15 a). An absolute value of the difference in CTE between the at least one first and second layers was measured (using dilatometry methods as performed in accordance with ASTM E228-17) to be about 0.48×10$^{-6}$/° C. and less (a percentage difference of about 6.5% and less relative to the CTE of at least one first layer) across a temperature range of from ambient to about 1700° C. (or at least from about 200° C. to about 1400° C. as depicted in the figures).

Example 6: Multilayer Sintered Ceramic Body Comprising at Least One First Layer of at Least One Crystalline Phase of Yttria and 20 Mol % Zirconia, and a Second Layer of Zirconia Toughened Alumina (ZTA)

A multilayer sintered ceramic body was formed from first and second powder mixtures. The first powder mixture comprised zirconia and yttria combined in amounts to form an at least one first layer comprising at least one crystalline phase of 80 mol % yttria and 20 mol % zirconia as disclosed herein. The second powder mixture comprised alumina and partially stabilized zirconia (the partially stabilized zirconia as disclosed according to Example 1) in ratios to form a zirconia toughened aluminum oxide (ZTA) second layer (comprising about 16% by volume of partially stabilized zirconia) as disclosed herein.

The starting powders of yttria, zirconia and alumina comprising the first and second powder mixtures are as disclosed in accordance with Example 5.

Combining the zirconia and yttria powders to make the first powder mixture was performed using tumble (or vertical/end-over-end) mixing as known to those skilled in the art, wherein high purity (>99.9%) alumina media was used at from about 80% to about 100% loading relative to powder weight. A slurry was formed at from about 35% to about 45% by slurry weight by adding ethanol. The slurry was mixed for about 20 hours at an RPM of about 20, and thereafter dried, tumbled, and sieved according to methods known to those skilled in the art to form the first powder mixture. The first powder mixture was calcined at 850° C. for 6 hours and sieved, tumbled, blended, etc. as known to those skilled in the art.

Combining the alumina and partially stabilized zirconia powders to form the second powder mixture (and subsequently form the at least one second layer) was performed in accordance with Example 2. Calcination was performed at 850° C. for 6 hours in an oxygen containing environment.

The first and second calcined powder mixtures were separately disposed inside a volume defined by a tool set of a sintering apparatus as disclosed herein to form at least one first layer of the first calcined powder mixture, and at least one second layer of the second calcined powder mixture, and vacuum conditions of from $10^{-2}$ to $10^{-3}$ torr were created inside the volume.

Disposing the at least one first and at least one second calcined powder mixtures inside the volume defined by the tool set typically results in intermixing of the first and second calcined powder mixtures, thereby creating a nonlinear interface between the at least one first and second layers upon sintering.

The layers of the calcined powder mixtures were co-compacted by applying a pressure of 15 MPa to the layers of first and second calcined powder mixtures while heating to a sintering temperature of 1600° C. for a duration of 60 minutes to perform sintering, and form a unitary, multilayer sintered ceramic body having a greatest dimension of about 575 mm.

FIG. 16 a) illustrates an SEM image showing a non-linear interface 104 of the unitary, multilayer sintered ceramic body 98 according to this example wherein the first layer 100 comprises at least one crystalline phase of a ceramic material comprising yttria and zirconia wherein the zirconia is partially stabilized and comprises about 3 mol % yttria and is present in an amount of about 20 mol % and the balance yttria. In embodiments, the at least one first layer 100 may comprise a reaction layer 108 contiguous with the at least one second layer 102 wherein the at least one second layer 102 and the reaction layer 108 form a border comprising the nonlinear interface 108. As may be viewed in the SEM results of FIG. 16, the reaction layer is highly dense, having minimal porosity (in an amount of <1% by area). The reaction layer 108 may have a thickness of from 10 to 30 um, preferably from 15 to 30 um, preferably from 20 to 30 um, preferably from 25 to 30 um, preferably about 20 um as measured from SEM imaging. Adhesion strength of the non-linear interface 104 may be enhanced by the reaction layer 108. In embodiments, the reaction layer 108 may comprise at least one crystalline phase selected from the group consisting of YAG, YAP, YAM, a cubic crystalline phase (comprising a solid solution of at least two of yttria, alumina and zirconia), and a fluorite crystalline phase (comprising a solid solution of at least two of yttria, alumina and zirconia) and combinations thereof. FIG. 16 b) depicts a high density, sintered microstructure of an at least one first layer 100 comprising about 20 mol % zirconia and the balance yttria. A nearly fully dense microstructure is depicted, having minimal porosity.

The multilayer sintered ceramic body according to this example comprising at least one second layer (comprising about 16% of partially stabilized zirconia by volume and the balance alumina as disclosed in Example 1) is preferably CTE matched to the at least one first layer comprising at least one crystalline phase of 80 mol % yttria and 20 mol % zirconia as depicted in FIG. 15 a). An absolute value of the difference in CTE between the at least one first and second layers was measured (using dilatometry methods as performed in accordance with ASTM E228-17) to be about $0.48 \times 10^{-6}$/° C. and less (a percentage difference of about 6.5% and less relative to the CTE of at least one first layer) across a temperature range of from ambient to about 1700° C. (or at least from about 200° C. to about 1400° C. as depicted in the figures).

Example 7: At Least One First Layer Comprising Polycrystalline YAG

A powder of yttria (purity about 99.9992% relative to 100% pure yttria) having a specific surface area of from about 1 to 2 m²/g, a d10 particle size of from 3.5 to 6.5 μm, a d50 particle size of from 7.5 to 10.5 μm and a d90 particle size of from 15 to 20 μm, and a powder of alumina (purity about 99.9998% relative to 100% pure alumina) having a specific surface area of from 5 to 7 m²/g, a d10 particle size of from 1 to 3 μm, a d50 particle size of from 3.5 to 6.5 μm and a d90 particle size of from 50 to 70 μm were combined in a molar ratio to form a first powder mixture which upon sintering forms at least one first layer comprising the cubic, yttrium aluminum garnet (YAG) phase. High purity alumina media (>99.9% as measured by ICPMS methods) was added at about 100% loading by powder weight, and ethanol was added in an amount of about 40% by combined weight of ethanol and powder to form a slurry. Ball milling using an axial rolling action about a horizontal axis at 150 rpm was performed for a duration of 20 hours and thereafter the ethanol was extracted from the powder mixture using rotary evaporation according to known methods. Upon calcination at 1050° C. for 6 hours in air, the calcined powder mixture was measured to have a specific surface area of from 2 to 4 m²/g, a d10 particle size of from 1 to 4 μm, a d50 particle size of from 3.5 to 6.5 μm and a d90 particle size of from 75 to 95 μm. The powders, powder mixture and/or calcined powder mixture may be sieved using aperture sizes of from 45 to 400 um, calcined, blended and/or milled at various process steps according to methods known to those skilled in the art. Purity was measured using ICPMS methods as disclosed herein, and a total impurity content of the calcined powder mixture of about 5 ppm relative to a total mass of the oxides calculated from all constituents was measured, corresponding to a purity of 99.9995%. Purity limits and impurity contents for the starting powders of yttria and alumina, as well as the calcined powder mixtures as disclosed herein do not include Si. The detection limit using ICPMS methods to measure purity as disclosed herein for Si is about 14 ppm, thus the starting powders of yttria and alumina as well as the calcined powder mixtures may comprise Si in the form of silica at a detection level of about 14 ppm or less.

The calcined powder mixture was disposed inside a volume defined by a tool set of a sintering apparatus as disclosed herein, and vacuum conditions of from $10^{-2}$ to $10^{-3}$ torr were created inside the volume.

A pressure of 5 MPa was applied, and the calcined powder mixture inside the volume was heated from ambient temperature at about 10° C./minute to 800° C., and thereafter pressure was ramped at a rate of about 0.4 to about 0.6 MPa/minute and the temperature ramp was continued as previously disclosed to reach the sintering conditions of 1500° C. and 20 MPa for 30 minutes to form a polycrystalline YAG sintered ceramic body. A portion of the polycrystalline YAG sintered ceramic body was sintered according to the same conditions and thereafter annealed in air at 1400° C. for 8 hours in a furnace. Density measurements were performed in accordance with ASTM B962-17 on the as-sintered and the annealed polycrystalline YAG sintered ceramic body. Densities of 4.547 g/cc and 4.542 g/cc were averaged across 5 measurements for the as sintered and annealed YAG sintered ceramic body samples, respectively. This corresponds to 99.81% and 99.70% of the theoretical density for YAG and corresponding volumetric porosity of 0.19% and 0.30% respectively, as calculated from density measurements as disclosed herein.

Measurements of crystalline phase purity of the polycrystalline YAG sintered ceramic bodies were performed using a combination of XRD, SEM imaging and use of image processing software as disclosed herein. XRD was performed using a PANanlytical Aeris model XRD capable of crystalline phase identification to about +/−5% by volume, thus the polycrystalline YAG sintered ceramic body in accordance with this example was measured to comprise YAG to an upper limit of about 95% by volume using XRD. In order to determine the phase purity to greater accuracy, for example up to and including about 99.8%, SEM images were taken using backscatter detection (BSD) methods as known to those skilled in the art. Using BSD, the YAG phase appears grey, varying somewhat dependent upon grain orientation, the aluminum oxide phase appears black, the yttrium oxide phase appears white, and porosity, if present, also appears black. Images were taken at 5000× using BSD methods as known to those skilled in the art to identify the YAG, alumina and yttria phases, and any porosity present as depicted in FIG. 6 a) corresponding to the polycrystalline YAG sintered ceramic body. In order to differentiate between black regions comprising alumina and those comprising porosity, the BSD image was black and white thresholded using ImageJ processing software to highlight regions which may comprise either porosity or alumina as depicted for the same region in FIG. 6 b). The BSD detector as used for measurements disclosed herein has further capability to measure topographic features, thereby highlighting any deviations in the surface topography, such as porosity. Using the topographic mode of the BSD detector, images were taken at 5000× across a surface of the same region of the ceramic sintered body of the polycrystalline YAG sintered ceramic body of FIG. 6 a) and the topographic images are shown in FIG. 7 a). Regions comprising porosity were highlighted as illustrated in FIG. 7 b) after thresholding in ImageJ. The area comprising porosity within the topographic image of FIG. 7 b) was thereafter subtracted from the area comprising alumina and/or porosity in the BSD images of FIG. 6 b), providing the % area, and thereby % by volume, comprising alumina in the sintered ceramic body corresponding to the polycrystalline YAG sintered ceramic body. The combination of these analytical tools and methods may provide for the determination of phase purity to about +/−0.1% by volume. Using the disclosed methods of Archimedes density measurements, XRD, SEM imaging and image analysis software, the polycrystalline YAG sintered ceramic body in accordance with this example may comprise about 0.2% by volume of the alumina phase, about 0.19% of volumetric porosity, and about 99.6% by volume of the YAG phase. The polycrystalline YAG sintered ceramic body according to this example may comprise an integral body as made according to the process disclosed herein, and thus may comprise the YAG phase, an aluminum oxide phase and volumetric porosity distributed on a surface and throughout the body. In other words, a structure measured on a surface is representative of a structure within a volume of the bulk sintered ceramic body. Thus, the polycrystalline YAG sintered ceramic bodies comprising the YAG phase in amounts from 90 to 99.8%, preferably from 90 to 99.6%, preferably from 90 to 99.4%, preferably from 95 to 99.8% by volume, preferably from 95 to 99.6%, preferably from 95 to 99.4%, each by volume, may be formed using the materials and methods as disclosed herein. Accounting for measurement variance, the polycrystalline YAG sintered ceramic bodies comprising the YAG phase in amounts as specified herein may further comprise porosity in an amount by volume of from 0.1 to 0.3%, and aluminum oxide in an amount by volume of from 0.1 to about 0.3%.

The methods for formation and characteristics of the polycrystalline YAG sintered ceramic body (in particular and as disclosed the high phase purity of YAG, low porosity and remaining alumina to the extent it remains in the sintered ceramic body) in accordance with this example are in accordance with the methods for formation and characteristics of the at least one first layer of the unitary, multilayer sintered ceramic body comprising YAG as disclosed herein. As such, the at least one first layer of the unitary, multilayer sintered ceramic body may comprise polycrystalline YAG in volumetric amounts of from about 99.4 to 99.8%, further comprising porosity in an amount by volume of from 0.1 to 0.3%, and comprising aluminum oxide in an amount by volume of from 0.1 to about 0.3%.

Example 8: Multilayer Sintered Ceramic Body Comprising a First Layer Comprising 80 Mol % Yttria and 20 Mol % Zirconia, and a Second Layer Comprising Zirconia Toughened Alumina (ZTA)

A multilayer sintered ceramic body was formed from first and second powder mixtures. The first powder mixture comprised zirconia and yttria combined in amounts to form at least one first layer comprising at least one crystalline phase of 80 mol % yttria and 20 mol % zirconia. The second powder mixture comprised alumina and partially stabilized zirconia (the partially stabilized zirconia as disclosed according to Example 1) in ratios to form a zirconia toughened aluminum oxide (ZTA) second layer (comprising about 16% by volume of zirconia) as disclosed herein.

Yttria and zirconia were batched in amounts by weight of 87.3% and 12.7%, respectively to form the first powder mixture. The first powder mixture comprised a partially stabilized zirconia powder (3 mol % yttria stabilizer in zirconia) having a specific surface area (SSA) of from 6 to 8 m$^2$/g, a d10 particle size of from 0.5 to 0.2 um, a d50 particle size of from 0.2 to 0.5 um, and a d90 particle size of from 1.2 to 3 um, and a yttria powder having a specific surface area of 2 to 3 m$^2$/g, a d10 particle size of from 2 to 4 μm, a d50 particle size of from 6 to 8 μm and a d90 particle size of from 11 to 13 μm. Reaction of the zirconia and yttria powders, and the stabilization of zirconia by yttria to form at least one crystalline phase makes it possible to use any zirconia powder, without the need for other stabilizers for the tetragonal/monoclinic phase transformation that occurs with phase pure zirconia. As such, the zirconia powder to form the at least one first layer may comprise any one of or combinations of unstabilized, partially stabilized and stabilized zirconia. Total impurity content of the zirconia and yttria powders was from about 2 to 10 ppm. Use of ICPMS methods as disclosed herein to detect lighter elements such as Ca, Li and Mg may be done within a confidence of about 2 ppm and greater. Ca, Li and Mg were not detected (using ICPMS methods as disclosed herein) in the yttria and zirconia powders and as such, the yttria and zirconia powders comprise about 2 ppm or less of Ca, Li and Mg, in the form of calcia, lithia or lithium fluoride and magnesia. Si was not detected in the yttria and zirconia powders and as such, the yttria and zirconia powders comprise about 14 ppm or less of Si in the form of silica (according to the ICPMS methods as disclosed).

Combining the zirconia and yttria powders to make the first powder mixture was performed using tumble (or end-over-end or vertical) mixing using high purity (>99.99% purity) alumina media added at 100% loading relative to powder weight. A slurry was formed by adding ethanol in an amount of about 35% relative to powder weight. The slurry was tumble milled for about 12 hours at an RPM of 150 and thereafter dried using rotary evaporation methods as known in the art. The first powder mixture was calcined at 850° C. for 6 hours in air to form a first calcined powder mixture. The specific surface area (SSA) was measured using BET methods to be from 2 to 4 $m^2/g$.

Alumina and zirconia were batched in amounts of 77.4% and 22.6% by weight respectively to form the second powder mixture. The powders were combined in ratios to form at least one second layer comprising about 16% by volume of zirconia and the balance alumina upon sintering. Combining the alumina and zirconia powders to make the second powder mixture was performed using tumble (or end-over-end or vertical) mixing using high purity (>99.99% purity) alumina media added at 70% loading relative to powder weight. A slurry was formed by adding ethanol in an amount of about 50% relative to powder weight. The slurry was tumble milled for about 20 hours at an RPM of 150 and thereafter dried using rotary evaporation methods as known in the art. The second powder mixture was calcined at 900° C. for 6 hours in air to form the second calcined powder mixture. The specific surface area (SSA) was measured using BET methods to be from 5 to 7 $m^2/g$.

After end-over-end/tumble milling/mixing, the first and second calcined powder mixtures may be optionally tumbled, blended, milled, and sieved using any number of meshes which may have openings of for example from 45 to 400 um, without limitation as to repetition or order as known to those skilled in the art.

The first and second calcined powder mixtures were separately disposed inside a volume defined by a tool set of a sintering apparatus as disclosed herein to form at least one first layer of the first calcined powder mixture, and at least one second layer of the second calcined powder mixture, and vacuum conditions of from $10^{-2}$ to $10^{-3}$ torr were created inside the volume.

Disposing the at least one first and at least one second calcined powder mixtures inside the volume defined by the tool set typically results in intermixing of the first and second calcined powder mixtures, thereby creating a non-linear interface between the at least one first and second layers upon sintering.

The layers of the first and second calcined powder mixtures were co-compacted and sintered by applying a pressure of 15 MPa and sintering at a sintering temperature of 1625° C. for a duration of 90 minutes to form a multilayer sintered ceramic body in a disk shape having a diameter of 572 mm. The multilayer sintered ceramic body was annealed at 1400° C. for 10 minutes in an oxygen containing atmosphere. After sintering, surfaces of the disk were ground and polished. The plasma facing surface was polished (Strasbaugh polishing equipment) by the following method (polishing supplies provided by Struers, Inc.): (i) 40 um alumina: as needed to flatten the surface; (ii) 12 um alumina, fixed abrasive pad: 2 min; (iii) 9 μm diamond, polyurethane pad: 8 min; (iv) 6 um diamond, napped cloth: 3 min and (v) 1 um diamond, napped cloth: 3 min. Color measurements were performed at various locations on the plasma-facing surface of the at least one first layer of the component (to include embodiments of the various components as disclosed herein).

Measurement locations were selected visually to represent the greatest variations in uniformity. Accordingly, color measurements were made using a FRU WR-18 colorimeter using the CieLab L*, a*, b* scale. The color measurements were made counter-clockwise from an edge portion to a point at about one-half of the radius and then the center. The data collected in shown in the following Tables 12-15.

TABLE 12

| EDGE | L* | a* | b* |
|---|---|---|---|
| 1 | 78.05 | −0.12 | −0.54 |
| 2 | 75.37 | −0.12 | −0.52 |
| 3 | 85.32 | 0.38 | 0.84 |
| 4 | 86.37 | 0.43 | 1.01 |
| 5 | 85.97 | 0.41 | 0.88 |
| 6 | 81.92 | 0.23 | 0.41 |
| 7 | 76.58 | −0.05 | −0.59 |
| 8 | 79.58 | 0.02 | −0.16 |
| 9 | 74.48 | −0.12 | −0.95 |
| 10 | 80.14 | 0.17 | 0.19 |
| 11 | 75.63 | −0.02 | −0.54 |
| 12 | 77.38 | −0.11 | −0.57 |
| average | 80 | 0.1 | 0.0 |
| max | 86 | 0.4 | 1.0 |
| min | 74 | −0.1 | −1.0 |
| delta | 12 | 0.55 | 1.96 |

TABLE 13

| ½ RADIUS | L* | a* | b* |
|---|---|---|---|
| 1 | 77.24 | −0.4 | −1.85 |
| 2 | 76.79 | −0.33 | −1.6 |
| 3 | 78.81 | −0.14 | −0.93 |
| 4 | 77.15 | −0.2 | −1.2 |
| 5 | 75.52 | −0.4 | −1.8 |
| 6 | 78.09 | −0.23 | −1.19 |
| 7 | 80.24 | −0.1 | −0.72 |
| 8 | 77.71 | −0.27 | −1.39 |
| 9 | 76.15 | −0.42 | −2.04 |
| 10 | 77.16 | −0.39 | −1.82 |
| average | 77 | −0.3 | −1.5 |
| Max | 80 | −0.1 | −0.7 |
| Min | 76 | −0.4 | −2.0 |
| Delta | 5 | 0.32 | 1.32 |

TABLE 14

| CENTER | L* | a* | b* |
|---|---|---|---|
| 1 | 78.84 | −0.31 | −1.58 |
| 2 | 78.03 | −0.34 | −1.63 |
| 3 | 78.32 | −0.32 | −1.55 |
| 4 | 78.47 | −0.32 | −1.54 |
| 5 | 78.58 | −0.31 | −1.49 |
| 6 | 79.43 | −0.25 | −1.23 |
| 7 | 80.05 | −0.21 | −0.94 |
| 8 | 79.91 | −0.22 | −0.96 |
| 9 | 80.03 | −0.2 | −1.03 |
| 10 | 79.4 | −0.26 | −1.22 |
| Average | 79 | −0.3 | −1.3 |
| Max | 80 | −0.2 | −0.9 |

TABLE 14-continued

| CENTER | L* | a* | b* |
|---|---|---|---|
| Min | 78 | −0.3 | −1.6 |
| Delta | 2 | 0.14 | 0.69 |

The overall average is listed in the following Table 15.

TABLE 15

|  | L* | a* | b* |
|---|---|---|---|
| Overall Average | 79 | −0.14 | −0.88 |
| overall max | 86 | 0.43 | 1.01 |
| overall min | 74 | −0.42 | −2.04 |
| overall delta | 12 | 1 | 3 |

Results of the color measurements on the plasma-facing surface were an average L* value of 79, an average a* value of −0.14, an average b* value of 0.88, and a variation in L* of 15 and less, preferably 12 and less, a variation in a* of 2 and less, preferably 1 and less, and a variation in b* of 5 and less, preferably 3 and less, each measured on the plasma-facing surface across the greatest dimension of 572 mm. The at least one first layer has a plasma-facing surface which is positioned so that the plasma facing surface of the at least one first layer faces the interior of the reactor.

A full thickness portion of the multilayer sintered body was cut and cross sectioned into respective layers, and the density of the at least one first layer was measured in accordance with ASTM B962-17. A density of 5.13 g/cc was measured, corresponding to about 100% of the theoretical density (taken herein to be 5.13 g/cc) for at least one first layer comprising 80 mol % yttria and 20 mol % zirconia.

Example 9: YAG Polycrystalline Ceramic Sintered Body

A powder of yttria having a specific surface area of from 4.5 to 6 m$^2$/g and a powder of alumina having a specific surface area of from 3.5 to 5 m$^2$/g were combined in a molar ratio to form the yttrium aluminum garnet (YAG) phase upon sintering. High purity alumina media (>99.99% as measured by ICPMS) was added at 50% loading by powder weight, and ethanol was added to form about a 40 volume % slurry. Ball milling using a rolling action about a horizontal axis was performed for a duration of 12 hours and thereafter the ethanol was extracted from the powder mixture using a rotary evaporator. Upon calcination at 1000° C. for 10 hours in air, the calcined powder mixture was measured to have a specific surface area of from 7 to 8 m$^2$/g, a d10 particle size of from 0.75 to 1.75 μm, a d50 particle size of from 90 to 110 μm and a d90 particle size of from 240 to 280 μm. The calcined powder mixture was sintered at 1550° C. at a pressure of 20 MPa for 60 minutes under vacuum in a gap-containing SPS apparatus as disclosed herein to form a ceramic sintered body of 407 mm greatest dimension. Density measurements were performed in accordance with ASTM B962-17 across a greatest dimension of the sintered body, and an average density of 4.543 g/cc was measured across 135 measurements, corresponding to 99.709% of theoretical density for YAG and volumetric porosity of 0.291% as calculated from density measurements. The density was found to vary across the greatest dimension of the polycrystalline ceramic sintered body from 4.526 to 4.553 g/cc (or from 99.335 to 99.936% of theoretical for YAG) and the density variance was determined to be 0.601%. The polycrystalline ceramic sintered body had a thickness of 31 mm and the density variance across the thickness was measured, however it was determined to be less than accuracy of the methods used for measurement. Using the methods as disclosed herein, density measurements may have an accuracy of about 0.1%, thus density variation across the thickness of the ceramic sintered body may be 0.1% and less. SEM results indicated a uniform microstructure depicting presence of only the YAG phase in the polycrystalline ceramic sintered body. The conditions and results are listed in the following Tables 16 and 17:

TABLE 16

| Size (mm) | Sample | Sintering T (° C.) | Sintering P (MPa) | Sintering Time (min) | Anneal Temp (° C.) | Anneal Time (hr) |
|---|---|---|---|---|---|---|
| 406 | Ex. 9 | 1550 | 20 | 60 | none | none |

TABLE 17

| Size (mm) | Sample | Ave D (g/cc) | % TD | % variation density | % vol. porosity |
|---|---|---|---|---|---|
| 406 | Ex. 9 | 4.542 | 99.687 | 0.430 | 0.313 |

Although illustrated and described above with reference to certain specific embodiments (and examples), the present disclosure is nevertheless not intended to be limited to the details shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader ranges.

What is claimed is:

1. A multilayer sintered ceramic body comprising:
    at least one first layer comprising at least one crystalline phase of YAG, wherein the at least one first layer has at least one surface; and
    at least one second layer comprising alumina and at least one of stabilized zirconia and partially stabilized zirconia,
wherein the at least one surface of the at least one first layer comprises pores wherein the pores have a maximum size of from 0.1 to 5 μm as measured by SEM, and wherein each of the at least one first layer and the at least one second layer has a coefficient of thermal expansion (CTE), wherein the CTE of the at least one first layer and the CTE of the at least one second layer differ from 0 to 0.6×10$^{-6}$/° C. as measured in accordance with ASTM E228-17.

2. The multilayer sintered ceramic body of claim 1 wherein the pores have a maximum size of 0.1 to 2 μm as measured by SEM.

3. The multilayer sintered ceramic body as in claim 1 wherein the pores have a cumulative pore distribution of from about 2 to about 600 μm$^2$/mm$^2$ as measured using SEM and image processing methods.

4. The multilayer sintered ceramic body as in claim 1 wherein the at least one surface has a porosity by percentage of a total area of the at least one surface of from 0.0005 to 1% as measured by SEM.

5. The multilayer sintered ceramic body as in claim 1 wherein the relative density of the at least one first layer and the relative density of the at least one second layer is from 99 to 100%.

6. The multilayer sintered ceramic body as in claim 1 wherein the at least one first layer has a total impurity content of less than 25 ppm relative to the mass of the at least one first layer as measured by ICPMS.

7. The multilayer sintered ceramic body as in claim 1 wherein the at least one first layer has an Sa of from 0.0005 to 1 µm as measured according to ISO standard 25 178-2-2012.

8. The multilayer sintered ceramic body as in claim 1 wherein the at least one first layer has an Sz from 0.3 to 3 µm as measured according to ISO standard 25 178-2-2012.

9. The multilayer sintered ceramic body as in claim 1 wherein the at least one first layer and the at least one second layer are contiguous.

10. The multilayer sintered ceramic body as in claim 1 having an interface defined by the at least one first and second layers wherein the interface has an average interface line and a distance from the interface to the average interface line varies in amount from 10 to 100 µm as measured by SEM.

11. The multilayer sintered ceramic body as in claim 1 wherein the at least one first layer has a thickness d1, and the at least one second layer has a thickness d2, wherein the thickness of the at least one second layer is from 80% to 98% of the combined thicknesses of the at least one first and second layers.

12. A method of making a multilayer sintered ceramic body, the method comprising the steps of:
   a. combining yttria and alumina powders to make a first powder mixture;
   b. combining alumina and zirconia powders to make a second powder mixture, wherein the zirconia is selected from the group consisting of partially stabilized zirconia and stabilized zirconia;
   c. calcining the first and second powder mixtures by applying heat to raise the temperature of the powder mixtures to a calcination temperature and maintaining the calcination temperature to perform calcination to form first and second calcined powder mixtures;
   d. separately disposing the first and second calcined powder mixtures inside a volume defined by a tool set of a sintering apparatus to form at least one layer of the first calcined powder mixture and at least one layer of the second calcined powder mixture and creating vacuum conditions inside the volume;
   e. applying pressure to the layers of the first and second calcined powder mixtures while heating to a sintering temperature and performing sintering to form the multilayer sintered ceramic body, wherein the at least one layer of the first calcined powder mixture upon sintering forms at least one first layer and the at least one layer of the second calcined powder mixture forms at least one second layer; and
   f. lowering the temperature of the multilayer sintered ceramic body,
   wherein the at least one first layer comprising at least one crystalline phase of YAG, wherein the at least one first layer has at least one surface; and at least one second layer comprising alumina and at least one of stabilized zirconia and partially stabilized zirconia,
   wherein the at least one surface of the at least one first layer comprises pores wherein the pores have a maximum size from 0.1 to 5 µm as measured using SEM and image processing methods, and wherein each of the at least one first layer and the at least one second layer has a coefficient of thermal expansion (CTE), wherein the CTE of the at least one first layer and the CTE of the at least one second layer differ from 0 to $0.6 \times 10^{-6}/°$ C. as measured in accordance with ASTM E228-17.

13. The method according to claim 12, further comprising the steps of:
   g. optionally annealing the multilayer sintered ceramic body by applying heat to raise the temperature of the multilayer sintered ceramic body to reach an annealing temperature, performing annealing; and
   h. lowering the temperature of the annealed multilayer sintered ceramic body.

14. The method according to claim 12 further comprising the step of:
   i. machining the multilayer sintered ceramic body to create a multilayer sintered ceramic component in the shape of a dielectric window, an RF window, a focus ring, a process ring, a deposition ring, a nozzle or a gas injector, a shower head, a gas distribution plate, an etch chamber liner, a plasma source adapter, a gas inlet adapter, a diffuser, an electrostatic wafer chuck (ESC), a chuck, a puck, an ion suppressor element, a faceplate, an isolator, a spacer, and/or a protective ring in plasma processing chambers.

15. A multilayer sintered ceramic body made by the process of claim 12.

* * * * *